United States Patent
Saeki et al.

(10) Patent No.: US 12,460,014 B2
(45) Date of Patent: Nov. 4, 2025

(54) ANTIBODY-CONTAINING PREPARATION

(71) Applicant: Chugai Seiyaku Kabushiki Kaisha, Tokyo (JP)

(72) Inventors: Atsushi Saeki, Tokyo (JP); Shaw Nishizawa, Tokyo (JP); Hitoshi Sasaki, Tokyo (JP); Chifumi Imai, Tokyo (JP); Tomoyuki Igawa, Shizuoka (JP)

(73) Assignee: Chugai Seiyaku Kabushiki Kaisha, Tokyo (JP)

( * ) Notice: Subject to any disclaimer, the term of this patent is extended or adjusted under 35 U.S.C. 154(b) by 342 days.

(21) Appl. No.: 16/093,495

(22) PCT Filed: Apr. 27, 2017

(86) PCT No.: PCT/JP2017/016658
§ 371 (c)(1),
(2) Date: Oct. 12, 2018

(87) PCT Pub. No.: WO2017/188356
PCT Pub. Date: Nov. 2, 2017

(65) Prior Publication Data
US 2021/0189006 A1    Jun. 24, 2021

(30) Foreign Application Priority Data

Apr. 28, 2016   (JP) ................................ 2016-090590

(51) Int. Cl.
| C07K 16/36 | (2006.01) |
| A61K 9/08 | (2006.01) |
| A61K 47/18 | (2017.01) |
| A61K 47/34 | (2017.01) |

(52) U.S. Cl.
CPC .............. *C07K 16/36* (2013.01); *A61K 9/08* (2013.01); *A61K 47/183* (2013.01); *A61K 47/34* (2013.01); *C07K 2317/31* (2013.01); *C07K 2317/51* (2013.01); *C07K 2317/515* (2013.01); *C07K 2317/565* (2013.01)

(58) Field of Classification Search
None
See application file for complete search history.

(56) References Cited

U.S. PATENT DOCUMENTS

| 4,208,479 A | 6/1980 | Zuk et al. |
| 4,444,878 A | 4/1984 | Paulus |
| 4,474,893 A | 10/1984 | Reading |
| 5,322,678 A | 6/1994 | Morgan et al. |
| 5,496,549 A | 3/1996 | Yamazaki et al. |
| 5,591,828 A | 1/1997 | Bosslet et al. |
| 5,639,641 A | 6/1997 | Pedersen et al. |
| 5,693,762 A | 12/1997 | Queen et al. |
| 5,744,446 A | 4/1998 | Lollar et al. |
| 5,795,965 A | 8/1998 | Tsuchiya et al. |
| 5,859,205 A | 1/1999 | Adair et al. |
| 5,945,311 A | 8/1999 | Lindhofer et al. |
| 5,990,286 A | 11/1999 | Khawli et al. |
| 6,005,091 A | 12/1999 | Blackburn et al. |
| 6,010,902 A | 1/2000 | Ledbetter et al. |
| 6,126,980 A | 10/2000 | Smith et al. |
| 6,129,914 A | 10/2000 | Weiner |
| 6,180,370 B1 * | 1/2001 | Queen .................... A61P 21/04 435/69.6 |
| 6,329,511 B1 | 12/2001 | Vasquez et al. |
| 6,485,943 B2 | 11/2002 | Stevens et al. |
| 6,677,436 B1 | 1/2004 | Sato et al. |
| 6,737,056 B1 | 5/2004 | Presta |
| 6,884,879 B1 | 4/2005 | Baca et al. |
| 6,913,747 B1 | 7/2005 | Co et al. |
| 7,033,590 B1 | 4/2006 | Scheiflinger et al. |
| 7,052,873 B2 | 5/2006 | Tsuchiya |
| 7,276,585 B2 | 10/2007 | Lazar et al. |
| 8,062,635 B2 | 11/2011 | Hattori et al. |
| 8,568,720 B2 * | 10/2013 | Morichika ............. A61P 43/00 424/143.1 |
| 8,592,562 B2 | 11/2013 | Kannan et al. |
| 8,597,911 B2 | 12/2013 | Miyazaki et al. |
| 8,765,124 B2 * | 7/2014 | Saito .................... A61K 47/10 424/130.1 |

(Continued)

FOREIGN PATENT DOCUMENTS

| AU | 2009290162 | 4/2010 |
| CA | 2 019 559 | 12/1990 |

(Continued)

OTHER PUBLICATIONS

Kipriyanov, Sergey M., and Fabrice Le Gall. "Generation and production of engineered antibodies." Molecular biotechnology 26.1 (2004): 39-60. (Year: 2004).*
Janeway, Charles A. "Immunobiology: The Immune System in Health and Disease." 2001 (Year: 2001).*
U.S. Appl. No. 16/226,798, Hattori et al., filed Dec. 20, 2018.
U.S. Appl. No. 15/562,186, Igawa et al., filed Sep. 27, 2017.
U.S. Appl. No. 15/512,094, Igawa et al., filed Mar. 23, 2017.
U.S. Appl. No. 12/295,039, Igawa et al., filed Jan. 20, 2009.
U.S. Appl. No. 15/490,936, Igawa et al., filed Apr. 19, 2017.
U.S. Appl. No. 13/518,861, Igawa et al., filed Oct. 4, 2017 (abandoned).

(Continued)

*Primary Examiner* — Zachariah Lucas
*Assistant Examiner* — Lia E Taylor
(74) *Attorney, Agent, or Firm* — Fish & Richardson P.C.

(57) ABSTRACT

The present invention relates to stable antibody-containing solution formulations in which aggregate formation of Emicizumab (ACE910) which is a bispecific antibody functionally substituting for FVIII, is suppressed. Specifically, the present invention relates to the above-mentioned antibody-containing solution formulations of pH 4.5 to 6.5 that contain the aforementioned bispecific antibody at 20 to 180 mg/mL, 10 mM to 40 mM histidine-aspartate buffer, Poloxamer 188 at 0.2 to 1 mg/mL, and 100 mM to 300 mM arginine.

26 Claims, 2 Drawing Sheets
Specification includes a Sequence Listing.

(56) References Cited

U.S. PATENT DOCUMENTS

| | | |
|---|---|---|
| 9,096,651 B2 | 8/2015 | Igawa et al. |
| 9,334,331 B2 | 5/2016 | Igawa et al. |
| 9,670,269 B2 | 6/2017 | Igawa et al. |
| 9,828,429 B2 | 11/2017 | Igawa et al. |
| 10,011,858 B2 | 7/2018 | Igawa et al. |
| 10,022,319 B2 * | 7/2018 | Igawa ................ A61K 47/183 |
| 10,450,381 B2 | 10/2019 | Igawa et al. |
| 10,759,870 B2 | 9/2020 | Teranishi et al. |
| 10,934,344 B2 | 3/2021 | Igawa et al. |
| 11,046,784 B2 | 6/2021 | Igawa et al. |
| 11,124,576 B2 | 9/2021 | Igawa et al. |
| 11,142,587 B2 | 10/2021 | Igawa et al. |
| 11,150,254 B2 | 10/2021 | Nogami et al. |
| 11,168,344 B2 | 11/2021 | Igawa et al. |
| 11,214,623 B2 | 1/2022 | Igawa et al. |
| 11,248,053 B2 | 2/2022 | Igawa et al. |
| 11,352,438 B2 | 6/2022 | Yoneyama et al. |
| 11,612,562 B2 | 3/2023 | Igawa et al. |
| 11,649,262 B2 | 5/2023 | Tanaka et al. |
| 2002/0009430 A1 | 1/2002 | Lindhofer et al. |
| 2002/0062010 A1 | 5/2002 | Arathoon et al. |
| 2002/0142374 A1 | 10/2002 | Gallo et al. |
| 2002/0164339 A1 | 11/2002 | Do et al. |
| 2002/0164668 A1 | 11/2002 | Durham et al. |
| 2003/0187225 A1 | 10/2003 | Penichet et al. |
| 2003/0190311 A1 | 10/2003 | Dall'Acqua et al. |
| 2003/0207346 A1 | 11/2003 | Arathoon et al. |
| 2003/0211460 A1 | 11/2003 | Nelsestuen |
| 2003/0219441 A1 | 11/2003 | Thorpe et al. |
| 2003/0224397 A1 | 12/2003 | Lowman et al. |
| 2004/0081651 A1 | 4/2004 | Karpusas et al. |
| 2004/0236080 A1 | 11/2004 | Aburatani et al. |
| 2005/0095243 A1 | 5/2005 | Chan et al. |
| 2005/0130224 A1 | 6/2005 | Saito et al. |
| 2005/0164307 A1 | 7/2005 | Kojima et al. |
| 2005/0191293 A1 | 9/2005 | Deshpande et al. |
| 2005/0244403 A1 | 11/2005 | Lazar et al. |
| 2005/0244416 A1 | 11/2005 | Jung |
| 2005/0261229 A1 | 11/2005 | Gillies |
| 2005/0266425 A1 | 12/2005 | Zauderer et al. |
| 2006/0019342 A1 | 1/2006 | Dall Acqua et al. |
| 2006/0057149 A1 | 3/2006 | Johnson et al. |
| 2006/0063228 A1 | 3/2006 | Kasaian et al. |
| 2006/0074225 A1 | 4/2006 | Chamberlain |
| 2006/0134709 A1 | 6/2006 | Stavenhagen et al. |
| 2006/0134805 A1 | 6/2006 | Berg et al. |
| 2006/0141456 A1 | 6/2006 | Edwards et al. |
| 2006/0159673 A1 | 7/2006 | Kojima |
| 2006/0160184 A1 | 7/2006 | Hoogenboom et al. |
| 2006/0204493 A1 | 9/2006 | Huang et al. |
| 2006/0269989 A1 | 11/2006 | Miyazaki et al. |
| 2007/0036785 A1 | 2/2007 | Kishimoto et al. |
| 2007/0041978 A1 | 2/2007 | Hattori et al. |
| 2007/0054354 A1 | 3/2007 | Humphreys et al. |
| 2007/0059312 A1 | 3/2007 | Baca et al. |
| 2007/0087381 A1 | 4/2007 | Kojima |
| 2007/0110757 A1 | 5/2007 | Wei et al. |
| 2008/0075712 A1 | 3/2008 | Hattori et al. |
| 2008/0166756 A1 | 7/2008 | Tsuchiya et al. |
| 2009/0117097 A1 | 5/2009 | Igawa et al. |
| 2009/0263392 A1 | 10/2009 | Igawa et al. |
| 2009/0324589 A1 | 12/2009 | Igawa et al. |
| 2010/0003254 A1 | 1/2010 | Hattori et al. |
| 2010/0015133 A1 | 1/2010 | Igawa et al. |
| 2010/0028372 A1 | 2/2010 | Jezek |
| 2010/0055092 A1 | 3/2010 | Hasegawa et al. |
| 2010/0239577 A1 | 9/2010 | Igawa et al. |
| 2010/0285011 A1 * | 11/2010 | Morichika ............ A61P 43/00 424/133.1 |
| 2010/0286374 A1 | 11/2010 | Kannan et al. |
| 2010/0291072 A1 | 11/2010 | Lowman et al. |
| 2010/0298542 A1 | 11/2010 | Igawa et al. |
| 2010/0331527 A1 | 12/2010 | Davis et al. |
| 2011/0076275 A1 | 3/2011 | Igawa et al. |
| 2011/0097754 A1 | 4/2011 | Hilbert et al. |
| 2011/0111406 A1 | 5/2011 | Igawa et al. |
| 2011/0236374 A1 | 9/2011 | Shitara et al. |
| 2011/0245473 A1 | 10/2011 | Igawa et al. |
| 2011/0287009 A1 | 11/2011 | Scheer et al. |
| 2012/0009188 A1 | 1/2012 | Behrens |
| 2012/0010387 A1 | 1/2012 | Niwa et al. |
| 2012/0149876 A1 | 6/2012 | Von Kreudenstein |
| 2012/0237517 A1 | 9/2012 | Hattori et al. |
| 2013/0011866 A1 | 1/2013 | Igawa et al. |
| 2013/0018174 A1 | 1/2013 | Igawa et al. |
| 2013/0039913 A1 | 2/2013 | Labrujn et al. |
| 2013/0085199 A1 | 4/2013 | Tamori et al. |
| 2013/0115208 A1 | 5/2013 | Ho et al. |
| 2013/0195849 A1 | 8/2013 | Spreter et al. |
| 2013/0330345 A1 * | 12/2013 | Igawa ................ C07K 16/40 424/136.1 |
| 2014/0037632 A1 | 2/2014 | Igawa et al. |
| 2014/0051833 A1 | 2/2014 | Fischer et al. |
| 2014/0154270 A1 | 6/2014 | Wang et al. |
| 2014/0303356 A1 | 10/2014 | Gramer et al. |
| 2014/0370018 A1 | 12/2014 | Igawa et al. |
| 2014/0370020 A1 | 12/2014 | Kuramochi et al. |
| 2014/0377253 A1 | 12/2014 | Harding et al. |
| 2015/0240287 A1 | 8/2015 | Soeda et al. |
| 2015/0284465 A1 | 10/2015 | Igawa et al. |
| 2015/0297820 A1 | 10/2015 | Kawai |
| 2015/0315278 A1 | 11/2015 | Igawa et al. |
| 2015/0315296 A1 | 11/2015 | Schaefer et al. |
| 2016/0024147 A1 | 1/2016 | Tustian et al. |
| 2016/0222129 A1 | 8/2016 | Igawa et al. |
| 2016/0229915 A1 | 8/2016 | Igawa et al. |
| 2017/0022293 A1 | 1/2017 | Igawa et al. |
| 2017/0145111 A1 | 5/2017 | Hattori et al. |
| 2017/0253663 A1 | 9/2017 | Yoneyama |
| 2017/0275332 A1 | 9/2017 | Igawa et al. |
| 2017/0275376 A1 | 9/2017 | Igawa et al. |
| 2017/0283483 A1 | 10/2017 | Igawa et al. |
| 2018/0002443 A1 | 1/2018 | Hattori et al. |
| 2018/0011114 A1 | 1/2018 | Nogami et al. |
| 2018/0051307 A1 | 2/2018 | Igawa et al. |
| 2018/0057607 A1 | 3/2018 | Igawa et al. |
| 2018/0142027 A1 | 5/2018 | Igawa et al. |
| 2018/0162902 A1 | 6/2018 | Igawa et al. |
| 2018/0244800 A1 | 8/2018 | Hattori et al. |
| 2018/0344630 A1 | 12/2018 | Igawa et al. |
| 2019/0062368 A1 | 2/2019 | Igawa et al. |
| 2019/0112390 A1 | 4/2019 | Hattori et al. |
| 2019/0185578 A1 | 6/2019 | Igawa et al. |
| 2019/0194352 A1 | 6/2019 | Yoneyama et al. |
| 2019/0309090 A1 | 10/2019 | Yoneyama et al. |
| 2019/0315884 A1 | 10/2019 | Igawa et al. |
| 2019/0330268 A1 | 10/2019 | Tanaka et al. |
| 2019/0352334 A1 | 11/2019 | Igawa et al. |
| 2019/0359728 A1 | 11/2019 | Hattori et al. |
| 2020/0157243 A1 | 5/2020 | Yoneyama et al. |
| 2020/0207805 A1 | 7/2020 | Igawa et al. |
| 2020/0223940 A1 | 7/2020 | Teranishi et al. |
| 2020/0270363 A1 | 8/2020 | Igawa et al. |
| 2020/0277402 A1 | 9/2020 | Hattori et al. |
| 2020/0283544 A1 | 9/2020 | Hosoguchi et al. |
| 2020/0354473 A1 | 11/2020 | Teranishi et al. |
| 2020/0407463 A1 | 12/2020 | Yoneyama |
| 2021/0040147 A1 | 2/2021 | Igawa et al. |
| 2021/0107994 A1 | 4/2021 | Shima et al. |
| 2021/0107995 A1 | 4/2021 | Hattori et al. |
| 2021/0238307 A1 | 8/2021 | Yoneyama |
| 2021/0292360 A1 | 9/2021 | Igawa et al. |
| 2021/0324109 A1 | 10/2021 | Igawa et al. |
| 2021/0380717 A1 | 12/2021 | Hattori et al. |
| 2022/0010030 A1 | 1/2022 | Igawa et al. |
| 2022/0073644 A1 | 3/2022 | Kameoka et al. |
| 2022/0073645 A1 | 3/2022 | Yoneyama |
| 2022/0119551 A1 | 4/2022 | Igawa et al. |
| 2022/0135618 A1 | 5/2022 | Igawa et al. |
| 2022/0213217 A1 | 7/2022 | Hattori et al. |
| 2022/0267470 A1 | 8/2022 | Igawa et al. |
| 2022/0267822 A1 | 8/2022 | Igawa et al. |
| 2022/0305122 A1 | 9/2022 | Yoneyama et al. |
| 2022/0315667 A1 | 10/2022 | Yoneyama et al. |

(56) References Cited

U.S. PATENT DOCUMENTS

| | | |
|---|---|---|
| 2022/0324999 A1 | 10/2022 | Yoneyama |
| 2022/0389054 A1 | 12/2022 | Igawa et al. |
| 2022/0389105 A1 | 12/2022 | Igawa et al. |
| 2023/0159658 A1 | 5/2023 | Yoneyama et al. |
| 2023/0174673 A1 | 6/2023 | Yoneyama |
| 2023/0212315 A1 | 7/2023 | Igawa et al. |
| 2023/0227498 A1 | 7/2023 | Igawa et al. |
| 2023/0348621 A1 | 11/2023 | Hattori et al. |
| 2024/0052058 A1 | 2/2024 | Yoneyama et al. |
| 2024/0052059 A1 | 2/2024 | Shima et al. |
| 2024/0052060 A1 | 2/2024 | Yoneyama |
| 2024/0059795 A1 | 2/2024 | Igawa et al. |
| 2024/0083939 A1 | 3/2024 | Igawa et al. |
| 2024/0190976 A1 | 6/2024 | Igawa et al. |
| 2024/0190997 A1 | 6/2024 | Hattori et al. |
| 2024/0239906 A1 | 7/2024 | Igawa et al. |

FOREIGN PATENT DOCUMENTS

| | | | | |
|---|---|---|---|---|
| CA | 2 331 641 | 11/1999 | | |
| CA | 2 541 671 | 4/2005 | | |
| CA | 2 817 964 | 4/2005 | | |
| CA | 2 603 264 | 10/2006 | | |
| CA | 2 603 408 | 10/2006 | | |
| CA | 2 647 846 | 10/2007 | | |
| CA | 2 700 986 | 4/2009 | | |
| CA | 2 812 739 | 10/2012 | | |
| CA | 2 859 667 | 6/2013 | | |
| CA | 2 888 496 | 5/2014 | | |
| CA | 3 031 082 | 1/2018 | | |
| CA | 3 027 018 | 2/2018 | | |
| CN | 1229646 | 11/2005 | | |
| CN | 101198698 | 6/2008 | | |
| CN | 101883588 | 11/2010 | | |
| CN | 101883793 | 11/2010 | | |
| CN | 101906160 | 12/2010 | | |
| CN | 102084254 | 6/2011 | | |
| CN | 102471378 | 5/2012 | | |
| CN | 102782131 | 11/2012 | | |
| CN | 102858366 | 1/2013 | | |
| CN | 102946906 | 2/2013 | | |
| CN | 103298937 | 9/2013 | | |
| CN | 107108746 | 8/2017 | | |
| CN | 101874042 | 9/2018 | | |
| CN | 105848668 | 8/2021 | | |
| CN | 105859889 | 8/2021 | | |
| EP | 0 369 566 | 5/1990 | | |
| EP | 0 404 097 | 12/1990 | | |
| EP | 04/32134 | 6/1991 | | |
| EP | 0 329 185 | 4/1994 | | |
| EP | 0 637 593 | 2/1995 | | |
| EP | 0 783 893 | 7/1997 | | |
| EP | 0 811 691 | 12/1997 | | |
| EP | 1 069 185 | 1/2001 | | |
| EP | 1 220 923 | 7/2002 | | |
| EP | 1 327 681 | 7/2003 | | |
| EP | 1 505 148 | 2/2005 | | |
| EP | 1 510 943 | 3/2005 | | |
| EP | 0 979 281 | 7/2005 | | |
| EP | 1 605 058 | 12/2005 | | |
| EP | 1 688 488 | 8/2006 | | |
| EP | 1 693 448 | 8/2006 | | |
| EP | 1 712 240 A | 10/2006 | | |
| EP | 1 773 391 | 4/2007 | | |
| EP | 1 870 458 | 12/2007 | | |
| EP | 1 870 459 | 12/2007 | | |
| EP | 1 876 236 | 1/2008 | | |
| EP | 1 900 814 | 3/2008 | | |
| EP | 2 006 381 | 12/2008 | | |
| EP | 2 009 101 | 12/2008 | | |
| EP | 2 107 115 | 10/2009 | | |
| EP | 2 202 245 | 6/2010 | | |
| EP | 2 275 443 | 1/2011 | | |
| EP | 1 688 488 B9 | 3/2012 | | |
| EP | 2 238 985 | 8/2012 | | |
| EP | 2 522 724 | 11/2012 | | |
| EP | 2 526 963 | 11/2012 | | |
| EP | 2526963 A1 * | 11/2012 | ....... | A61K 39/39591 |
| EP | 2 543 727 | 1/2013 | | |
| EP | 2 644 698 | 10/2013 | | |
| EP | 2 905 290 | 8/2015 | | |
| EP | 2 914 634 | 9/2015 | | |
| EP | 3 159 006 | 4/2017 | | |
| EP | 3 395 835 B | 2/2021 | | |
| JP | S63-52890 | 3/1988 | | |
| JP | 2-028200 | 1/1990 | | |
| JP | H02-145187 | 6/1990 | | |
| JP | H03-500644 | 2/1991 | | |
| JP | H05-501543 | 3/1993 | | |
| JP | H05-184383 | 7/1993 | | |
| JP | H05-199894 | 8/1993 | | |
| JP | H05-203652 | 8/1993 | | |
| JP | H05-213775 | 8/1993 | | |
| JP | H05-304992 | 11/1993 | | |
| JP | 07-67688 | 3/1995 | | |
| JP | 8-500979 | 2/1996 | | |
| JP | 8-510555 | 11/1996 | | |
| JP | 09-506001 | 6/1997 | | |
| JP | H10-165184 | 6/1998 | | |
| JP | H10-511085 | 10/1998 | | |
| JP | 11-500915 | 1/1999 | | |
| JP | 11-500916 | 1/1999 | | |
| JP | H11-71288 | 3/1999 | | |
| JP | H11-504007 | 4/1999 | | |
| JP | H11-506310 | 6/1999 | | |
| JP | 2001-523971 | 11/2001 | | |
| JP | 2002-518041 | 6/2002 | | |
| JP | 2003-055398 | 2/2003 | | |
| JP | 2003-509049 | 3/2003 | | |
| JP | 2004-086682 | 3/2004 | | |
| JP | 2004-086862 | 3/2004 | | |
| JP | 2004-511426 | 4/2004 | | |
| JP | 2004-321100 | 11/2004 | | |
| JP | 2005-501514 | 1/2005 | | |
| JP | 2005-101105 | 3/2005 | | |
| JP | 2005-535341 | 11/2005 | | |
| JP | 2005-378266 | 12/2005 | | |
| JP | 2005-537009 | 12/2005 | | |
| JP | 2008-510466 | 4/2008 | | |
| JP | 2008-523140 | 7/2008 | | |
| JP | 2010-522701 | 7/2010 | | |
| JP | 2011-502126 | 1/2011 | | |
| JP | 2011-508604 | 3/2011 | | |
| JP | 2011-137000 | 7/2011 | | |
| JP | 2012-082201 | 4/2012 | | |
| JP | 2012-515160 | 7/2012 | | |
| JP | 2012-522527 | 9/2012 | | |
| JP | 2012-531439 | 12/2012 | | |
| JP | 5144499 | 2/2013 | | |
| JP | 2013-529084 | 7/2013 | | |
| JP | 2013-529190 | 7/2013 | | |
| JP | 2013-165716 | 8/2013 | | |
| JP | 5334319 | 11/2013 | | |
| JP | 2014-511836 | 5/2014 | | |
| JP | 2014-524748 | 9/2014 | | |
| JP | 2015-502409 | 1/2015 | | |
| JP | 2015-504434 | 2/2015 | | |
| JP | 2015-510764 | 4/2015 | | |
| JP | 2015-514684 | 5/2015 | | |
| JP | 2015-130883 | 7/2015 | | |
| JP | 2015-536349 | 12/2015 | | |
| JP | 2016-508117 | 3/2016 | | |
| JP | 2016-69329 | 5/2016 | | |
| JP | 2017-511139 | 4/2017 | | |
| JP | 6534615 | 6/2019 | | |
| KR | 2012/0123055 | 11/2012 | | |
| KR | 2013/0102113 | 9/2013 | | |
| KR | 2013/0102640 | 9/2013 | | |
| NO | 20062087 | 7/2006 | | |
| RU | 94028282 | 7/1996 | | |
| RU | 2266298 | 12/2005 | | |
| RU | 2339696 | 11/2008 | | |
| RU | 2534347 | 11/2014 | | |
| TW | 2007/14313 | 4/2007 | | |

(56) References Cited

FOREIGN PATENT DOCUMENTS

| | | |
|---|---|---|
| TW | 2007/22517 | 6/2007 |
| TW | 2012/43049 | 11/2012 |
| TW | I452135 | 9/2014 |
| TW | I452136 | 9/2014 |
| TW | 2016/00112 | 1/2016 |
| TW | 2016/25299 | 7/2016 |
| TW | 2018/22815 | 7/2018 |
| WO | WO 89/01343 | 2/1989 |
| WO | WO 91/08770 | 6/1991 |
| WO | WO 92/19759 | 11/1992 |
| WO | WO 93/11161 | 6/1993 |
| WO | WO 94/05690 | 3/1994 |
| WO | WO 94/13804 | 6/1994 |
| WO | WO 95/01571 | 1/1995 |
| WO | WO 95/014710 | 6/1995 |
| WO | WO 95/33844 | 12/1995 |
| WO | WO 96/01653 | 1/1996 |
| WO | WO 96/07754 | 3/1996 |
| WO | WO 96/11020 | 4/1996 |
| WO | WO 96/12503 | 5/1996 |
| WO | WO 96/16673 | 6/1996 |
| WO | WO 96/26964 | 9/1996 |
| WO | WO 96/27011 | 9/1996 |
| WO | WO 96/33208 | 10/1996 |
| WO | WO 97/10354 | 3/1997 |
| WO | WO 98/03546 | 1/1998 |
| WO | WO 98/50431 | 11/1998 |
| WO | WO 99/03495 | 1/1999 |
| WO | WO 99/10494 | 3/1999 |
| WO | WO 99/018212 | 4/1999 |
| WO | WO 99/51743 | 10/1999 |
| WO | WO 99/58572 | 11/1999 |
| WO | WO 99/67359 | 12/1999 |
| WO | WO 01/07918 | 2/2001 |
| WO | WO 01/19992 | 3/2001 |
| WO | WO 01/30854 | 5/2001 |
| WO | WO 01/82899 | 11/2001 |
| WO | WO 01/90192 | 11/2001 |
| WO | WO 02/06838 | 1/2002 |
| WO | WO 02/30463 | 4/2002 |
| WO | WO 02/33073 | 4/2002 |
| WO | WO 02/060919 | 8/2002 |
| WO | WO 03/000883 | 1/2003 |
| WO | WO 03/012069 | 2/2003 |
| WO | WO 03/020949 | 3/2003 |
| WO | WO 03/035835 | 5/2003 |
| WO | WO 03/042231 | 5/2003 |
| WO | WO 03/074679 | 9/2003 |
| WO | WO 03/087163 | 10/2003 |
| WO | WO 03/091424 | 11/2003 |
| WO | WO 03/105757 | 12/2003 |
| WO | WO 2004/009618 | 1/2004 |
| WO | WO 2004/016740 | 2/2004 |
| WO | WO 2004/020579 | 3/2004 |
| WO | WO 2004/060919 | 7/2004 |
| WO | WO 2004/065611 | 8/2004 |
| WO | WO 2004/068931 | 8/2004 |
| WO | WO 2004/096273 | 11/2004 |
| WO | WO 2004/097041 | 11/2004 |
| WO | WO 2004/111233 | 12/2004 |
| WO | WO 2005/025615 | 3/2005 |
| WO | WO 2005/035753 | 4/2005 |
| WO | WO 2005/035754 | 4/2005 |
| WO | WO 2005/035756 | 4/2005 |
| WO | WO 2005/047327 | 5/2005 |
| WO | WO 2005/059106 | 6/2005 |
| WO | WO 2005/062916 | 7/2005 |
| WO | WO 2005/067620 | 7/2005 |
| WO | WO 2005/112564 | 12/2005 |
| WO | WO 2005/121180 | 12/2005 |
| WO | WO 2005/123126 | 12/2005 |
| WO | WO 2006/004663 | 1/2006 |
| WO | WO 2006/019447 | 2/2006 |
| WO | WO 2006/030200 | 3/2006 |
| WO | WO 2006/030220 | 3/2006 |
| WO | WO 2006/031370 | 3/2006 |
| WO | WO 2006/050491 | 5/2006 |
| WO | WO 2006/065208 | 6/2006 |
| WO | WO 2006/067913 | 6/2006 |
| WO | WO 2006/106903 | 10/2006 |
| WO | WO 2006/106905 | 10/2006 |
| WO | WO 2006/109592 | 10/2006 |
| WO | WO 2006/113767 | 10/2006 |
| WO | WO 2006/121852 | 11/2006 |
| WO | WO 2007/011746 | 1/2007 |
| WO | WO 2007/024535 | 3/2007 |
| WO | WO 2007/060411 | 5/2007 |
| WO | WO 2007/092772 | 8/2007 |
| WO | WO 2007/114319 | 10/2007 |
| WO | WO 2007/114325 | 10/2007 |
| WO | WO 2007/142325 | 12/2007 |
| WO | WO 2007/147901 | 12/2007 |
| WO | WO 2008/043822 | 4/2008 |
| WO | WO 2008/090960 | 7/2008 |
| WO | WO 2008/119353 | 10/2008 |
| WO | WO 2008/145142 | 12/2008 |
| WO | WO 2009/024653 | 2/2009 |
| WO | WO 2009/041613 | 4/2009 |
| WO | WO 2009/041621 | 4/2009 |
| WO | WO 2009/041643 | 4/2009 |
| WO | WO 2009/058492 | 5/2009 |
| WO | WO 2009/084659 | 7/2009 |
| WO | WO 2009/089004 | 7/2009 |
| WO | WO 2009/125825 | 10/2009 |
| WO | WO 2009/139822 | 11/2009 |
| WO | WO 2012/020096 | 1/2010 |
| WO | WO 2010/035769 | 4/2010 |
| WO | WO 2010/080065 | 7/2010 |
| WO | WO 2010/106180 | 9/2010 |
| WO | WO 2010/107109 | 9/2010 |
| WO | WO 2010/115589 | 10/2010 |
| WO | WO 2010/129304 | 11/2010 |
| WO | WO 2010/151792 | 12/2010 |
| WO | WO 2011/090088 | 2/2011 |
| WO | WO 2011/078332 | 6/2011 |
| WO | WO 2011/108502 | 9/2011 |
| WO | WO 2011/111007 | 9/2011 |
| WO | WO 2011/125674 | 10/2011 |
| WO | WO 2011/131746 | 10/2011 |
| WO | WO 2011/133886 | 10/2011 |
| WO | WO 2011/143545 | 11/2011 |
| WO | WO 2011/157283 | 12/2011 |
| WO | WO 2012/067176 | 5/2012 |
| WO | WO 2012/073985 | 6/2012 |
| WO | WO 2012/131555 | 10/2012 |
| WO | WO 2013/011076 | 1/2013 |
| WO | WO 2013/060867 | 5/2013 |
| WO | WO 2013/065708 | 5/2013 |
| WO | WO 2013/076186 | 5/2013 |
| WO | WO 2013/096291 | 6/2013 |
| WO | WO 2013/124450 | 8/2013 |
| WO | WO 2013/124451 | 8/2013 |
| WO | WO 2013/131866 | 9/2013 |
| WO | WO 2013/136186 | 9/2013 |
| WO | WO 2013/157954 | 10/2013 |
| WO | WO 2014/028354 | 2/2014 |
| WO | WO 2014/050926 | 4/2014 |
| WO | WO 2014/054804 | 4/2014 |
| WO | WO 2014/067011 | 5/2014 |
| WO | WO 2014/081955 | 5/2014 |
| WO | WO 2014/082179 | 6/2014 |
| WO | WO 2015/046467 | 4/2015 |
| WO | WO 2015/063339 | 5/2015 |
| WO | WO 2015/066700 | 5/2015 |
| WO | WO 2015/134894 | 9/2015 |
| WO | WO 2015/150447 | 10/2015 |
| WO | WO 2015/175874 | 11/2015 |
| WO | WO 2015/181805 | 12/2015 |
| WO | WO 2015/194233 | 12/2015 |
| WO | WO 2016/001810 | 1/2016 |
| WO | WO 2016/047652 | 3/2016 |
| WO | WO 2016/047656 | 3/2016 |
| WO | WO 2016/159213 | 10/2016 |
| WO | WO 2016/164708 | 10/2016 |

(56) References Cited

FOREIGN PATENT DOCUMENTS

| | | |
|---|---|---|
| WO | WO 2016/166014 | 10/2016 |
| WO | WO 2016/171202 | 10/2016 |
| WO | WO 2017/110980 | 6/2017 |
| WO | WO 2017/115773 | 7/2017 |
| WO | WO 2017/129585 | 8/2017 |
| WO | WO 2017/205014 | 11/2017 |
| WO | WO 2018/016881 | 1/2018 |
| WO | WO 2018/021450 | 2/2018 |
| WO | WO 2018/047813 | 3/2018 |
| WO | WO 2018/181870 | 10/2018 |
| WO | WO 2019/065795 | 4/2019 |
| WO | WO 2019/088143 | 5/2019 |
| WO | WO 2021/070885 | 4/2021 |

OTHER PUBLICATIONS

U.S. Appl. No. 16/155,673, Igawa et al., filed Oct. 9, 2018.
U.S. Appl. No. 15/132,996, Igawa et al., filed Apr. 19, 2016.
U.S. Appl. No. 15/288,965, Igawa et al., filed Oct. 7, 2016.
U.S. Appl. No. 15/024,063, Igawa et al., filed Mar. 23, 2016.
U.S. Appl. No. 15/319,016, Yoneyama, filed Dec. 15, 2016.
U.S. Appl. No. 10/560,098, Mlyazaki et al., filed Apr. 28, 2006 (abandoned).
U.S. Appl. No. 14/921,590, filed Oct. 23, 2015, Hattori et al.
U.S. Appl. No. 15/172,727, filed Jun. 3, 2016, Hattori et al.
U.S. Appl. No. 16/061,429, filed Jun. 12, 2018, Igawa et al.
U.S. Appl. No. 16/061,454, filed Jun. 12, 2018, Tanaka et al.
U.S. Appl. No. 16/155,673, filed Oct. 9, 2018, Igawa et al.
U.S. Appl. No. 16/226,798, filed Dec. 20, 2018, Hattori et al.
Kitazawa et al., "A bispecific antibody to factors IXa and X restores factor VIII hemostatic activity in a hemophilia A model," Nat Med, Oct. 2012, 18(10) :1570-4. doi: 10. 1038/nm.2942. Epub Sep. 30, 2012.
Sampei et al., "Identification and multidimensional optimization of an asymmetric bispecific IgG antibody mimicking the function of factor VIII cofactor activity," PLoS One, Feb. 2013, 8(2):e57479. doi: 10.1371/journal.pone.0057479. Epub Feb. 28, 2013.
International Preliminary Report on Patentability for App. Ser. No. PCT/JP2015/060171, dated Oct. 30, 2018, 10 pages.
International Search Report in International Application No. PCT/JP2017/060171, dated Jun. 20, 2017, 6 pages.
U.S. Appl. No. 16/099,341, Teranishi et al., filed Nov. 6, 2018.
U.S. Appl. No. 16/825,513, Hattori et al., filed Mar. 20, 2020.
U.S. Appl. No. 15/617,088, Igawa et al., filed Jun. 8, 2017 (abandoned).
U.S. Appl. No. 16/815,089, Igawa et al., filed Mar. 11, 2020.
U.S. Appl. No. 16/459,791, Igawa et al., filed Jul. 2, 2019.
U.S. Appl. No. 16/780,977, Yoneyama, filed Feb. 4, 2020.
U.S. Appl. No. 16/815,089, filed Mar. 11, 2020, Igawa et al.
U.S. Appl. No. 16/825,513, filed Mar. 20, 2020, Hattori et al.
Adlersberg, "The Immunoglobulin Hinge (Interdomain) Region," Ric Clin Lab, Jul.-Sep. 1976, 6(3):191-205.
Alprolix® Intravenous, 2019, 16 pages (with English translation).
Astermark et al., "A randomized comparison of bypassing agents in hemophilia complicated by an inhibitor: the FEIBA NovoSeven Comparative (FENOC) Study," Blood, Jan. 15, 2007, 109(2):546-551. Epub Sep. 21, 2006.
Collins et al., "Implications of coagulation factor VIII and IX pharmaco-kinetics in the prophylactic treatment of haemophilia," Haemophilia, Jan. 2011, 17(1):2-10. doi: 10.1111/j.1365-2516.2010.02370.x. Epub Aug. 22, 2010.
Coppola et al., "Acquired Inhibitors of Coagulation Factors: Part I—Acquired Hemophilia A," Semin Thromb Hemost, Jul. 2012, 38(5):433-446. doi: 10.1055/s-0032-1315757. Epub Jun. 27, 2012.
"FDA Grants Roche Breakthrough Therapy Designation on Hemophilia Drug," BioPharm International, UBM, Apr. 19, 2018, printed from the Internet http:/www.biopharoninternational.conn/fda-grants-roche-breakthrough-therapy-designation-hemophilia-drug, 1 page.

Franchini et al., "Acquired haemophilia A: A 2013 update," Thromb Haemost, Dec. 2013, 110(6):1114-1120. doi:10.1160/TH13-05-0363. Epub Sep. 5, 2013.
Guidelines for the Management of Hemophilia, World Federation of Hemophilia, 2005, 52 pages.
Hagiwara et al., "Effect of Emicizumab in improving coagulation ability in the presence of minor amount of Factor IX," Japanese Journal of Thrombosis and Hemostasis, 2017, 28(2):1900-012 (with English translation).
"Hemostatic Treatment Guidelines for Inhibitor-negative Hemophilia Patients," Japanese Journal of Thrombosis and Hemostasis, 2013, 24(6):619-639 (with English translation).
"Hemostatic Treatment Guidelines for Inhibitor-positive Hemophilia Patients," Japanese Journal of Thrombosis and Hemostasis, 2013, 24(6):640-658 (with English translation).
Kim et al., "Antibody light chain variable domains and their biophysically improved versions for human immunotherapy," mAbs, Jan.-Feb. 2014, 6(1):219-235. doi: 10.4161/mabs.26844.
Kitazawa, "Bispecific FIX-FX antibody for bypass therapy," 12th NHF Workshop on New Technologies and Gene Therapy, Chugai Pharmaceutical Co., Ltd, Oct. 24, 2014, 11 pages.
Kitazawa, "Bispecific FIX-FX antibody for bypass therapy," 12th NHF Workshop on Novel Technologies and Gene Transfer for Hemophelia, Chugai Pharmaceutical Co., Ltd, Oct. 24, 2014, 4 pages.
Kruse-Jarres, "Inhibitors: our greatest challenge. Can we minimize the incidence?," Haemophilia, Jan. 2013, 19 Suppl 1:2-7. doi: 10.1111/hae. 12049.
Lillicrap, "von Willebrand disease: advances in pathogenetic understanding, diagnosis and therapy," Blood, Nov. 28, 2013, 122(23):3735-3740. doi: 10.1182/blood-2013-06-498303. Epub Sep. 24, 2013.
Mahlangu et al., "Emicizumab Prophylaxis in Patients Who Have Hemophilia A without Inhibitors," N Engl J Med, Aug. 30, 2018, 379(9):811-822.
Male et al., Chapter 3 "Antibodies," Immunology, 7th Edition, 2006, published by Elsevier Ltd., pp. 59-86.
Minami et al., "Bispecific Antibody ACE910 Improves Coagulation Function in Plasma of Patients with Factor XI-Deficiency," Japanese Journal of Thrombosis and Hemostasis, 2015, 26(2):188 0-024 (with English translation).
Miyata, "Factor IX Abnormality—Molecular Defects of Factor IX," Japanese Journal of Thrombosis and Hemostasis, 1991, 2(1):1-11 (with English translation).
Nishimura et al., "Faxtor IX Fukuoka—Substitution of $ASN^{92}$ by His in the second epidermal growth factor-like domain results in defective interaction with factors VIIIa/X," Journal of Biological Chemistry, Nov. 15, 1993, 268(32):24041-24046.
Nogami, "Bispecific Antibody that Substitutes for Factor VIII in the Treatment of Childhood Hemophilia A," The Japanese Journal of Pediatric Hematology/Oncology, 2016, 53(2):69-74 (with English translation).
Shima, "The Forefront and Prospects of Hemophilia Treatment," The Journal of the Japan Pediatric Society, Mar. 1, 2017, 121(3):543-552 (with English translation).
Shima, "New hemophilia treatment by a bispecific antibody to factors IXa and X," http://www2.convention.co.jp/76jsh.http://www2.convention.co.jp/76jsh/japanese/schedule.html. https://www.meetingschedule.com/76jsh/schedule.html and https://www.meeting-schedule.com/76jsh/abstract.html, Oct. 24, 2014 (with English abstract).
Tarantino et al., "Safety of human plasma-derived clotting factor products and their role in haemostasis in patients with haemophilia: meeting report," Haemophilia, Sep. 2007, 13(5):663-669.
U.S. Appl. No. 16/099,341, Teranishi et al., filed Nov. 16, 2018.
U.S. Appl. No. 16/448,088, Igawa et al., filed Jun. 21, 2019.
U.S. Appl. No. 16/432,790, Yoneyama, filed Jun. 5, 2019.
U.S. Appl. No. 10/560,098, Yoneyama, filed Jun. 5, 2019.
U.S. Appl. No. 16/432,790, filed Jun. 5, 2019, Yoneyama.
U.S. Appl. No. 16/448,088, filed Jun. 21, 2019, Igawa et al.
U.S. Appl. No. 16/459,791, filed Jul. 2, 2019, Igawa et al.
Baker et al., "Immunogenicity of protein therapeutics—The key causes, consequences and challenges," Self Nonself, Oct. 2010, 1(4):314-322.

(56) References Cited

OTHER PUBLICATIONS

Barrabes et al., "Effect of sialic acid content on glycoprotein pI analyzed by two-dimensional electrophoresis," Electrophoresis, Sep. 2010, 31(17):2903-12. doi: 10.1002/elps.200900764.
Cardoso et al., "Neutralizing Human Anti Crotoxin scFv Isolated from a Nonimmunized Phage Library," Scand J Immunol, Apr. 2000, 51(4):337-44.
Chugai Seiyaku Kabushiki Kaisha's letter dated Jun. 12, 2013, regarding oral proceedings scheduled on Jun. 26, 2013, in App. Ser. No. EP 06 73 0769.4-1412 (Annex A submitted with patentee's letter dated Jun. 12, 2013).
Davie, "A Brief Historical Review of the Waterfall/Cascade of Blood Coagulation," J Biol Chem, Dec. 19, 2003, 278(51):50819-32. Epub Oct. 21, 2003.
Decision of the Opposition Division in EP 2 275 443, dated Apr. 26, 2018 (submitted on May 24, 2019 by the Patentee during EPO Opposition Procedure for EP 2 202 245), 29 pages.
Declaration of Taichi Kuramochi (submitted on May 24, 2019 by the Patentee during EPO Opposition Procedure for EP 2 202 245), 11 pages.
Declaration of Dr. Anette Henriksen, signed Apr. 17, 2019 (submitted by the Opponent during EPO opposition procedure for EP 2 006 381).
Edelman et al., "The Covalent Structure of an Entire γG Immunoglobulin Molecule," Proc Natl Acad Sci USA, May 1969, 63(1):78-85.
Granted claims of EP 2 275 443 (submitted on May 24, 2019 by the Patentee during EPO Opposition Procedure for EP 2 202 245), 1 page.
Griffiths et al., Human anti-self antibodies with high specificity from phage display libraries, EMBO J, Feb. 1993, 12(2):725-34.
Igawa, "Next Generation Antibody Therapeutics Using Bispecific Antibody Technology," The Pharmaceutical Society of Japan, Jul. 1, 2017, vol. 137, pp. 831-836 (with English translation).
Igawa, "Technological Development of Bispecific Antibodies and Creation of Pharmaceuticals," Experimental Medicine, Jul. 1, 2018, vol. 36, pp. 1823-1829 (with English translation).
Igawa, "Innovative Technology to develop Bispecific Antibody," CSJ Current Review 30, Aug. 30, 2018, pp. 157-163 (with English translation).
Maeda et al., "Novel Antibody Modification Techniques and their Application to Antibody Therapeutics," Farumashia, 2015, vol. 51, pp. 424-428 (with English translation).
Mariuzza, "The Structural Basis of Antigen-Antibody Recognition," Annu. Rev. Biophys. Biophys. Chem., Jun. 1987, 16:139-159.
Schmidt et al., Chapter 18, Section 18.6, "Hemostasis and Coagulation," Human Physiology, Second Edition, Springer-Verlag, 1989, pp. 418-423.
Schmidt et al., Chapter 29, "Enzymes of the pancreatic juice," Human Physiology, Second Edition, Springer-Verlag, 1989, p. 716.
Supplemental Material to Raposo et al., "Epitope-specific antibody response is controlled by immunoglobulin VH polymorphisms," J Exp Med, Mar. 10, 2014, 211(3):405-11. doi: 10.1084/jem. 20130968. Epub Feb. 17, 2014 (submitted on May 24, 2019 by the Patentee during EPO Opposition Procedure for EP 2 202 245), 4 pages.
Yoneyama et al., "A Pharmacometric Approach to Substitute for a Conventional Dose-Finding Study in Rare Diseases: Example of Phase III Dose Selection for Emicizumab in Hemophilia A," Clin Pharmacokinet, Sep. 2018, 57(9):1123-1134. doi: 10.1007/s40262-017-0616-3.
Labrijn et al., "Therapeutic IgG4 antibodies engage in Fab-arm exchange with endogenous human IgG4 in vivo," Nat Biotechnol, Aug. 2009, 27(8): 767-771.
Lund et al., "Multiple interactions of IgG with its core oligosaccharide can modulate recognition by complement and human Fc gamma receptor I and influence the synthesis of its oligosaccharide chains," The Journal of Immunology, Dec. 1, 1996, 157(11):4963-4969.

Wu et al., "Humanization of a Murine Monoclonal Antibody by Simultaneous Optimization of Framework and CDR Residues," J Mol Biol, Nov. 19, 1999, 294(1):151-162.
U.S. Appl. No. 15/512,187, Nogami et al. fileded Mar. 17 2017.
U.S. Appl. No. 11/910,836, Hattori et al., filed Jan. 12, 2006 (abandoned).
U.S. Appl. No. 16/936,575, filed Jul. 23, 2020, Teranishi et al.
Wenig et al., "Structure of the streptococcal endopeptidase IdeS, a cysteine proteinase with strict specificity for IgG," Proc Natl Acad Sci, Dec. 14, 2004, 101:17371-17376.
U.S. Appl. No. 10/560,098, Miyazaki et al., filed Apr. 28, 2006 (abandoned).
U.S. Appl. No. 16/099,341, filed Nov. 16, 2018, Teranishi et al.
Abe et al., "Novel Protein A Resin: Synthetic Polymer Matrix Design Impact on Antibody Binding Capacity," JSR Technical Review, No. 119, 2012, pp. 1-5 (with English translation).
Abe et al., "Purification of monoclonal antibodies with light-chain heterogeneity produced by mouse hybridomas raised with NS-1 myelomas: application of hydrophobic interaction high-performance liquid chromatography," J. Biochem. Biophys. Methods, 27:215-227 (1993).
Adams et al., "Humanization of a recombinant monoclonal antibody to produce a therapeutic HER dimerization inhibitor, pertuzumab," Cancer Immunol. Immunother., 55:717-727 (2006).
Algonomics—Tripole® applications [online] Retrieved from the Internet on Feb. 29, 2012: http://web.archive.org/web20090221052902/http://www.algonomics.com/proteinengineering/tripole_applications.php, 2 pages (Feb. 21, 2009).
Allard et al., "Antigen binding properties of highly purified bispecific antibodies," Mol Immunol., Oct. 1992, 29(10):1219-27.
Almagro et al., "Humanization of antibodies," Front Biosci., 13:1619-33 (2008).
Amersdorfer et al., GenPept Accession No. AAC26541; 2001.8.1.
Amersham Biosciences, "Affinity Chromatography: Principles and Methods," Edition AD, pp. 16-18, 137 (2002).
Amersham Biosciences, "Protein Purification Handbook, " Edition AC, 98 pages (2001).
Angal et al., "A single amino acid substitution abolishes the heterogeneity of chimeric mouse/human (IgG4) antibody," Mol. Immunol., 30:105-108 (1993).
Armour et al., "Recombinant human IgG molecules lacking Fcgamma receptor I binding and monocyte triggering activities," Eur. J. Immunol., 29(8):2613-24 (1999).
Arndt et al., "Factors influencing the dimer to monomer transition of an antibody single-chain Fv fragment," Biochemistry, Sep. 15, 1998, 37(37):12918-26.
Arndt et al., "Helix-stabilized Fv (hsFv) antibody fragments: substituting the constant domains of a Fab fragment for a heterodimeric coiled-coil domain," J. Mol. Biol., 312:221-228 (2001).
Aslan et al., "Engineering a novel, stable dimeric streptavidin with lower isoelectric point," J. Biotechnol., 128(2):213-25 (2007).
Asselta et al., "Factor V Deficiency," Semin. Thromb. Hemost., 35:382-389 (2009).
Atwell et al., "Stable heterodimers from remodeling the domain interface of a homodimer using a phage display library," J. Mol. Biol., 270:26-35 (1997).
Baerga-Ortiz et al., "Two different proteins that compete for binding to thrombin have opposite kinetic and thermodynamic profiles," Protein Sci., 13(1):166-76 (2004).
Bajaj et al., "A Monoclonal Antibody to Factor IX That Inhibits the Factor VIII:Ca Potentiation of Factor X Activation," J. Biol. Chem., 260(21):11574-11580 (1985).
Bartelds et al., "Clinical response to adalimumab: relationship to anti-adalimumab antibodies and serum adalimumab concentrations in rheumatoid arthritis," Ann Rheum. Dis., 66:921-926 (2007).
Batra et al., "Pharmacokinetics and biodistribution of genetically engineered antibodies," Curr Opin Biotechnol., Dec. 2002, 13(6):603-8.
Bayry et al., "Immuno affinity purification of foot and mouth disease virus type specific antibodies using recombinant protein adsorbed to polystyrene wells," J. Virol. Methods, 81:21-30 (1999).

(56) References Cited

OTHER PUBLICATIONS

Bebbington et al., "High-Level Expression of a Recombinant Antibody from Myeloma Cells Using a Glutamine Synthetase Gene as an Amplifiable Selectable Marker," Biotechnology (NY), 10:169-175 (1992).
Bender et al., "Immunogenicity, efficacy and adverse events of adalimumab in RA patients," Rheumatol. Int., 27:269-274 (2007).
Bessos et al., "The characterization of a panel of monoclonal antibodies to human coagulation factor IX," Thrombosis Research, 40:863-867 (1985).
Binz et al., "Engineering novel binding proteins from nonimmunoglobulin domains," Nat. Biotechnol., 23:1257-68 (2005).
Blazar, "Infusion of Anti-B7.1 (CD80) and Anti-B7.2 (CD86) Monoclonal Antibodies Inhibits Murine Graft-Versus-Host Disease Lethality in Part Via Direct Effects on CD4+ and CD8+ T Cells," J. Immunol., 157:3250-59 (1996).
Bolton-Maggs et al., "Haemophilias A and B," The Lancet, 361:1801-1809 (2003).
Borrebaeck et al., "Antibody evolution beyond Nature," Nat Biotechnol., Dec. 2002, 20(12):1189-90.
Bos et al., "Enhanced Transfection of a Bacterial Plasmid into Hybridoma Cells by Electroporation: Application for the Selection of Hybrid Hybridoma (Quadroma) Cell Lines," Hybridoma, 11:41-51 (1992).
Bowen, "Haemophilia A and haemophilia B: molecular insights," Mol Pathol., Feb. 2002, 55(1):1-18.
Bowie et al., "Deciphering the Message in Protein Sequences: Tolerance to Amino Acid Substitutions," Science, Mar. 16, 1990, 247:1306-1310.
Branden et al., "Recognition of Foreign Molecules by the Immune System," Introduction to Protein Structure, 2d Ed., Garland Publishing, pp. 299-323 (1999).
Brandstetter et al., "X-ray structure of clotting factor IXa: active site and module structure related to Xase activity and hemophilia B," Proc Natl Acad Sci USA, Oct. 10, 1995, 92(21):9796-800.
Brennan et al., "Preparation of Bispecific Antibodies by Chemical Recombination of Monoclonal Immunoglobulin G1 Fragments," Science, 229(4708):81-83 (1985).
Brinkman et al. "Phospholipid-binding domain of factor VIII is involved in endothelial cell-mediated activation of factor X by factor IXa," Arterioscler. Thromb. Vasc. Biol., 22(3):511-516 (2002).
Brown et al., "Tolerance of single, but not multiple, amino acid replacements in antibody $V_H$ CDR 2: a means of minimizing B cell wastage from somatic hypermutation?," J. Immunol., 156(9):3285-91 (1996).
Burges et al., "Effective relief of malignant ascites in patients with advanced ovarian cancer by a trifunctional anti-EpCAM x anti-CD3 antibody: a phase I/II study," Clin. Cancer Res., 13(13):3899-905 (2007).
Burgess, "Possible dissociation of the heparin-binding and mitogenic activities of heparin-binding (acidic fibroblast) growth factor-1 from its receptor-binding activities by site-directed mutagenesis of a single lysine residue," J. Cell. Biol., 1990, 111:2129-2138.
Calbiochem® Buffers, "A guide for the preparation and use of buffers in biological systems," by Chandra Mohan, Ph.D., Copyright@ 2003 EMD Biosciences, Inc., an Affiliate of Merck KGaA, Darmstadt, Germany, 37 pages.
Carter, "Bispecific human IgG by design," J. Immunol. Methods, Feb. 1, 2001, 248(1-2):7-15.
Chamow et al., "A humanized, bispecific immunoadhesin-antibody that retargets CD3+ effectors to kill HIV-1-infected cells," J. Immunol., 153(9):4268-80 (1994).
Chatellier et al., "Functional mapping of conserved residues located at the VL and VH domain interface of a Fab," J. Mol. Biol., Nov. 22, 1996, 264(1):1-6.
Chau et al., "HuM291(Nuvion), a humanized Fc receptor-nonbinding antibody against CD3, anergizes peripheral blood T cells as partial agonist of the T cell receptor," Transplantation., 71(7):941-50 (2001).
Chen et al., "Selection and Analysis of an Optimized Anti-VEGF Antibody: Crystal Structure of an Affinity-matured Fab in Complex with Antigen," J. Mol Biol., 293(4):865-81 (Nov. 1999).
Chen et al., "Defective secretion of an immunoglobulin caused by mutations in the heavy chain complementarity determining region 2," J. Exp. Med., 180(2):577-86 (1994).
Chen et al., "Generation and analysis of random point mutations in an antibody CDR2 sequence: many mutated antibodies lose their ability to bind antigen," J. Exp. Med., 176(3):855-66 (1992).
Chirino et al., "Minimizing the immunogenicity of protein therapeutics," Drug Discov. Today., 9:82-90 (2004).
Choi et al., "Crystal structures of immunoglobulin Fc heterodimers reveal the molecular basis for heterodimer formation," Mol Immunol, Jun. 2015, 65(2):377-83. doi: 10.1016/j.molimm.2015.02.017. Epub Mar. 2, 2015.
Choi et al., "Engineering of Immunoglobulin Fc Heterodimers Using Yeast Surface-Displayed Combinatorial Fc Library Screening," PLoS One, Dec. 16, 2015, 10(12):e0145349. doi: 10.1371/journal.pone.0145349. eCollection 2015.
Chu et al., "Accumulation of succinimide in a recombinant monoclonal antibody in mildly acidic buffers under elevated temperatures," Pharm. Res., 24(6):1145-56 (2007).
Chugai Seiyaku Kabushiki Kaisha's letter dated Jun. 12, 2013, regarding oral proceedings scheduled on Jun. 26, 2013, in App. Ser. No. EP 06 73 0769.4-1412.
Cole et al., "Human IgG2 variants of chimeric anti-CD3 are nonmitogenic to T cells," J. Immunol., 159(7):3613-21 (1997).
Coloma et al., "Position effects of variable region carbohydrate on the affinity and in vivo behavior of an anti-(1→6) dextran antibody," J Immunol., Feb. 15, 1999, 162(4):2162-70.
Comper et al., "Charge selectivity in kidney ultrafiltration," Kidney Int., 47:1242-51 (1995).
Cordoba et al., "Non-enzymatic hinge region fragmentation of antibodies in solution," J. Chromatogr. B. Analyt. Technol. Biomed. Life Sci., 818(2):115-21 (2005).
Couto et al., "Anti-BA46 Monoclonal Antibody Mc3: Humanization Using a Novel Positional Consensus and in Vivo and in Vitro Characterization," Cancer Res., 55:1717-22 (1995).
Cruse et al., Atlas of Immunology, CRC Press LLC, 2004, excerpt from Chapter 3 "Antigens and Immunogens," p. 109.
Dahlback, "Blood coagulation," Lancet, 355(9215):1627-32 (2000).
Dall'Acqua et al., "Antibody humanization by framework shuffling," Methods, 36(1):43-60 (2005).
Dall'Acqua et al., "Properties of Human IgG1s Engineered for Enhanced Binding to the Neonatal Fc Receptor (FcRn)", J Biol Chem, Aug. 18, 2006, 281(33):23514-24. Epub Jun. 21, 2006.
Damschroder et al., "Framework shuffling of antibodies to reduce immunogenicity and manipulate functional and biophysical properties," Mol. Immunol., 44(11):3049-60 (2007).
Davie et al., "The coagulation cascade: Initiation, maintenance, and regulation," Biochemistry, 30(43):10363-10370 (1991).
Davies et al., "Antibody VH domains as small recognition units," Biotechnology (N.Y.), May 1995, 13(5):475-9.
De Groot et al., "De-immunization of therapeutic proteins by T-cell epitope modification," Dev. Biol. (Basel), 122:171-94 (2005).
De Pascalis et al., "Grafting of 'abbreviated' complementary-determining regions containing specificity-determining residues essential for ligand contact to engineer a less immunogenic humanized monoclonal antibody," Journal of Immunology, Sep. 15, 2002, 169(6):3076-3084.
Decision of the Opposition Division for EP 2 006 381 on Jul. 25, 2018, 17 pages.
Deen et al., "Structural determinants of glomerular permeability," Am. J. Physiol. Renal. Physiol., 281:F579-F596 (2001).
Del Rio et al., "An Engineered Penicillin Acylase with Altered Surface Charge Is More Stable in Alkaline pH," Ann. NY Acad. Sci., 799:61-64 (1996).
Deng et al., "An Agonist Murine Monoclonal Antibody to the Human c-Mpl Receptor Stimulates Megakaryocytopoiesis," Blood, 92:1981-88 (1998).
Diaz et al., "Effects of engineering charged amino acids in the $C_H3$ domains on antibody heavy chain dimerization," Philippine Science Letters, 2011, 4(1):48-55.

(56) References Cited

OTHER PUBLICATIONS

Dillon et al., "Structural and functional characterization of disulfide isoforms of the human IgG2 subclass," J. Biol. Chem., 283:16206-15 (2008).
Dumont et al., "Monomeric Fc fusions: impact on pharmacokinetic and biological activity of protein therapeutics," BioDrugs, 20(3):151-60 (2006).
EPO Register Extract EP 1915397 (document submitted in EP opposition and posted by EPO on Feb. 2, 2018); 4 pages.
Ewert et al., "Stability improvement of antibodies for extracellular and intracellular applications: CDR grafting to stable frameworks and structure-based framework engineering," Methods, Oct. 2004, 34:184-199.
Fay et al., "The size of human factor VIII heterodimers and the effects produced by thrombin," Biochim. Biophys. Acta., Jun. 23, 1986, 871(3):268-78.
Fay et al., "Chapter 2B Nonenzymatic cofactors: factor VIII," Comprehensive Biochemistry, 13:35-37 (1986).
Fay, "Activation of factor VIII and mechanisms of cofactor action," Blood Rev., Mar. 2004, 18(1):1-15.
Feige et al., "How antibodies fold," Trends Biochem Sci, Apr. 2010, 35(4):189-98. doi: 10.1016/j.tibs.2009.11.005. Epub Dec. 21, 2009 .
Figini et al., "In vitro assembly of repertoires of antibody chains on the surface of phage by renaturation," J Mol Biol., May 27, 1994, 239(1):68-78.
Francois et al., "Construction of a Bispecific Antibody Reacting with the α- and β-Chains of the Human IL-2 Receptor," J. Immunol., 150:4610-4619 (1993).
Fujii, "Antibody affinity maturation by random mutagenesis," Methods Mol. Biol., 248:345-59 (2004).
Gatiyatov et al., "Antiself Antibodies Against Blood Coagulation Factors," Siberian Medical Journal, Jun. 2011, 103(4):34-8 (with English translation).
GE Healthcare Life Sciences, Dynamic binding capacity study on MabSelect SuReTM LX for capturing high-titer monoclonal antibodies, Application note 28-9875-25-AA, 2011, [online], [retrieved on Feb. 17, 2017], retrieved from the internet: http://www.processdevelopmentforum.com/images/articles/28-9875-25_AA_AN_DBC_study_on MabSelect_SuRe_LX_final.pdf>, 6 pages.
Gelderman et al., "The inhibitory effect of CD46, CD55, and CD59 on complement activation after immunotherapeutic treatment of cervical carcinoma cells with monoclonal antibodies or bispecific monoclonal antibodies," Lab Invest., 82(4):483-93 (2002).
Gerstner et al., "Sequence plasticity in the antigen-binding site of a therapeutic anti-HER2 antibody," J. Mol. Biol., 321(5):851-62 (2002).
Gessner et al., "The IgG Fc receptor family," Ann. Hematol., 76:231-248 (1998).
Ghetie et al., "FcRn: the MHC class I-related receptor that is more than an IgG transporter," Immunol. Today, 18:592-598 (1997).
Ghetie et al., "Increasing the serum persistence of an IgG fragment by random mutagenesis," Nat. Biotechnol., 15:637-640 (1997).
Ghetie et al., "Multiple roles for the major histocompatibility complex class I-related receptor FcRn," Annu. Rev. Immunol., 18:739-766 (2000).
Gobburu et al., "Pharmacokinetics/dynamics of 5c8, a monoclonal antibody to CD154 (CD40 ligand) suppression of an immune response in monkeys," J. Pharmacol. Exp. Ther., 286:925-930 (1998).
Golay et al., "Mechanism of action of therapeutic monoclonal antibodies: Promises and pitfalls of in vitro and in vivo assays," Archives of Biochemistry and Biophysics, 526:146-153 (2012).
Gonzales et al., "Minimizing the immunogenicity of antibodies for clinical application," Tumour Biol., Jan.-Feb. 2005, 26(1):31-43.
Goode et al., "The glomerular basement membrane charge-selectivity barrier: an oversimplified concept?," Nephrol. Dial. Transplant., 11:1714-16 (1996).
Goulet et al., "Kinetic mechanism of controlled Fab-arm exchange for the formation of bispecific immunoglobulin G1 antibodies," J Biol Chem, Jan. 12, 2018, 293(2):651-661. doi:10.1074/jbc.RA117.000303. Epub Nov. 17, 2017.
Gramer et al., "Production of stable bispecific IgGl by controlled Fab-arm exchange: scalability from bench to large-scale manufacturing by application of standard approaches," mAbs, Nov.-Dec. 2013, 5(6):962-73. doi: 10.4161/mabs.26233. Epub Aug. 22, 2013.
Graves et al., "Molecular modeling and preclinical evaluation of the humanized NR-LU-13 antibody," Clin. Cancer Res., 5:899-908 (1999).
Griffin et al., "Analysis of heavy and light chain sequences of conventional camelid antibodies from *Camelus dromedarius* and *Camelus bactrianus* species," J Immunol Methods, Mar. 2014, 405:35-46. doi: 10.1016/j.jim.2014.01.003. Epub Jan. 18, 2014.
Grosse-Hovest et al., "A recombinant bispecific single-chain antibody induces targeted, supra-agonistic CD28-stimulation and tumor cell killing," European Journal of Immunology, 33(5):1334-1340 (2003).
Gunasekaran et al., "Enhancing antibody Fc heterodimer formation through electrostatic steering effects: applications to bispecific molecules and monovalent IgG," J. Biol. Chem., 285(25):19637-46 (2010).
Gupta et al., "Affinity chromatography and co-chromatography of bispecific monoclonal antibody immunoconjugates," J. Biochem. Biophys. Methods, 51:203-216 (2002).
Guyre et al., "Increased potency of Fc-receptor-targeted antigens," Cancer Immunol. Immunother., 45(3-4):146-8 (1997).
Haagen et al., "Unprimed CD4+ and CD8+ T cells can be rapidly activated by a CD3 x CD19 bispecific antibody to proliferate and become cytotoxic," Cancer Immunol Immunother., Dec. 1994, 39(6):391-6.
Hamers-Casterman et al., "Naturally occurring antibodies devoid of light chains," Nature, Jun. 3, 1993, 363(6428):446-8.
Hämmerling et al., "Use of Hybrid Antibody with Anti-γG and Anti-Ferritin Specificities in Locating Cell Surface Antigens by Electron Microscopy," J. Exp. Med., 128:1461-1473 (1968).
Hanson et al., "Catalytic antibodies and their applications," Curr. Opin. Biotechnol., 16:631-636 (2005).
Hardisty et al., "A One-stage Factor VIII (Antihaemophilic Globulin) Assay and its Use on Venous and Capillary Plasma," Thromb Diath Haemorrh, May 15, 1962, 7:215-28.
Hattori, "Introduction of ART-Ig and application to hemophilia A treatment," Chugai Seiyaku ni Okeru Dokuji No. Kakushinteki Kotai Gijutsu, Dec. 2012, 18:42-57 (with English translation).
He et al., "Humanization and pharmacokinetics of a monoclonal antibody with specificity for both E- and P-selectin," J. Immunol., 160:1029-35 (1998).
Helfrich et al., "A rapid and versatile method for harnessing scFv antibody fragments with various biological effector functions," J. Immunol. Methods, 237(1-2):131-45 (2000).
Hemlibra (emicizumab-kxwh) Prescribing Information, U.S. Food and Drug Administration, Nov. 2017, 16 pages.
Hinton et al., "An engineered human IgGl antibody with longer serum half-life," J. Immunol., Jan. 1, 2006, 176:346-56.
Hinton et al., "Engineered human IgG antibodies with longer serum half-lives in primates," J. Biol. Chem., 279(8):6213-6 (2004).
Hird et al., "Tumour localisation with a radioactively labelled reshaped human monoclonal antibody," Br J Cancer, Nov. 1991, 64(5):911-4.
Hoad et al. "Characterization of monoclonal antibodies to human factor X.Xa: Initial observations with a quantitative ELISA procedure," J. Immunol. Methods, 136(2):269-278 (1991).
Holliger et al., "'Diabodies': Small bivalent and bispecific antibody fragments," Proc. Natl. Acad. Sci. USA, 90:6444-6448 (1993).
Hombach et al., "A CD16/CD30 bispecific monoclonal antibody induces lysis of Hodgkin's cells by unstimulated natural killer cells in vitro and in vivo," Int J Cancer, 55:830-6 (1993).
Hong et al., "Enhanced cellular uptake and transport of polyclonal immunoglobulin G and fab after their cationization," J Drug Target., 2000, 8(2):67-77.

(56) References Cited

OTHER PUBLICATIONS

Hotzel et al., "A strategy for risk mitigation of antibodies with fast clearance," mAbs, Nov.-Dec. 2012, 4(6):753-60. doi: 10.4161/mabs.22189.
Hoyer, L.W., "The factor VIII complex: structure and function," Blood, Jul. 1981, 58(1):1-13 ).
Hozumi et al., "Evidence for somatic rearrangement of immunoglobulin genes coding for variable and constant regions," Proc Natl Acad Sci USA, Oct. 1976, 73(10):3628-32.
Hsia et al., "Treatment of acquired factor X inhibitor by plasma exchange with concomitant intravenous immunoglobulin and corticosteroids," Am. J. Hematol., 83:318-320 (2008).
Hu et al., "Development and characterization of a novel fusion protein composed of a human IgG1 heavy chain constant region and a single-chain fragment variable antibody against Venezuelan equine encephalitis virus," J Biochem., 133(1):59-66 (2003).
Huse et al., "Generation of a Large Combinatorial Library of the Immunoglobulin Repertoire in Phage Lambda," Science, 246:1275-1281 (1989).
Hwang et al., "Use of human germline genes in a CDR homology-based approach to antibody humanization," Methods, 36:35-42 (2005).
Igawa et al., "Generation of a Novel Bispecific Antibody (ACE910) Against Activated Factor IX and Factor X Mimicking the Function of Factor VIII Cofactor Activity," Blood, 2012, vol. 120, No. 21, p. 1126.
Igawa et al., "Antibody recycling by engineered pH-dependent antigen binding improves the duration of antigen neutralization," Nat. Biotechnol., 28(11):1203-7 (2010).
Igawa et al., "Engineering the variable region of therapeutic IgG antibodies," mAbs, 3(3):243-52 (2011).
Igawa et al., "Reduced elimination of IgG antibodies by engineering the variable region," Protein Eng. Des. Sel., 23(5):385-92 (2010).
Igawa et al., "VH/VL interface engineering to promote selective expression and inhibit conformational isomerization of thrombopoietin receptor agonist single-chain diabody," Protein Eng Des Sel., Aug. 2010, 23(8):667-77. doi: 10.1093/protein/gzq034. Epub Jun. 24, 2010.
IMGT Scientific charts depicting the correspondence between Eu and Kabat numberings for the human IgG constant region, created May 17, 2001 and last updated Aug. 13, 2014 (Exhibit A).
IMGT Scientific charts depicting the correspondence between Eu and Kabat numberings for the human IgG constant region, created May 17, 2001 and last updated Aug. 13, 2014 (Exhibit B).
Ito et al., "The His-probe method: effects of histidine residues introduced into the complementarity-determining regions of antibodies on antigen-antibody interactions at different pH values," FEBS Lett., 309:85-88 (1992).
Iwahashi et al., "CDR substitutions of a humanized monoclonal antibody (CC49): contributions of individual CDRs to antigen binding and immunogenicity," Mol Immunol., Oct.-Nov. 1999 36(15-16):1079-91.
Jackman et al., "Development of a two-part strategy to identify a therapeutic human bispecific antibody that inhibits IgE receptor signaling," J Biol Chem., Jul. 2, 2010, 285(27): 20850-9. doi: 10.1074/jbc.M110.113910. Epub May 5, 2010.
Jain et al., "Engineering antibodies for clinical applications," Trends Biotechnol., 25(7):307-16 (2007).
Janeway et al., "Structure of the Antibody Molecule and Immunoglobulin Genes," Immunobiology, 3$^{rd}$ Edition, Garland Press, 3:1-3:11 (1997).
Janeway et al., "Antigen Recognition by B-cell and T-cell Receptors," Immunobiology, 5th edition, Chapter 3, pp. 93-122 (2001).
Janeway et al., "The Generation of Lymphocyte Antigen Receptors," Immunobiology, 5th edition, Chapter 4, pp. 123-154 (2001).
Jendeberg et al., "Engineering of Fc(1) and Fc(3) from human immunoglobulin G to analyse subclass specificity for staphylococcal protein A," J. Immunol. Methods., 201(1):25-34 (1997).
Jirholt et al., "Exploiting sequence space: shuffling in vivo formed complementarity determining regions into a master framework," Gene., Jul. 30, 1998, 215(2):471-6.
Johnson et al., "Cation exchange-HPLC and mass spectrometry reveal C-terminal amidation of an IgG1 heavy chain," Anal. Biochem., 360:75-83 (2007).
Johnson et al., "Kabat Database and its applications: 30 years after the first variability plot," Nucleic Acids Research, 2000, 28(1):214-18.
Jones et al., "Identification and removal of a promiscuous CD4+ T cell epitope from the C1 domain of factor VIII," Thromb. Haemost., 3:991-1000 (2005).
Jung et al., "The importance of framework residues H6, H7 and H10 in antibody heavy chains: experimental evidence for a new structural subclassification of antibody V(H) domains," J. Mol. Biol., Jun. 8, 2001, 309(3):701-16.
Kabat et al., Sequence of Proteins of Immunological Interest, 5$^{th}$ Edition 1991, p. 690 and p. 693.
Kabsch et al., "On the use of sequence homologies to predict protein structure: identical pentapeptides can have completely different conformations," Proc Natl Acad Sci USA, Feb. 1984, 81(4):1075-8.
Kang et al., "Linkage of recognition and replication functions by assembling combinatorial antibody Fab libraries along phage surfaces," Proc. Natl. Acad. Sci. USA, 88:4363-4366 (1991).
Karpovsky et al., "Production of Target-Specific Effector Cells Using Hetero-Cross-Linked Aggregates Containing Anti-Target Cell and Anti-Fcγ Receptor Antibodies," J. Exp. Med., 160:1686-1701 (1984).
Kashmiri et al., "Generation, characterization, and in vivo studies of humanized anticarcinoma antibody CC49," Hybridoma, 14:461-473 (1995).
Kasper et al., "A More Uniform Measurement of Factor VIII Inhibitors, " Thromb Diath Haemorrh, Dec. 15, 1975, 34(3):869-72.
Katayose et al., "MUC1-specific targeting immunotherapy with bispecific antibodies: inhibition of xenografted human bile duct carcinoma growth," Cancer Res., 56(18):4205-12 (1996).
Kenanova et al., "Tailoring the pharmacokinetics and positron emission tomography imaging properties of anti-carcinoembryonic antigen single-chain Fv-Fc antibody fragments," Cancer Res., Jan. 15, 2005, 65(2):622-31.
Kerschbaumer et al., "An antibody specific for coagulation factor IX enhances the activity of the intrinsic factor X-activating complex," J. Biol. Chem., 279(39):40445-50 (2004).
Khalifa et al., "Effects on interaction kinetics of mutations at the VH-VL interface of Fabs depend on the structural context," J. Mol. Recognit., May-Jun. 2000, 13(3):127-39.
Khawli et al., "Improved tumor localization and radioimaging with chemically modified monoclonal antibodies," Cancer Biother. Radiopharm., 11:203-215 (1996).
Kim et al., "Antibody Engineering for the Development of Therapeutic Antibodies," Mol. Cells, 20:17-29 (2005).
Kim et al., "Chemical modification to reduce renal uptake of disulfide-bonded variable region fragment of anti-tac monoclonal antibody labeled with 99mTc," Bioconjugate Chem., 10:447-453 (1999).
Kim et al., "Lowering of pI by acylation improves the renal uptake of 99mTc-labeled anti-Tac dsFv: effect of different acylating reagents," Nucl. Med. Biol., 29:795-801 (2002).
Kim et al., "Mammalian type I interferon receptors consists of two subunits: IFNaR1 and IFNaR2," Gene, 196:279-286 (1997).
Kim et al., "Mapping the site on human IgG for binding of the MHC class I-related receptor, FcRn," Eur. J. Immunol., Sep. 1999, 29(9):2819-25.
Kipriyanov et al., "Bispecific tandem diabody for tumor therapy with improved antigen binding and pharmacokinetics," J Mol Biol., Oct. 15, 1999, 293(1):41-56.
Kipriyanov et al., "Effect of Domain Order on the Activity of Bacterially Produced Bispecific Single-chain Fv Antibodies," J Mol Biol., Jun. 27, 2003, 330(1):99-111.
Kitazawa, "Bispecific FIX-FX antibody for bypass therapy," 12th Workshop on Novel Technologies and Gene Transfer for Hemophilia, Oct. 24, 2014.

(56) References Cited

OTHER PUBLICATIONS

Kitazawa et al., "Factor VIIIa-mimetic cofactor activity of a bispecific antibody to factors IX/LXa and X/Xa, emicizumab, depends on its ability to bridge the antigens," Thromb Haemost, Jun. 28, 2017, 117(7):1348-1357. doi: 10.1160/TH17-01-0030. Epub Apr. 28, 2017.
Klein et al., "Progress in overcoming the chain association issue in bispecific heterodimeric IgG antibodies," mAbs, Nov.-Dec. 2012, 4(6):653-63. doi: 10.4161/mabs.21379. Epub Aug. 27, 2012.
Kobayashi et al., "A monoclonal antibody specific for a distinct region of hen egg-white lysozyme," Mol. Immunol., 19:619-30 (1982).
Kobayashi et al., "The pharmacokinetic characteristics of glycolated humanized anti-Tac Fabs are determined by their isoelectric points," Cancer Res., 59:422-430 (1999).
Komissarov et al., "Site-specific mutagenesis of a recombinant anti-single-stranded DNA Fab. Role of heavy chain complementarity-determining region 3 residues in antigen interaction," J. Biol. Chem., 272(43):26864-70 (1997).
Kontermann, R., "Recombinant bispecific antibodies for cancer therapy," Acta Pharmacol Sin., Jan. 2005, 26(1):1-9.
Korn et al., "Recombinant bispecific antibodies for the targeting of adenoviruses to CEA-expressing tumour cells: a comparative analysis of bacterially expressed single-chain diabody and tandem scFv," J Gene Med., Jun. 2004, 6:642-51.
Kranenborg et al., "Development and characterization of anti-renal cell carcinoma x antichelate bispecific monoclonal antibodies for two-phase targeting of renal cell carcinoma," Cancer Res., 55:5864s-5867s (1995).
Kreutz et al., "Efficient bispecific monoclonal antibody purification using gradient thiophilic affinity chromatography," J. Chromatogr. B, 714:161-170 (1998).
Kroesen et al., "Phase I study of intravenously applied bispecific antibody in renal cell cancer patients receiving subcutaneous interleukin 2," Br. J. Cancer, 70:652-661 (1994).
Krudysz-Amblo et al., "Quantitation of anti-factor VIII antibodies in human plasma," Blood, Mar. 12, 2009, 113(11):2587-94. doi: 10.1182/Blood-2008-08-174987. Epub Jan. 14, 2009.
Kufer et al., "A revival of bispecific antibodies," Trends Biotechnol., 22(5):238-44 (2004).
Kumar et al., "The second PDZ domain of INAD is a type I domain involved in binding to eye protein kinase C. Mutational analysis and naturally occurring variants," J. Biol. Chem., Jul. 6, 2001, 276(27):24971-7. Epub May 7, 2001.
Kurfis et al., "Role of Arg182 in the second extracellular loop of angiotensin II receptor AT2 in ligand binding," Biochem. Biophys. Res. Commun., 263:816-819 (1999).
Kurokawa et al., "Enhanced Fibrinolysis by a Bispecific Monoclonal Antibody Reactive to Fibrin and Tissue Plasminogen Activator," Bio/Technology, 7:1163-1167 (1989).
Labrijn et al., "Controlled Fab-arm exchange for the generation of stable bispecific IgG1," Nat Protoc. Oct. 2014, 9(10): 2450-63. doi: 10.1038/nprot.2014.169. Epub Sep. 25, 2014.
Labrijn et al., "Efficient generation of stable bispecific IgG1 by controlled Fab-arm exchange," Pro Natl Acad Sci USA, Mar. 26, 2013, 110(13):5145-50. doi: 10.1073/pnas.1220145110. Epub Mar. 11, 2013.
Labrijn et al., "Species-specific determinants in the IgG CH3 domain enable Fab-arm exchange by affecting the noncovalent CH3-CH3 interaction strength," J Immunol., Sep. 15, 2011, 187(6):3238-46. doi: 10.4049/jimmunol.1003336. Epub Aug. 12, 2011.
Lacroix-Desmazes et al., "Dynamics of factor VIII interactions determine its immunologic fate in hemophilia A," Blood, Jul. 15, 2008, 112(2):240-9. doi: 10.1182/blood-2008-02-124941. Epub May 9, 2008.
Lansdorp et al., "Purification and analysis of bispecific tetrameric antibody complexes," Mol. Immunol., 27:659-666 (1990).
Lapan et al., "Interaction of the A1 Subunit of Factor VIIIa and the Serine Protease Domain of Factor X Identified by Zero-length Cross-linking," Thromb. Haemost., 80:418-422 (1998).
Lazar et al., "Transforming growth factor alpha: mutation of aspartic acid 47 and leucine 48 results in different biological activities," Mol. Cell Biol., 1988, 8:1247-1252.
Le Doussal et al., "Bispecific Monoclonal Antibody-Mediated Targeting of an Indium-111-Labeled DTPA Dimer to Primary Colorectal Tumors: Pharmacokinetics, Biodistribution, Scintigraphy and Immune Response," J. Nucl. Med., 34:1662-1671 (1993).
Le Gall et al., "Effect of linker sequences between the antibody variable domains on the formation, stability and biological activity of a bispecific tandem diabody," Protein Eng Des Sel., Apr. 2004, 17(4):357-66. Epub May 4, 2004.
Lebégue et al., "Production and characterization of hybrid monoclonal antibodies with IgG1/IgG3 double isotype," C R Acad Sci III., 1990, 310(9):377-82.
Lenting et al., "The life cycle of coagulation factor VIII in view of its structure and function," Blood 92(11):3983-3996 (1998).
Leong et al., "Adapting pharmacokinetic properties of a humanized anti-interleukin-8 antibody for therapeutic applications using site-specific pegylation," Cytokine, 16(3):106-19 (2001).
Li et al., "Construction and characterization of a humanized anti-human CD3 monoclonal antibody 12F6 with effective immunoregulation functions," Immunology, Dec. 2005, 116(4):487-98.
Life Technologies (Invitrogen: "ecdysone analogue" and pIND plasmid), Aug. 10, 2012, 2 pages.
Lin et al., "Preclinical pharmacokinetics, interspecies scaling, and tissue distribution of a humanized monoclonal antibody against vascular endothelial growth factor," J Pharmacol Exp Ther., 288(1):371-8 (1999).
Lindhofer et al., "Preferential Species-Restricted Heavy/Light Chain Pairing in Rat/Mouse Quadromas," J. Immunol., 155:219-225 (1995).
Lindsay, "Chapter 4: Determination of the Kinetics and Mechanism of tg-FIX Activation by Factor XIa," 49-75 (2004).
Link et al., "Production and Characterization of a Bispecific IgG Capable of Inducing T-Cell-Mediated Lysis of Malignant B Cells," Blood, 81:3343-3349 (1993).
Liu et al., "Functional interactions between arginine-133 and aspartate-88 in the human reduced folate carrier: evidence for a charge-pair association," Biochem. J., Sep. 1, 2001, 358(Pt 2):511-6.
Liu et al., "Heterogeneity of monoclonal antibodies," J. Pharm. Sci., 97(7):2426-47 (2008).
Lloyd et al., "The production of a bispecific anti-CEA, anti-hapten (4-amino-phthalate) hybrid-hybridoma," J Natl Med Assoc., Oct. 1991, 83(10):901-4.
Lobo et al., "Antibody pharmacokinetics and pharmacodynamics," J. Pharm. Sci., 93:2645-68 (2004).
Löfqvist et al., "Haemophilia prophylaxis in young patients—a long-term follow-up," J. Intern. Med., 241:395-400 (1997).
Lu et al., "Di-diabody: a novel tetravalent bispecific antibody molecule by design," J. Immunol. Methods, 279:219-232 (2003).
Lu et al., "Fab-scFv fusion protein: an efficient approach to production of bispecific antibody fragments," J. Immunol. Methods, 267:213-226 (2002).
MacCallum et al., "Antibody-antigen interactions: contact analysis and binding site topography," J. Mol. Biol., 262:732-45 (1996).
Maeda et al., "pH-dependent receptor/ligand dissociation as a determining factor for intracellular sorting of ligands for epidermal growth factor receptors in rat hepatocytes," J. Control Release, 82(1):71-82 (2002).
Maini et al., "Double-blind randomized controlled clinical trial of the interleukin-6 receptor antagonist, tocilizumab, in European patients with rheumatoid arthritis who had an incomplete response to methotrexate," Arthritis Rheum., 54:2817-29 (2006).
Maity et al., "Equilibrium unfolding of dimeric and engineered monomeric forms of Cro (F58W) repressor and the effect of added salts: evidence for the formation of folded monomer induced by sodium perchlorate," Arch Biochem Biophys., Feb. 1, 2005, 434(1):93-107.
Manco-Johnson et al., "Prophylaxis versus Episodic Treatment to Prevent Joint Disease in Boys with Severe Hemophilia," N Engl J Med, Aug. 9, 2007, 357(6):535-44.
Manz et al., Bioanalytical Chemistry, World Scientific Publishing Co. (2003), 1 page.

(56) References Cited

OTHER PUBLICATIONS

Manzke et al., "Single-step purification of bispecific monoclonal antibodies for immunotherapeutic use by hydrophobic interaction chromatography," J. Immunol. Methods, 1997, 208:65-73.
Marshall et al., "Rational design and engineering of therapeutic proteins," Drug Discov Today, Mar. 1, 2003, 8(5):212-21.
Marti et al., "Inverse electrostatic effect: electrostatic repulsion in the unfolded state stabilizes a leucine zipper," Biochemistry, 43(39):12436-47 (2004).
Martin et al., "Crystal structure at 2.8 A of an FcRn/heterodimeric Fc complex: mechanism of pH-dependent binding," Mol. Cell, 7:867-877 (2001).
Marvin et al., "Recombinant approaches to IgG-like bispecific antibodies," Acta. Pharmacol. Sin., 26:649-658 (2005).
Marvin et al., "Redesigning an antibody fragment for faster association with its antigen," Biochemistry, 42:7077-83 (2003).
Massino et al., "Quantitative analysis of the products of IgG chain recombination in hybrid hybridomas based on affinity chromatography and radioimmunoassay," J. Immunol. Methods, 201:57-66 (1997).
Maxfield et al., "Endocytic recycling," Nat. Rev. Mol. Cell Biol., 5(2):121-32 (2004).
McCafferty et al., "Phage antibodies: filamentous phage displaying antibody variable domains," Nature, 348:552-554 (1990).
McPhee et al., "Engineering human immunodeficiency virus 1 protease heterodimers as macromolecular inhibitors of viral maturation," Proc Natl Acad Sci USA, Oct. 15, 1996, 93(21):11477-81.
Medesan et al., "Delineation of the amino acid residues involved in transcytosis and catabolism of mouse IgG1," J Immunol., Mar. 1, 1997, 158(5):2211-7.
Menegatti et al., "Factor X Deficiency," Semin. Thromb. Hemost., 35:407-415 (2009).
Merchant et al., "An efficient route to human bispecific IgG," Nat. Biotechnol., 16:677-681 (1998).
Mertens et al., "Factor VIII-Factor IX Interactions: Molecular Sites Involved in Enzyme-Cofactor Complex Assembly," Thromb. Haemost., 82:209-217 (1999).
Michaelsen et al., "A mutant human IgG molecule with only one C1q binding site can activate complement and induce lysis of target cells," Eur J Immunol., Jan. 2006, 36(1):129-38.
Milstein et al., "Hybrid hybridomas and their use in immunohistochemistry," Nature, 305:537-540 (1983).
Miyazaki et al., "Generation of bispecific IgG, which mimics the cofactor function of blood coagulation factor VIII," Seikagaku, Poster sessions (2P-B-161) (2006).
Morell et al., "Metabolic properties of IgG subclasses in man," J. Clin. Invest., 49(4):673-80 (1970).
Morimoto et al., "Single-step purification of F(ab')$_2$ fragments of mouse monoclonal antibodies (immunoglobulins G1) by hydrophobic interaction high performance liquid chromatography using TSKgel Phenyl-5PW," J. Biochem. Biophys. Methods, 24:107-117 (1992).
Morrison, "Two heads are better than one," Nat Biotechnol, Nov. 2007, 25(11):1233-4.
Murata et al., "Anti-Digoxin Fab Variants Generated by Phage Display," Mol Biotechnol, Jun. 2013, 54(2):269-77. doi:10.1007/s12033-012-9564-1.
Murtaugh et al., "A combinatorial histidine scanning library approach to engineer highly pH-dependent protein switches," Protein Sci., 20(9):1619-31 doi:10.1002/pro 696 (2011).
Muto et al., "Anti-factor IXa/X bispecific antibody (ACE910): hemostatic potency against ongoing bleeds in a hemophilia A model and the possibility of routine supplementation," J Thromb Haemost, Feb. 2014, 12(2):206-213. doi: 10. 1111/jth.12474.
Muto et al., "Anti-factor IXa/X bispecific antibody (ACE910): hemostatic potency against ongoing bleeds in a hemophilia A model and the possibility of routine supplementation," Supporting Information to J. Thromb. Haemost., Feb. 2014, 12(2):206-13, https://onlinelibrary,wiley.com/action/downloadSupplement?doi=10. 1111%Fjth.12474&attchmentId=2210006855.

Muto et al., "Anti-factor IXa/X bispecific antibody ACE910 prevents joint bleeds in a long-term primate model of acquired hemophilia A," Blood, Nov. 13, 2014, 124(20):3165-71. doi: 10.1182/blood-2014-07-585737. Epub Oct. 1, 2014.
Muto et al., "Hemostatic Effect of a Novel Bispecific Antibody (ACE910) Against Activated Factor IX and Factor X in an Acquired Hemophilia A Model," Blood, 2012, vol. 120, No. 21, p. 42.
Muto et al., "Preventive effect of a bispecific antibody ACE910 that mimics the function of factor VIII on joint bleeding in a model of hemophilia A," Meeting of The 36th Congress of the Japanese Society on Thrombosis and Hemostasis, May 16, 2014 (with English translation).
Muto et al., "Preventive effect of a bispecific antibody ACE910 that mimics the function of factor VIII on joint bleeding in a model of hemophilia A," Meeting of The 36th Congress of the Japanese Society on Thrombosis and Hemostasis, May 30, 2014 (with English translation).
Muto et al., "Preventive effect of a humanized bispecific antibody to factors IXa and X (ACE910) on spontaneous joint bleeding in a non-human primate model of hemophilia A," Haemophilia (2014), 20 (Suppl. 3), 76.
Muto et al., "Preventive effect of a humanized bispecific antibody to factors IXa and X (ACE910) on spontaneous joint bleeding in a non-human primate model of hemophilia A," Meeting World Federation of Hemophilia, 2014 World Congress, May 14, 2014.
Muto et al., "Preventive Effect of Bispecific Antibody ACE910 that functionally substitutes for Factor VIII on Intraarticular Bleeding in Hemophilia A Models," Japanese Journal of Thrombosis and Hemostasis , vol. 25 (2014), No. 2:244(0-016) (with English translation).
Narhi et al., "Asn to Lys mutations at three sites which are N-glycosylated in the mammalian protein decrease the aggregation of *Escherichia coli*-derived erythropoietin," Protein Eng, Feb. 2001, 14(2):135-40.
"National Haemophilia Foundation (NHF) Medical and Scientific Advisory Council (MASAC) Recommendations Concerning Prophylaxis," Medical Bulletin, No. 193, 1 page (1994).
Nesterova et al., "Glypican-3 as a novel target for an antibody-drug conjugate," AACR Abstract No. 656, Los Angeles, CA (Apr. 4-18, 2007).
Nieba et al., "Disrupting the hydrophobic patches at the antibody variable/constant domain interface: improved in vivo folding and physical characterization of an engineered scFv fragment," Protein Eng., Apr. 1997, 10(4):435-44.
Nilsson et al., "Induction of split tolerance and clinical cure in high-responding hemophiliacs with factor IX antibodies," Proc. Natl. Acad. Sci. USA, 83:9169-9173 (1986).
Nilsson et al., "Twenty-five years' experience of prophylactic treatment in severe haemophilia A and B," J. Intern. Med., 232:25-32 (1992).
Nishimoto et al., "Humanized anti-interleukin-6 receptor antibody treatment of multicentric Castleman disease," Blood, 106:2627-32 (2005).
Nishimoto et al., "Interleukin 6: from bench to bedside," Nat. Clin. Pract. Rheumatol., 2:619-626 (2006).
Nitta et al., "Preliminary trial of specific targeting therapy against malignant glioma," Lancet, 335:368-371 (1990).
[No Authors Listed] Association of Hemophilia Clinic Directors of Canada, "Hemophilia and Von Willebrand's disease: 2. Management Association of Hemophilia Clinic Directors of Canada," Canadian Medical Association Journal, 153(2):147-157 (1995).
Nohaile et al., "Altering dimerization specificity by changes in surface electrostatics," Pro Natl Acad Sci USA, Mar. 13, 2001, 98(6):3109-14. Epub Feb. 27, 2001.
O'Shea et al., "Peptide 'Velcro': design of a heterodimeric coiled coil," Curr Biol., Oct. 1, 1993, 3(10):658-67.
Okubo et al. "The production and characterization of four monoclonal antibodies to human factor X," Nara Med Assoc., 38(1):20-28 (1987).
Oldenburg et al., "Emicizumab Prophylaxis in Hemophilia A with Inhibitors," The New England Journal of Medicine, Aug. 2017, 377(9):809-818.

(56) References Cited

OTHER PUBLICATIONS

Oldenburg, "Prophylaxis in bleeding disorders," Thromb Res, Jan. 2011, 127 Suppl 1:S14-7. doi: 10. 1016/j. thromres.2010. 10.005. Epub Nov. 26, 2010.
Onda et al., "Lowering the Isoelectric Point of the Fv Portion of Recombinant Immunotoxins Leads to Decreased Nonspecific Animal Toxicity without Affecting Antitumor Activity," Cancer Res., 61:5070-77 (2001).
Ono et al., "The humanized anti-HM1.24 antibody effectively kills multiple myeloma cells by human effector cell-mediated cytotoxicity," Mol. Immunol., 36(6):387-95 (1999).
Ozhegov et al., Tolkovyi Slovar Russkogo iazyka, 2004, p. 292 (with an English translation of the relevant passage defining "control").
Pakula et al., "Genetic Analysis of Protein Stability and Function," Annu. Rev. Genet., 23:289-310 (1989).
Pan et al., "Blocking neuropilin-1 function has an additive effect with anti-VEGF to inhibit tumor growth," Cancer Cell, Jan. 2007, 11(1):53-67.
Panka et al., "Variable region framework differences result in decreased or increased affinity of variant anti-digoxin antibodies," Proc. Natl. Acad. Sci. USA, 85(9):3080-84 (1988).
Pardridge et al., "Enhanced cellular uptake and in vivo biodistribution of a monoclonal antibody following cationization," J Pharm Sci., Aug. 1995, 84(8):943-8.
Pardridge et al., "Enhanced endocytosis in cultured human breast carcinoma cells and in vivo biodistribution in rats of a humanized monoclonal antibody after cationization of the protein," J. Pharmacol. Exp. Ther., 286(1):548-54 (1998).
Paul, Fundamental Immunology, 3rd edition, Raven Press NY, Chapter 8 "Immunogenicity and Antigen Structure," p. 242 (1993).
Pavlinkova et al., "Charge-modified single chain antibody constructs of monoclonal antibody CC49: Generation, characterization, pharmacokinetics, and biodistribution analysis," Nucl. Med. Biol., 26:27-34 (1999).
Pavlou et al., "The therapeutic antibodies market to 2008," Eur. J. Pharm. Biopharm., 59:389-396 (2005).
Peipp et al., "Bispecific antibodies targeting cancer cells," Biochem. Soc. Trans., Aug. 2002, 30:507-511.
Pejchal et al., "A Conformational Switch in Human Immunodeficiency Virus gp41 Revealed by the Structures of Overlapping Epitopes Recognized by Neutralizing Antibodies," J Virol, Sep. 2009, 83(17):8451-62. doi:10. 1128/ JVI. 00685- 09. Epub Jun. 10, 2009.
Peters et al., "Engineering an improved IgG4 molecule with reduced disulfide bond heterogeneity and increased Fab domain thermal stability," J Biol Chem, Jul. 13, 2012, 287(29): 24525-33. doi: 10.1074/jbc.M112.369744. Epub May 18, 2012.
Piper et al., "Interferon therapy in primary care," Primary Care Update for Ob/Gyns, 8(4):163-169 (2001).
Poduslo et al., "Polyamine modification increases the permeability of proteins at the blood—nerve and blood-brain barriers," J. Neurochem., 66:1599-1609 (1996).
Pokkuluri et al., "A domain flip as a result of a single amino-acid substitution," Structure, Aug. 15, 1998, 6(8):1067-73.
Pons et al., "Energetic analysis of an antigen/antibody interface: alanine scanning mutagenesis and double mutant cycles on the HyHEL-10/lysozyme interaction," Protein Sci., 8(5):958-68 (1999).
Portolano et al., "Lack of Promiscuity in Autoantigen-Specific H and L Chain Combinations as Revealed by Human H and L Chain 'Roulette'," J. Immunol., 150(3):880-887 (1993).
Presta, "Engineering of therapeutic antibodies to minimize immunogenicity and optimize function," Adv. Drug Deliv. Rev., 58(5-6):640-56 (2006).
Price et al., "Tissue factor and tissue factor pathway inhibitor," Anaesthesia, 59:483-492 (2004).
Queen et al., "A humanized antibody that binds to the interleukin 2 receptor," Proc. Natl. Acad. Sci. USA, 86(24):10029-10033 (1989).
Raffen et al., "Reengineering immunoglobulin domain interactions by introduction of charged residues," Protein Eng. Apr. 1998, 11:303-9.
Rajpal et al., "A general method for greatly improving the affinity of antibodies by using combinatorial libraries," Proc. Natl. Acad. Sci. USA, 102:8466-71 (2005).
Raposo et al., "Epitope-specific antibody response is controlled by immunoglobulin Vh polymorphisms," J Exp Med, Mar. 10, 2014, 211(3):405-11. doi: 10.1084/jem.20130968. Epub Feb. 17, 2014.
Rathanaswami et al., "Demonstration of an in vivo generated sub-picomolar affinity fully human monoclonal antibody to interleukin-8," Biochem. Biophys. Res. Commun., 334:1004-13 (2005).
Reddy et al., "Elimination of Fc receptor-dependent effector functions of a modified IgG4 monoclonal antibody to human CD4," J. Immunol., 164(4):1925-33 (2000).
Reichert et al., "Development trends for monoclonal antibody cancer therapeutics," Nat. Rev. Drug Discov., 6(5):349-56 (2007).
Reichert et al., "Monoclonal antibody successes in the clinic," Nat. Biotechnol., 23:1073-78 (2005).
Reimann et al., "A humanized form of a CD4-specific monoclonal antibody exhibits decreased antigenicity and prolonged plasma half-life in rhesus monkeys while retaining its unique biological and antiviral properties," AIDS Res Hum Retroviruses, Jul. 20, 1997, 13(11):933-43.
Ridgway et al., "'Knobs-into-holes' engineering of antibody $C_H3$ domains for heavy chain heterodimerization," Protein Eng., 9:617-621 (1996).
Rispens et al., "Dynamics of inter-heavy chain interactions in human immunoglobulin G (IgG) subclasses studied by kinetic Fab arm exchange," J Biol Chem., Feb. 28, 2014, 289(9):6098-109. doi: 10.1074/jbc.M113.541813. Epub Jan. 14, 2014.
Rispens et al., "Mechanism of Immunoglobulin G4 Fab-arm Exchange," J Am Chem Soc, Jul. 6, 2011, 133(26):10302-11. doi: 10.1021/ja203638y. Epub Jun. 15, 2011.
Roguska et al., "Humanization of murine monoclonal antibodies through variable domain resurfacing," Proc Natl Acad Sci USA, 91:969-73 (1994).
Roitt et al., Immunology, M., Mir, (2000), pp. 97-113 (including what are believed to be corresponding pages from an English language edition of Immunology).
Roopenian et al., "FcRn: the neonatal Fc receptor comes of age," Nat Rev Immunol., Sep. 2007, 7(9):715-25.
Rothe et al., "Ribosome display for improved biotherapeutic molecules," Expert Opin. Biol. Ther., 6:177-187 (2006).
Rudikoff et al., "Single amino acid substitution altering antigen-binding specificity," Proc Natl Acad Sci USA, Mar. 1982, 79(6):1979-83.
Ruef et al., "A bispecific antifibrin-antiplatelet urokinase conjugate (BAAUC) induces enhanced clot lysis and inhibits platelet aggregation," Thromb. Haemost., 82(1):109-114 (1999).
Ruf et al., "Pharmacokinetics and in vivo stability of intraperitoneally administered therapeutic antibody catumaxomab," J. Clin. Oncol., 26 (May 20 suppl) (2008), abstr 14006.
Ruggeri et al., "von Willebrand Factor and von Willebrand Disease," Blood, Oct. 1987, 70(4):895-904.
Ryman et al., "Pharmacokinetics of Monoclonal Antibodies," CPT Pharmacometrics Syst Pharmacol, Sep. 2017, 6(9):576-588. doi: 10.1002/psp4.12224. Epub Jul. 29, 2017.
Saenko et al., "Molecular defects in coagulation Factor VIII and their impact on Factor VIII function," Vox Sang, Aug. 2002, 83(2): 89-96.
Saito et al., "Establishment of Factor VIII Mimetic Antibodies and Their In Vitro Activities in Hemophilia A," 2006 National Hemophilia Foundation Symposia.
Saito et al., "Factor VIII Mimetic Antibody: (1) Establishment and Characterization of Anti-factor IX/anti-factor X Bispecific Antibodies," 2005 International Society of Thrombosis and Haemostasis, vol. 3, Issue Supplement sl, p. #OR160.
Salfeld et al., "Isotype selection in antibody engineering," Nat. Biotechnol., 25:1369-72 (2007).

(56) References Cited

OTHER PUBLICATIONS

Sal-Man et al., "Arginine mutations within a transmembrane domain of Tar, an *Escherichia coli* aspartate receptor, can drive homodimer dissociation and heterodimer association in vivo," Biochem. J., 385:29-36 (2005).
Sampei et al., "Non-antigen-contacting region of an asymmetric bispecific antibody to factors IXa/X significantly affects factor VIII-mimetic activity," mAbs, 2015:7(1):120-8. doi: 10.4161/19420862. 2015. 989028.
Sarkar et al., "Rational cytokine design for increased lifetime and enhanced potency using pH-activated 'histidine switching'," Nat Biotechnol., Sep. 2002, 20(9):908-13. Epub Aug. 5, 2002.
Sato et al., "Properties of Two VEGF Receptors, Flt-1 and KDR, in Signal Transduction," Ann N.Y. Acad. Sci, May 2000, 902:201-207.
Sato et al., "Reshaping a human antibody to inhibit the interleukin 6-dependent tumor cell growth," Cancer Res., 53:851-856 (1993).
Schaefer et al., "Immunoglobulin domain crossover as a generic approach for the production of bispecific IgG antibodies," Proc Natl Acad Sci USA, Jul. 5, 2011, 108(27):11187-92. doi: 10.1073/pnas.1019002108. Epub Jun. 20, 2011.
Schaeffer et al., "The Rat Glomerular Filtration Barrier Does Not Show Negative Charge Selectivity," Microcirculation, 9:329-342 (2002).
Schmidt et al., Chapter 18, Section 18.6, "Hemostasis and Coagulation," Human Physiology, Second Edition, Springer-Verlag, 1989, pp. 431-436 (with English translation).
Schmidt et al., Chapter 29, "Enzymes of the pancreatic juice," Human Physiology, Second Edition, Springer-Verlag, 1989, p. 764 (with English translation).
Schmidt et al., "Structure-function relationships in factor IX and factor IXa," Trends Cardiovasc Med., Jan. 2003, 13(1):39-45.
Schmitz et al., "Phage display: a molecular tool for the generation of antibodies—a review," Placenta., 21 Suppl A:S106-12 (2000).
Schuurman et al., "Normal human immunoglobulin G4 is bispecific: it has two different antigen-combining sites," Immunology, Aug. 1999, 97(4):693-8.
Schuurman et al., "The inter-heavy chain disulfide bonds of IgG4 are in equilibrium with intra-chain disulfide bonds," Mol Immunol., Jan. 2001, 38(1):1-8.
Segal et al., "Bispecific antibodies in cancer therapy," Curr. Opin. Immunol., 11:558-562 (1999).
Segal et al., "Introduction: bispecific antibodies," J. Immunol. Methods, 248:1-6 (2001).
Sequence alignments and modification scheme (document filed during Oral Proceedings and mentioned in minutes of the Oral Proceedings posted by EPO on Jul. 25, 2018); 3 pages.
Shalaby et al., "Development of Humanized Bispecific Antibodies Reactive with Cytotoxic Lymphocytes and Tumor Cells Overexpressing the HER2 Protooncogene," J. Exp. Med., 175:217-225 (1992).
Sharifi et al., "Improving monoclonal antibody pharmacokinetics via chemical modification," Q J Nucl Med., Dec. 1998, 42(4):242-9.
Shaul, "Exploring the charge space of protein-protein association: a proteomic study," Proteins, 60:341-352 (2005).
Shields et al., "High resolution mapping of the binding site on human IgG1 for Fc gamma RI, Fc gamma RII, Fc gamma RIII, and FcRn and design of IgG1 variants with improved binding to the Fc gamma R," J. Biol. Chem., 276:6591-6604 (2001) (Epub Nov. 28, 2000).
Shima et al., "Long-term safety and efficacy of emicizumab in a phase 1/2 study in patients with hemophilia A with or without inhibitors," Blood Adv, Sep. 27, 2017, 1(22):1891-1899. doi: 10.1182/bloodadvances.2017006684. eCollection Oct. 10, 2017.
Shima et al., Long-term safety and prophylactic efficacy of once weekly subcutaneous administration of ACE910, in Japanese hemophilia A patients with and without FVIII inhibitors: interim results of the extension study of a phase 1 study, J Thromb Haemost, Jun. 2015, 13 Suppl 2:6-7 (Abstr AS017).
Shima et al., "691 Safety and Prophylactic Efficacy Profiles of ACE910, a Humanized Bispecific Antibody Mimicking the FVIII Cofactor Function in Japanese Hemophilia A Patients Both without and with FVIII Inhibitors: First-in-Patient Phase 1 Study," 56th ASH Annual Meeting and Exposition Abstract & Program [online. Dec. 2014]. URL<https://ash.confex.com/ash/2014/webprogram/Paper67797. html>.
Shima et al., "Pharmacokinetics and Pharmacodynamic Response of Bispecific Antibody ACE910 which Functionally Substitutes for Factor VIII Cofactor, in Healthy Adults," Japanese Journal of Thrombosis and Hemostasis, 2014, vol. 25, No. 2:245(0-017) (with English translation).
Shima et al., "Safety and Prophylactic Efficacy Profiles of ACE910, a Humanized Bispecific Antibody Mimicking the FVIII Cofactor Function, in Japanese Hemophilia A Patients Both without and with FVIII Inhibitors: First-in-Patient Phase 1 Study," https://ash.confex.corn/ash/2014/webprogramn/Paper67797.html. Nov. 6, 2014 (with English abstract).
Shima et al., "The pharmacokinetic and pharmacodynamic profiles of ACE910, a bispecific antibody mimicking the FVIII cofactor function, demonstrated in healthy adults," Meeting of The 36th Congress of the Japanese Society on Thrombosis and Hemostasis, May 30, 2014 (with English translation).
Shima et al., "The pharmacokinetic and pharmacodynamic profiles of ACE910, a bispecific antibody mimicking the FVIII cofactor function, demonstrated in healthy adults," Meeting of the 36th Congress of the Japanese Society on Thrombosis and Hemostasis, May 16, 2014 (with English translation).
Shima et al., "The safety, tolerability, pharmacokinetic and pharmacodynamic profiles of ACE910, a humanized bispecific antibody mimicking the FVIII cofactor function demonstrated in healthy adults," Haemophilia, 2014, 20 (Suppl. 3):76.
Shima et al., "Factor VIII Mimetic Antibody: (2) In Vitro Assessment of Cofactor Activity in Hemophilia A," 2005 International Society of Thrombosis and Haemostasis, vol. 3, Issue Supplement s1, p. #P0038.
Shima et al., "Factor VIII Taitei Kotai (2), Ketsuyubyo A Kanja Katsueki ni okeru in vitro Gyoko Kassei no Kento", Rinsho Ketsueki, 46(8):777, 2005 (with English translation).
Shima, "Bi-Specific Antibodies as FVIII Mimetics in Hemophilia" https://www.isth.org/page/2014Microsite/?https://www.isth.org/page/2014FinalProgram? and http://c.ymcdn.com/sites/www.isth.org/resource/resmgr/Microsite/Milwaukee_Final_Program_6614.pdf (Jun. 10, 2014).
Shima, "Bi-Specific Antibodies as FVIII Mimetics in Hemophilia" Meeting ISTH 2014 SSC Final Program, Jun. 10, 2014, p. 56.
Shima, "Bi-Specific Antibodies as FVIII Mimetics in Hemophilia" Meeting ISTH 2014 SSC Final Program, Jun. 25, 2014, 25 pages.
Shima, "New hemophilia treatment by a biospecific antibody to factors IXa and X," The 76th Annual Meeting of the Japanese Society of Hematology, Nov. 1, 2014 (with English translation).
Shima, "New hemophilia treatment by a bispecific antibody to factors IXa and X," The 76th Annual Meeting of the Japanese Society of Hematology, Oct. 23, 2014.
Shima, "New hemophilia treatment by a bispecific antibody to factors IXa and X," http://www2.convention.co jp/76jsh. http://www2.convention.co.jp/76jsh/japanese/schedule.html. https://www.meetingschedule.com/76jsh/schedule.html and https://www.meeting-schedule.com/76jsh/abstract.html, Oct. 2, 20144 (with English abstract).
Shima, "New hemophilia treatment by a bispecific antibody to factors IXa and X," The Japanese Journal of Clinical Hematology, 2014, vol. 55, No. 9:236.
Shima, "Novel Bypassing Agents-novel bypass and adjunctive therapies," Meeting World Federation of Hemophilia 2014 World Congress, May 15, 2014.
Shima, "Progress in Pathological Analysis of Hemophilia A," Japanese Journal of Thrombosis and Hemostasis, 2014, vol. 25, No. 2:144 (with English translation).
Shima, "Progress in the Pathological Analysis of Hemophilia A," Meeting of The 36th Congress of the Japanese Society on Thrombosis and Hemostasis, May 16, 2014 (with English translation).
Shima, "Progress in the Pathological Analysis of Hemophilia A," Meeting of The 36th Congress of the Japanese Society on Thrombosis and Hemostasis, May 31, 2014 (with English translation).
Shima, "The safety, tolerability, pharmacokinetic, and pharmacodynamic profiles of ACE910 a humanized bispecific antibody mimicking the

(56) References Cited

OTHER PUBLICATIONS

FVIII cofactor function demonstrated in healthy adults" Meeting World Federation of Hemophilia 2014 World Congress, May 14, 2014.
Shima, How to treat patients with severe haemophilia A without FVIII concentrates? New concepts in haemophilia therapy (bispecific antibody mimicking VIII), Haemophilia, (2015), 21(Suppl. 2), pp. 7-8.
Shima, M., "Bispecific antibodies to coagulation factors IXa and X mimic the function of factor VIII," 2006 World Federation of Haemophilia, Haemophilia, 12(Suppl. 2):98 (2006).
Shima et al., "Factor VIII-Mimetic Function of Humanized Bispecific Antibody in Hemophilia A," The New England Journal of Medicine, May 2016, 374(21):2044-2053.
Shirahata, "5. Future Prospects 1) Direction for Improvement of Coagulation Factor Preparations," Iyaku (Medicine and Drug) Journal Co., Ltd., 280-9 (2009) (with English translation).
Shire et al., "Challenges in the development of high protein concentration formulations," J. Pharm. Sci., 93:1390-1402 (2004).
Singer et al., Genes & Genomes, 1991, p. 59-71.
Singer et al., Genes & Genomes, 1998; 1:63-64 (with English translation).
Sinha et al., "Electrostatics in protein binding and function," Curr. Protein Pept. Sci., 3(6):601-14 (2002).
Sinha et al., "Molecular dynamics simulation of a high-affinity antibody-protein complex: the binding site is a mosaic of locally flexible and preorganized rigid regions," Cell Biochem Biophys., 43:253-273 (2005).
Skerra, "Use of the tetracycline promoter for the tightly regulated production of a murine antibody fragment in *Escherichia coli*," Gene, Dec. 30, 1994, 151(1-2):131-5.
Smans et al., "Bispecific antibody-mediated lysis of primary cultures of ovarian carcinoma cells using multiple target antigens," Int. J. Cancer, 83:270-277 (1999).
Smith, "Creative Expression: Mammalian Expression Vectors and Systems," The Scientist Magazine, Feb. 2, 1998, 3 pages.
Soeda et al., "Factor VIII Mimetic Antibody: (1) Establishment of Anti-FIXa/FX Bispecific Antibodies," Rinsho Ketsueki, Aug. 30, 2005, 46(8):728 (with English translation).
Soeda et al., "FVIII-Mimetic Action of Anti-FIXa/Anti-FX Bispecific Antibodies Produced by the Phage Library Method," Jpn J Thromb Hemost., Oct. 1, 2005, 16(5):526 (with English translation).
Spiess et al., "Bispecific antibodies with natural architecture produced by co-culture of bacteria expressing two distinct half-antibodies," Nat Biotechnol., Aug. 2013, 31(8):753-8. doi: 10.1038/nbt.2621. Epub Jul. 7, 2013.
Stancovski et al., "Mechanistic Aspects of the Opposing Effects of Monoclonal Antibodies to the ERBB2 Receptor on Tumor Growth," Proc. Nat. Acad. Sci. USA, 88:8691-8695, 1991.
Staerz et al., "Hybrid hybridoma producing a bispecific monoclonal antibody that can focus effector T-cell activity," Proc Natl Acad Sci USA, 83:1453-7 (1986).
Stickney et al., "Bifunctional Antibody: A Binary Radiopharmaceutical Delivery System for Imaging Colorectal Carcinoma," Cancer Res., 51:6650-6655 (1991).
Strand et al., "Biologic therapies in rheumatology: lessons learned, future directions," Nat. Rev. Drug Discov., 6:75-92 (2007).
Summary of information about antibodies in Examples of patent (document submitted in EP opposition and posted by EPO on Apr. 13, 2018); 3 pages.
Sun et al., "Coexpression of Gas6/Axl in human ovarian cancers," Oncology, 66(6):450-7 (2004).
Suresh et al., "Advantages of bispecific hybridomas in one-step immunocytochemistry and immunoassays," Proc. Natl. Acad. Sci. USA, 83:7989-7993 (1986).
Suresh et al., "Bispecific monoclonal antibodies from hybrid hybridomas," Methods Enzymol., 1986, 121:210-228.
Tabrizi et al., "Elimination mechanisms of therapeutic monoclonal antibodies," Drug Discov Today, Jan. 2006, 11(1-2):81-8.
Taki, The Journal of Japanese Society on Thrombosis and Hemostasis, 13:109-113 (2002) (Desig. ID 540 serves as a concise English explanation of this Japanese language document).
Tamura et al., "Structural correlates of an anticarcinoma antibody: identification of specificity-determining residues (SDRs) and development of a minimally immunogenic antibody variant by retention of SDRs only," J Immunol., Feb. 1, 2000, 164(3):1432-41.
Tan et al., "Contributions of a highly conserved $V_H/V_L$ hydrogen bonding interaction to scFv folding stability and refolding efficiency," Biophys J., Sep. 1998, 75(3):1473-82.
Tan et al., "Engineering the isoelectric point of a renal cell carcinoma targeting antibody greatly enhances scFv solubility," Immunotechnology, 4(2):107-114 (1998).
Tarditi et al., "Selective high-performance liquid chromatographic purification of bispecific monoclonal antibodies," J. Chromatogr., 599:13-20 (1992).
Teeling et al., "The biological activity of human CD20 monoclonal antibodies is linked to unique epitopes on CD20," J. Immunol., 177(1):362-71 (2006).
Ten Kate et al., "Effect of isoelectric point on biodistribution and inflammation; imaging with indium-111-labelled IgG," Eur. J. Nucl. Med., 17:305-309 (1990).
Tsuchiya, Credit Suisse Seminar, "Therapeutic Antibody," at Fuji-Gotemba Laboratories, p. 21 (2006) (with English translation).
Tsurushita et al., "Design of humanized antibodies: From anti-Tac to Zenapax," Methods, 36:69-83 (2005).
Uchida et al., "A first-in-human phase 1 study of ACE910, a novel factor VIII-mimetic bispecific antibody, in healthy subjects," Blood, Mar. 2016, 127(13):1633-1641.
Uchida et al., "First-In-Human Trial of Bispecific Antibody ACE910 Having Factor VIII-Substituting Activity, Safety, Pharmacokinetics, and Pharmacodynamics in Healthy Adults," Jpn. J. Clin. Pharmacol. Ther., 2014, 45 Suppl:S297.
Vaisitti et al., "Cationization of monoclonal antibodies: another step towards the 'magic bullet'?," J. Biol. Regul. Homeost. Agents., 19(3-4):105-12 (2005).
Vajdos et al., "Comprehensive functional maps of the antigen-binding site of an anti-ErbB2 antibody obtained with shotgun scanning mutagenesis," J. Mol. Biol., 320(2):415-28 (2002).
Van Den Abbeele et al., "Antigen-Binding Site Protection During Radiolabeling Leads to a Higher Immunoreactive Fraction," J Nucl Med, Jan. 1991, 32(1):116-22.
Van Der Neut Kolfschoten et al., "Anti-inflammatory activity of human IgG4 antibodies by dynamic Fab arm exchange," Science, Sep. 14, 2007, 317(5844):1554-7.
Van et al., "Immunogenicity screening in protein drug development," Expert Opin. Biol. Ther., 7(3):405-18 (2007).
Van Loghem et al., "Staphylococcal protein A and human IgG subclasses and allotypes," Scand. J. Immunol., 15(3):275-8 (1982).
Vargas-Madrazo et al., "An improved model of association for VH-VL immunoglobulin domains: asymmetries between VH and VL in the packing of some interface residues," J. Mol. Recognit., May-Jun. 2003, 16(3):113-20.
Vaughan et al., "Human antibodies with sub-nanomolar affinities isolated from a large non-immunized phage display library," Nat Biotechnol., Mar. 1996, 14(3):309-14.
Vehar et al., "Structure of human factor VIII," Nature, 312(5992):337-42 (1984).
Verbruggen et al., "The Nijmegen Modification of the Bethesda Assay for Factor VIII: C Inhibitors: Improved Specificity and Reliability," Thromb Haemost. Feb. 1995, 73(2):247-51.
Verhoeyen et al., "Construction of a reshaped HMFG1 antibody and comparison of its fine specificity with that of the parent mouse antibody," Immunology, Mar. 1993, 78(3):364-70.
Verhoeyen et al., "Monoclonal Antibodies in Clinical Oncology," 1991, Edited by AA Epenetos, Chapman and Hall, Chapter 5, pp. 37-43.
Wagenvoord et al., "Development of a Simple Chromogenic Factor VIII Assay for Clinical Use," Haemostasis, 1989, 19(4):196-204.
Wang et al., "Conserved amino acid networks involved in antibody variable domain interactions," Proteins, Jul. 2009, 76(1):99-114. doi: 10.1002/prot.22319.

(56) References Cited

OTHER PUBLICATIONS

Ward et al., "Effects of engineering complementary charged residues into the hydrophobic subunit interface of tyrosyl-tRNA synthetase. Appendix: Kinetic analysis of dimeric enzymes that reversibly dissociate into inactive subunits," Biochemistry, Jun. 30, 1987, 26(13):4131-8.
Warnaar et al., "Purification of bispecific F(ab')2 from murine trinoma OC/TR with specificity for CD3 and ovarian cancer," Hybridoma, 13:519-526 (1994).
Weiner et al., "A Human Tumor Xenograft Model of Therapy with a Bispecific Monoclonal Antibody Targeting c-erbB-2 and CD16," Cancer Res., 53:94-100 (1993).
Weiner et al., "The Role of T Cell Activation in Anti-CD3 x Antitumor Bispecific Antibody Therapy," J. Immunol., 152:2385-2392 (1994).
Wiens et al., "Mutation of a single conserved residue in VH complementarity-determining region 2 results in a severe Ig secretion defect," J. Immunol., 167(4):2179-86 (2001).
Wiens et al., "Somatic mutation in VH complementarity-determining region 2 and framework region 2: differential effects on antigen binding and Ig secretion," J. Immunol., 159(3):1293-302 (1997).
Wood et al., "Expression of active human factor VIII from recombinant DNA clones," Nature, Nov. 22-28, 1984, 312(5992):330-7.
Worn et al., "Stability engineering of antibody single-chain Fv fragments," J Mol Biol., Feb. 2, 2001, 305(5):989-1010.
Written Submissions by Opponent 1 (Alexion Pharmaceuticals, Inc.) in Opposition of EP 2006381 dated Apr. 13, 2018, 19 pages.
Written Submissions by Opponent 2 (Novo Nordisk A/S) in Opposition of EP 2006381 dated Apr. 13, 2018, 14 pages.
Written Submissions by Opponent 3 (name unknown) in Opposition of EP 2006381 dated Apr. 13, 2018, 16 pages.
Wu et al., "Development of motavizumab, an ultra-potent antibody for the prevention of respiratory syncytial virus infection in the upper and lower respiratory tract," J. Mol. Biol., 368:652-65 (2007).
Wu et al., "Multimerization of a chimeric anti-CD20 single-chain Fv-Fc fusion protein is mediated through variable domain exchange," Protein Eng., Dec. 2001, 14(12):1025-33.
Wu et al., "Ultra-potent Antibodies Against Respiratory Syncytial Virus: Effects of Binding Kinetics and Binding Valence on Viral Neutralization," J Mol Biol, Jul. 1, 2005, 350(1):126-44.
Xiang et al., "Production of Murine V-Human Crl Chimeric Anti-TAG72 Antibody Using V Region cDNA Amplified by PCR," Mol. Immunol., 27:809-817 (1990).
Xiang et al., "Study of B72.3 combining sites by molecular modeling and site-directed mutagenesis," Protein Eng., 13(5):339-44 (2000).
Yamasaki et al., "Pharmacokinetic analysis of in vivo disposition of succinylated proteins targeted to liver nonparenchymal cells via scavenger receptors: importance of molecular size and negative charge density for in vivo recognition by receptors," J. Pharmacol. Exp. Ther., 301:467-477 (2002).
Yang et al., "CDR Walking Mutagenesis for the Affinity Maturation of a Potent Human Anti-HIV-1 Antibody into the Picomolar Range," J Mol. Biol., Dec. 1995, 254(3):392-403.
Yang et al., "Tailoring structure-function and pharmacokinetic properties of single-chain Fv proteins by site-specific PEGylation," Protein Eng., 16:761-770 (2003).
Yasukawa et al., "Structure and expression of human B cell stimulatory factor-2 (BSF-2/IL-6) gene," EMBO J., Oct. 1987, 6(10):2939-45.
Yoneyama et al., "A Pharmacometric Approach to Substitute for a Conventional Dose-Finding Study in Rare Diseases: Example of Phase III Dose Selection for Emicizumab in Hemophilia A," Clin. Pharmacokinet., Dec. 2017, pp. 1-12.
Yoneyama et al., "Repeated Time-to-Event Modeling to Characterize the Bleeding-Prophylactic Efficacy of ACE910, a Bispecific Antibody to Factors IXA and X, in Patients with Hemophilia," Clin Pharmacol Ther, 2016, 99(Suppl 1):S33.
Young et al., Efficacy, Safety and Pharmacokinetics (PK) of Once-weekly Prophylactic (Px) Emicizumab (ACE910) in Pediatric (< 12 years) Persons with Hemophilia A with Inhibitors (PwHAwI): Interim Analysis of Single-arm, Multicenter, Open-label, Phase 3 Study (HAVEN 2), Res Pract Thromb Haemost, 2017, 1(Suppl 2):5.
Zhu et al., "MHC class I-related neonatal Fc receptor for IgG is functionally expressed in monocytes, intestinal macrophages, and dendritic cells," J. Immunol., 166(5):3266-76 (2001).
Zhu et al., "Remodeling domain interfaces to enhance heterodimer formation," Protein Sci., Apr. 1997, 6(4):781-8.
Zuckier et al., "Chimeric human-mouse IgG antibodies with shuffled constant region exons demonstrate that multiple domains contribute to in vivo half-life," Cancer Res., 58:3905-08 (1998).
Zuo et al., "An efficient route to the production of an IgG-like bispecific antibody," Protein Eng., 13(5):361-7 (2000).
Zwick et al., "The long third complementarity-determining region of the heavy chain is important in the activity of the broadly neutralizing anti-human immunodeficiency virus type 1 antibody 2F5," J. Virol., 78(6):3155-61 (2004).
U.S. Appl. No. 16/536,385, Igawa et al., filed Aug. 9, 2019.
U.S. Appl. No. 15/288,965, Igawa et al., Oct. 7, 2016 (abandoned).
U.S. Appl. No. 16/099,341, filed Nov. 1, 2018, Teranish et al.
U.S. Appl. No. 16/536,385, filed Aug. 9, 2019, Hattori et al.
Do et al., "A rapid method for determining dynamic binding capacity of resins for the purification of proteins," Protein Expr Purif, Aug. 2008, 60(2):147-50. doi: 10.1016/j.pep.2008.04.009. Epub May 3, 2008.
Pabst et al., "Engineering of novel Staphylococcal Protein A ligands to enable milder elution pH and high dynamic binding capacity," J Chromatogr A, Oct. 3, 2014, 1362:180-5. doi: 10.1016/j.chroma.2014.08.046. Epub Aug. 19, 2014.
Pabst et al., "Evaluation of recent Protein A stationary phase innovations for capture of biotherapeutics," J Chromatogr A, Jun. 15, 2018, 1554:45-60. doi: 10.1016/j.chroma.2018.03.060. Epub Apr. 7, 2018.
U.S. Appl. No. 11/910,836, Hattori et al., filed Jan. 12, 2009 (adandoned).
U.S. Appl. No. 15/172,727, Hattori et al., filed Jun. 3, 2016 (abandonded).
U.S. Appl. No. 16/780,977, filed Feb. 4, 2020, Yoneyama.
U.S. Appl. No. 17/130,736, filed Dec. 22, 2020, Hattori et al.
Yarilin, Fundamentals of Immunology, Moscow, Medicina, 1999, p. 171 (with English translation).
U.S. Appl. No. 17/130,736, Hattori et al., filed Dec. 22, 2020.
U.S. Appl. No. 17/076,938, Igawa et al., filed Oct. 22, 2020.
U.S. Appl. No. 17/017,971, Yoneyama, filed Sep. 11, 2020.
Taylor et al., "A new era for hemophilia B treatment," Blood, Apr. 7, 2016, 127(14):1734-1736.
U.S. Appl. No. 13/518,861, Igawa et al., filed Oct. 4, 2012.
U.S. Appl. No. 15/617,008, Igawa et al., filed Oct. 4, 2012 (abandoned).
U.S. Appl. No. 16/496,089, filed Sep. 20, 2019, Shima et al.
Edwards et al., "The Remarkable Flexibility of the Human Antibody Repertoire; Isolation of Over One Thousand Different Antibodies to a Single Protein, BLyS," J Mol Biol, Nov. 14, 2003, 334(1):103-18.
Goel et al., "Plasticity within the Antigen-Combining Site May Manifest as Molecular Mimicry in the Humoral Immune Response," J Immunol, Dec. 15, 2004, 173(12):7358-67.
Kanyavuz et al., "Breaking the law: unconventional strategies for antibody diversification," Nat Rev Immunol, Jun. 2019, 19(6):355-368. doi: 10.1038/541577-019-0126-7.
Lloyd et al., "Modelling the human immune response: performance of a $10^{11}$ human antibody repertoire against a broad panel of therapeutically relevant antigens," Protein Eng Des Sel, Mar. 2009, 22(3):159-68. doi: 10.1093/protein/gzn058. Epub Oct. 29, 2008.
U.S. Appl. No. 13/434,643, Hattori et al., filed Jan. 12, 2009 (abandoned).
U.S. Appl. No. 17/017,971, filed Sep. 11, 2020, Yoneyama.
U.S. Appl. No. 17/076,938, filed Oct. 22, 2020, Igawa et al.
Dall'Acqua et al., "Contribution of Domain Interface Residues to the Stability of Antibody $C_H3$ Domain Homodimers," Biochemistry, Jun. 30, 1998, 37(26):9266-9273. doi: 10.1021/bi980270i. PMID: 9649307.

(56) References Cited

OTHER PUBLICATIONS

Declaration of Christian Beil, signed Jun. 18, 2020, submitted by the opponent in Opposition of EP 3 050 963, 6 pages.
Helguera et al., "Antibody-Cytokine Fusion Proteins for the Therapy of Cancer," Methods Mol Med, 2005, 109:347-74. doi: 10.1385/1-59259-862-5:347. PMID: 15585931.
Hugo et al., "Functional aspects of co-variant surface charges in an antibody fragment," Protein Sci, Nov. 2002, 11(11):2697-2705. doi: 10.1110/ps.0209302. PMID: 12381851; PMCID: PMC2373727.
Otomo et al., "Structure of the heterodimeric complex between CAD domains of CAD and ICAD," Nat Struct Biol, Aug. 2000, 7(8):658-662. doi: 10.1038/77957. PMID: 10932250.
Raghavan et al., "Fc Receptors and Their Interactions with Immunoglobulins," Annu Rev Cell Dev Biol, Nov. 1996, 12:181-220.
Reference table: IMGT exon, EU and Kabat numbering of residues within the human lgG1 sequence, retrieved from http://www.imgt.org/IMGTScientificChart/Numbering/Hu_IGHGnber.html on Jun. 1, 2020, 4 pages (cited by the opponents in the Opposition procedure in the corresponding European Patent No. 3 050 963, which was notified to the patentee on Jul. 3, 2020).
USPTO Non-Final Office Action in U.S. Appl. No. 11/910,128, dated Nov. 28, 2016, 17 pages.
U.S. Appl. No. 16/318,883, Igawa et al., filed Jan. 18, 2019.
U.S. Appl. No. 15/512,187, Nogami et al., filed Mar. 17, 2017.
U.S. Appl. No. 15/512,094, Igawa et al., filed Mar. 17, 2017.
U.S. Appl. No. 15/782,256, Igawa et al., filed Oct. 12, 2017.
U.S. Appl. No. 15/725,692, Igawa et al., filed Oct. 5, 2017.
U.S. Appl. No. 17/336,538, Igawa et al., filed Jun. 2, 2021.
U.S. Appl. No. 17/235,445, Yoneyama, filed Apr. 20, 2021.
U.S. Appl. No. 16/061,429, Igawa et al., filed Jun. 12, 2018.
U.S. Appl. No. 16/758,128, filed Apr. 22, 2020, Hosoguchi et al.
U.S. Appl. No. 17/235,445, filed Apr. 20, 2021, Yoneyama.
U.S. Appl. No. 17/336,538, filed Jun. 2, 2021, Igawa et al.
U.S. Appl. No. 17/359,867, filed Jun. 28, 2021, Igawa et al.
U.S. Appl. No. 17/389,534, filed Jul. 30, 2021, Hattori et al.
U.S. Appl. No. 17/483,898, filed Sep. 24, 2021, Igawa et al.
U.S. Appl. No. 17/485,818, filed Sep. 27, 2021, Igawa et al.
Al-Banaa et al., "Emicizumab Use in Treatment of Acquired Hemophilia A: A Case Report," Am J Case Rep, Jul. 18, 2019, 20:1046-1048.
Annex from opponent 2's submission of Jun. 7, 2018, 13 pages (re-cited by an opponent during the opposition proceedings of EP 2 202 245 on May 19, 2020).
Antibodies in Example 29 of EP 2 202 245, 2 pages (cited by the opponent during the opposition proceedings of EP 2 202 245 on May 19, 2020).
Dane et al., "Successful use of emicizumab in a patient with refractory acquired hemophilia A and acute coronary syndrome requiring percutaneous coronary intervention," Res Pract Thromb Haemost, Apr. 9, 2019, 3(3):420-423.
Glatter et al., "Evaluation of Small-Angle Scattering Data from Lamellar and Cylindrical Particles by the Indirect Transformation Method," J Appl, Cryst, 1980, 13:577-584.
Golay et al., "Design and Validation of a Novel Generic Platform for the Production of Tetravalent IgG1-like Bispecific Antibodies," J Immunol, Apr. 1, 2016, 196 (7):3199-3211.
Ho et al., "In vitro antibody evolution targeting germline hot spots to increase activity of an anti-CD22 immunotoxin," J Biol Chem, Jan. 7, 2005, 280(1):607-617. doi: 10.1074/jbc.M409783200. Epub Oct. 18, 2004.
Knoebl et al., "Emicizumab for the treatment of acquired hemophilia A," Blood, Jan. 22, 2021, 137(3):410-419, First Edition: Aug. 7, 2020.
Lescar et al., "Crystal Structure of a Cross-reaction Complex between Fab 59.13.7 and Guinea Fowl Lysozyme," Journal of Biological Chemistry, Jul. 30, 1995, 270(30):18067-18076.
Mazor et al., "Improving target cell specificity using a novel monovalent bispecific IgG design," mAbs, Mar./Apr. 2015, 7(2):377-389.
Mohnle et al., "Emicizumab in the Treatment of Acquired Haemophilia: A Case Report," Transfus Med Hemother, Apr. 2019, 46(2):121-123.
Morris, "Epitope Mapping of Protein Antigens by Competition ELISA," The Protein Protocols Handbook, Jan. 1, 1996, pp. 595-600.
Muller et al., "The first constant domain ($C_H1$ and $C_L$) of an antibody used as heterodimerization domain for bispecific miniantibodies," FEBS Lett, Jan. 30, 1998, 422(2):259-264.
Murray et al., Chapter 55 "Blood plasma and coagulation process," Human Biochemistry, Moscow, Mir: BINTON, 2009, 2:328-329 (with English translation).
Retout et al., "Population Pharmacokinetic Analysis and Exploratory Exposure-Bleeding Rate Relationship of Emicizumab in Adult and Pediatric Persons with Hemophilia A," Clin Pharmacokinet, Dec. 2020, 59(12):1611-1625. Published online Jun. 5, 2020.
Sakai et al., "Guidelines for the management of acquired hemophilia A: 2017 revision," Jpn J Thromb Hemost, 2017, 28(6), pp. 715-747 (with English translation).
Screenshots of Genetyx software, 3 pages (document cited by opponent during the opposition proceedings of EP 2 202 245 on May 22, 2020).
Screenshots of the web-based calculator, 9 pages (document cited by opponent during the opposition proceedings of EP 2 202 245 on May 22, 2020).
Sections of the Genetyx manual pertaining to isoelectric point, 5 pages (document cited by opponent during the opposition proceedings of EP 2 202 245 on May 22, 2020) (with English translation).
Takeyama et al., "An anti-factor IXa/factor X bispecific antibody, emicizumab, improves ex vivo coagulant potentials in plasma from patients with acquired hemophilia A," J Thromb Haemost, Apr. 2020, 18(4):825-833.
Tian et al., "In-depth analysis of subclass-specific conformational preferences of IgG antibodies," IUCrJ, Jan. 1, 2015, 2(Pt 1):9-18. doi: 10.1107/S205225251402209X. eCollection Jan. 1, 2015.
Yada et al., "Spotlight on emicizumab in the management of hemophilia A: patient selection and special considerations," J Blood Med, Jul. 2, 2019, 10:171-181.
USPTO Restriction Requirement in U.S. Appl. No. 13/885,421 dated Jul. 28, 2015, 9 pages.
USPTO Restriction Requirement in U.S. Appl. No. 16/459,791, dated Mar. 29, 2021, 7 pages.
USPTO Final Office Action in U.S. Appl. No. 13/522,848, dated May 11, 2017, 7 pages.
USPTO Non-Final Office Action in U.S. Appl. No. 13/522,848, dated Sep. 20, 2016, 7 pages.
USPTO Final Office Action in U.S. Appl. No. 13/522,848, dated Jan. 4, 2016, 7 pages.
USPTO Non-Final Office Action in U.S. Appl. No. 13/522,848, dated May 1, 2015, 8 pages.
USPTO Restriction Requirement in U.S. Appl. No. 13/522,848, dated Oct. 23, 2014, 5 pages.
USPTO Restriction Requirement in U.S. Appl. No. 16/008,486, dated Nov. 5, 2019, 6 pages.
USPTO Non-Final Office Action in U.S. Appl. No. 16/008,486, dated Mar. 27, 2020, 9 pages.
USPTO Final Office Action in U.S. Appl. No. 16/008,486, dated Aug. 12, 2020, 9 pages.
USPTO Non-Final Office Action in U.S. Appl. No. 16/008,486, dated Apr. 9, 2021, 5 pages.
USPTO Restriction Requirement in U.S. Appl. No. 16/318,883, dated Oct. 9, 2020, 8 pages.
USPTO Non-Final Office Action in U.S. Appl. No. 16/318,883, dated May 18, 2021, 19 pages.
U.S. Appl. No. 16/758,128, Hosoguchi et al., filed Apr. 22, 2020.
U.S. Appl. No. 16/496,089, Shima et al., filed Sep. 20, 2019.
U.S. Appl. No. 16/318,883, Igawa et al., filed Jan. 18, 2019 (abandoned).
U.S. Appl. No. 17/528,371, Igawa et al., filed Nov. 17, 2021.
U.S. Appl. No. 16/936,575, Teranishi et al., filed Jul. 23, 2020.
U.S. Appl. No. 17/389,534, Hattori et al., filed Jul. 30, 2021.
U.S. Appl. No. 17/130,736, Hattori et al., filed Dec. 22, 2020 (abandoned).

(56) References Cited

OTHER PUBLICATIONS

U.S. Appl. No. 16/825,513, Hattori et al., filed Mar. 20, 2020 (abandoned).
U.S. Appl. No. 16/536,385, Hattori et al., filed Aug. 9, 2019 (abandoned).
U.S. Appl. No. 16/226,798, Hattori et al., filed Dec. 20, 2018 (abandoned).
U.S. Appl. No. 15/963,345, Hattori et al., filed Apr. 26, 2018 (abandoned).
U.S. Appl. No. 10/575,905, Hattori et al., filed Apr. 30, 2007 (abandoned).
U.S. Appl. No. 17/483,898, Igawa et al., filed Sep. 24, 2021.
U.S. Appl. No. 17/520,368, Igawa et al., filed Nov. 5, 2021.
U.S. Appl. No. 11/910,836, Hattori et al., filed Jan. 12, 2009 (abandoned).
U.S. Appl. No. 13/434,643, Hattori et al., filed Mar. 29, 2012 (abandoned).
U.S. Appl. No. 14/921,590, Hattori et al., filed Oct. 23, 2015 (abandoned).
U.S. Appl. No. 15/172,727, Hattori et al., filed Jun. 3, 2016 (abandoned).
U.S. Appl. No. 15/402,580, Hattori et al., filed Jan. 10, 2017 (abandoned).
U.S. Appl. No. 15/701,630, Hattori et al., filed Sep. 12, 2017 (abandoned).
U.S. Appl. No. 17/359,867, Igawa et al., filed Jun. 28, 2021.
U.S. Appl. No. 17/578,524, Igawa et al., filed Jan. 19, 2022.
U.S. Appl. No. 13/518,861, Igawa et al., filed Oct. 4, 2012 (abandoned).
U.S. Appl. No. 15/617,008, Igawa et al., filed Jun. 8, 2017 (abandoned).
U.S. Appl. No. 15/875,847, Igawa et al., filed Jan. 19, 2018 (abandoned).
U.S. Appl. No. 16/155,673, Igawa et al., filed Oct. 9, 2018 (abandoned).
U.S. Appl. No. 16/448,088, Igawa et al., filed Jun. 21, 2019 (abandoned).
U.S. Appl. No. 16/815,089, Igawa et al., filed Mar. 11, 2020 (abandoned).
U.S. Appl. No. 17/076,938, Igawa et al., filed Oct. 22, 2020 (abandoned).
U.S. Appl. No. 17/336,538, Igawa et al., filed Jun. 2, 2021 (abandoned).
U.S. Appl. No. 17/574,614, Igawa et al., filed Jan. 13, 2022.
U.S. Appl. No. 14/019,117, Igawa et al., filed Sep. 5, 2013 (abandoned).
U.S. Appl. No. 14/019,712, Igawa et al., filed Sep. 6, 2013 (abandoned).
U.S. Appl. No. 15/288,965, Igawa et al., filed Oct. 7, 2016 (abandoned).
U.S. Appl. No. 16/459,791, Igawa et al., filed Jul. 2, 2019 (abandoned).
U.S. Appl. No. 17/485,818, Igawa et al., filed Sep. 27, 2021.
U.S. Appl. No. 15/319,016, Yoneyama, filed Dec. 15, 2016 (abandoned).
U.S. Appl. No. 16/432,790, Yoneyama, filed Jun. 5, 2019 (abandoned).
U.S. Appl. No. 16/780,977, Yoneyama, filed Feb. 4, 2020 (abandoned).
U.S. Appl. No. 17/017,971, Yoneyama, filed Sep. 11, 2020 (abandoned).
U.S. Appl. No. 17/235,445, Yoneyama, filed Apr. 20, 2021 (abandoned).
U.S. Appl. No. 17/534,566, Yoneyama, filed Nov. 24, 2021.
U.S. Appl. No. 16/061,454, Tanaka et al., filed Jun. 12, 2018.
U.S. Appl. No. 16/061,429, Igawa et al., filed Jun. 12, 2018 (abandoned).
U.S. Appl. No. 17/563,149, Igawa et al., filed Dec. 28, 2021.
U.S. Appl. No. 16/330,269, Yoneyama et al., filed Mar. 4, 2019.
U.S. Appl. No. 16/008,486, Igawa el al., filed Jun. 14, 2018.
U.S. Appl. No. 17/520,368, filed Nov. 5, 2021, Igawa et al.
U.S. Appl. No. 17/528,371, filed Nov. 17, 2021, Igawa et al.
U.S. Appl. No. 17/534,566, filed Nov. 24, 2021, Yoneyama.
U.S. Appl. No. 17/563,149, filed Dec. 28, 2021, Igawa et al.
U.S. Appl. No. 17/574,614, filed Jan. 13, 2022, Igawa et al.
U.S. Appl. No. 17/578,524, filed Jan. 19, 2022, Igawa et al.
Carpenter et al., "Rational Design of Stable Lyophilized Protein Formulations: Some Practical Advice," Pharmaceutical Research, Aug. 1997, 14(8):969-975.
Fukuda et al., "Thermodynamic and Fluorescence Analyses to Determine Mechanisms of IgG1 Stabilization and Destabilization by Arginine," Pharm Res, Apr. 2014, 31:992-1001.
Grapentin et al., "Protein-Polydimethylsiloxane Particles in Liquid Vial Monoclonal Antibody Formulations Containing Poloxamer 188," J Pharm Sci, Aug. 2020, 109(8):2393-2404.
Janeway, "The interaction of the antibody molecule with specific antigen," Immunobiology: The Immune System in Health and Disease, 2001, section 3.6, 5 pages.
Joshi et al., "Avoiding antibody aggregation during processing: establishing hold times, " Biotechnol J, Sep. 2014, 9(9):1195-1205. doi: 10.1002/biot.201400052. Epub May 12, 2014.
Kim et al., "Arginine as a protein stabilizer and destabilizer in liquid formulations," International Journal of Pharmaceutics, Nov. 20, 2016, 513:26-37.
Ogiwara et al., "Anti FIXa/FX Bispecific Antibody (Emicizumab) Enhances Plasma Procoagulant Activity in Hemophilia B in the Presence of Very Low Level of Factor IX," Res Pract Thromb Haemost, 2017, 1.suppl 1:749.
Rajagopal et al., "Trehalose Limits Fragment Antibody Aggregation and Influences Charge Variant Formation in Spray-Dried Formulations at Elevated Temperatures," Mol Pharm, Jan. 7, 2019, 16(1):349-358. doi: 10.1021/acs.molpharmaceut.8b01002. Epub Dec. 17, 2018.
Wang, "Lyophilization and development of solid protein pharmaceuticals," International Journal of Pharmaceutics, Aug. 10, 2000, 203(1-2):1-60.
Wang et al., "Antibody Structure, Instability, and Formulation," Journal of Pharmaceutical Sciences, Jan. 2007, 96(1):1-26.
USPTO Non-Final Office Action in U.S. Appl. No. 16/496,089, dated Dec. 21, 2021, 42 pages.
U.S. Appl. No. 17/763,948, Yoneyama et al., filed Mar. 25, 2022.
U.S. Appl. No. 17/699,293, Hattori et al., filed Mar. 21, 2022.
U.S. Appl. No. 17/729,471, Igawa et al., filed Apr. 26, 2022.
U.S. Appl. No. 17/849,879, Yoneyama, filed Jun. 27, 2022.
U.S. Appl. No. 17/828,752, Yoneyama et al., filed May 31, 2022.
U.S. Appl. No. 17/699,293, filed Mar. 21, 2022, Hattori et al.
U.S. Appl. No. 17/763,948, filed Mar. 25, 2022, Yoneyama et al.
U.S. Appl. No. 17/729,471, filed Apr. 26, 2022, Igawa et al.
U.S. Appl. No. 17/828,752, filed May 31, 2022, Yoneyama et al.
U.S. Appl. No. 17/849,879, filed Jun. 27, 2022, Yoneyama.
Daugherty et al., "Formulation and delivery issues for monoclonal antibody therapeutics," Adv Drug Deliv Rev, Aug. 7, 2006, 58(5-6):686-706. Epub May 22, 2006.
Ivaskevicius et al., "Lithuanian Hemophilia A and B Register Comprising Phenotypic and Genotypic Data," 30th Hemophilia Symposium Hamburg 1999, Springer-Verlag, Berlin, Heidelberg, 2001, 12 pages.
USPTO Restriction Requirement in U.S. Appl. No. 16/496,089, dated Sep. 1, 2021, 9 pages.
USPTO Final Office Action in U.S. Appl. No. 16/496,089, dated Aug. 30, 2022, 46 pages.
USPTO Non-Final Office Action in U.S. Appl. No. 16/008,486, dated Jan. 13, 2022, 7 pages.
USPTO Restriction Requirement in U.S. Appl. No. 16/061,429, dated Jan. 21, 2021, 6 pages.
USPTO Non-Final Office Action in U.S. Appl. No. 16/061,429, dated Jun. 30, 2021, 9 pages.
USPTO Restriction Requirement in U.S. Appl. No. 16/330,269, dated Jan. 27, 2021, 7 pages.
USPTO Non-Final Office Action in U.S. Appl. No. 16/330,269, dated Jun. 9, 2021, 16 pages.
Arakawa et al., "Biotechnology applications of amino acids in protein purification and formulations," Amino Acids, Nov. 2007, 33(4):587-605. Epub Mar. 16, 2007.

(56) References Cited

OTHER PUBLICATIONS

U.S. Appl. No. 17/974,914, Hattori et al., filed Oct. 27, 2022.
U.S. Appl. No. 18/176,201, Igawa et al., filed Feb. 28, 2023.
U.S. Appl. No. 18/081,874, Igawa el al., filed Dec. 15, 2022.
U.S. Appl. No. 17/821,494, Igawa et al., filed Aug. 23, 2022 (abandone).
U.S. Appl. No. 18/193,697, Igawa et al., filed Mar. 31, 2023.
U.S. Appl. No. 18/156,559, Yoneyama et al., filed Jan. 19, 2023.
U.S. Appl. No. 18/164,709, Yoneyama, filed Feb. 6, 2023.
U.S. Appl. No. 18/174,043, Igawa el al., filed Feb. 24, 2023.
U.S. Appl. No. 17/821,494, filed Aug. 23, 2022, Igawa et al.
U.S. Appl. No. 17/974,914, filed Oct. 27, 2022, Hattori et al.
U.S. Appl. No. 18/081,874, filed Dec. 15, 2022, Igawa et al.
U.S. Appl. No. 18/156,559, filed Jan. 19, 2023, Yoneyama et al.
U.S. Appl. No. 18/164,709, filed Feb. 6, 2023, Yoneyama.
U.S. Appl. No. 18/174,043, filed Feb. 24, 2023, Igawa et al.
U.S. Appl. No. 18/176,201, filed Feb. 28, 2023, Igawa et al.
U.S. Appl. No. 18/193,697, filed Mar. 31, 2023, Igawa et al.
Rallapalli et al., "An interactive mutation database for human coagulation factor IX provides novel insights into the phenotypes and genetics of hemophilia B," Journal of thrombosis and haemostasis, Jul. 2013, 11(7):1329-1340. doi:10.1111/jth.12276.
USPTO Non-Final Office Action in U.S. Appl. No. 16/496,089, dated Mar. 28, 2023, 39 pages.
Hemlibra™ Safety Data Sheet, Genentech, 13 pages (appendix to the observations filed by a third party on Mar. 13, 2023 in the corresponding European application (EP 17789638.8)).
Saurabh et al., "Understanding the Stabilizing Effect of Histidine on mAb Aggregation: A Molecular Dynamics Study," Mol Pharm, Sep. 5, 2022, 19(9):3288-3303.
U.S. Appl. No. 18/346,920, Hattori et al., filed Jul. 5, 2023.
U.S. Appl. No. 18/495,861, Igawa et al., filed Oct. 27, 2023.
U.S. Appl. No. 18/505,180, Igawa et al., filed Nov. 9, 2023.
U.S. Appl. No. 18/466,900, Yoneyama et al., filed Sep. 14, 2023.
U.S. Appl. No. 18/479,149, Yoneyama, filed Oct. 2, 2023.
U.S. Appl. No. 18/472,949, Shima et al., filed Sep. 22, 2023.
U.S. Appl. No. 18/425,859, Igawa et al., filed Jan. 29, 2024.
U.S. Appl. No. 18/432,567, Igawa et al., filed Feb. 5, 2024.
U.S. Appl. No. 18/346,920, filed Jul. 5, 2023, Hattori et al.
U.S. Appl. No. 18/466,900, filed Sep. 14, 2023, Yoneyama et al.
U.S. Appl. No. 18/472,949, filed Sep. 22, 2023, Shima et al.
U.S. Appl. No. 18/479,149, filed Oct. 2, 20223, Yoneyama.
U.S. Appl. No. 18/495,861, filed Oct. 27, 2023, Igawa et al.
U.S. Appl. No. 18/505,180, filed Nov. 9, 2023, Igawa et al.
U.S. Appl. No. 18/425,859, filed Jan. 29, 2024, Igawa et al.
U.S. Appl. No. 18/432,567, filed Feb. 5, 2024, Igawa et al.
U.S. Appl. No. 18/586,698, Hattori et al., filed Feb. 26, 2024.
U.S. Appl. No. 18/734,272, Yoneyama et al., filed Jun. 5, 2024.
U.S. Appl. No. 18/734,434, Yoneyama, filed Jun. 5, 2024.
U.S. Appl. No. 18/737,387, Igawa et al., filed Jun. 7, 2024.
U.S. Appl. No. 18/748,951, Igawa et al., filed Jun. 20, 2024.
U.S. Appl. No. 2024/0059795 A1, Feb. 22, 2024, Igawa et al.
U.S. Appl. No. 2024/0083939 A1, Mar. 14, 2024, Igawa et al.
U.S. Appl. No. 2024/0190976 A1, Jun. 13, 2024, Igawa et al.
U.S. Appl. No. 2024/0190997 A1, Jun. 13, 2024, Hattori et al.
U.S. Appl. No. 2024/0239906 A1, Jul. 18, 2024, Igawa et al.
Third Party Observations regarding European patent application No. 17789638.8, filed in the European Patent Office on Mar. 8, 2023, 6 pages.
Gokarn et al., Chapter 17 "Excipients for Protein Drugs," Excipient Development for Pharmaceutical, Biotechnology, and Drug Delivery Systems, 2006, pp. 299-303.
Examiner Michael Edward Szperka, USPTO Restriction Requirement in U.S. Appl. No. 17/528,371, dated Apr. 25, 2024, 8 pages.
Examiner Michael Edward Szperka, USPTO Non-Final Office Action in U.S. Appl. No. 17/528,371, dated Jul. 29, 2024, 24 pages.

\* cited by examiner

SEQUENCE LISTING

```
<160> NUMBER OF SEQ ID NOS: 15

<210> SEQ ID NO 1
<211> LENGTH: 5
<212> TYPE: PRT
<213> ORGANISM: Artificial Sequence
<220> FEATURE:
<223> OTHER INFORMATION: Heavy chain variable region CDR1

<400> SEQUENCE: 1

Tyr Tyr Asp Ile Gln
1               5

<210> SEQ ID NO 2
<211> LENGTH: 17
<212> TYPE: PRT
<213> ORGANISM: Artificial Sequence
<220> FEATURE:
<223> OTHER INFORMATION: Heavy chain variable region CDR2

<400> SEQUENCE: 2

Ser Ile Ser Pro Ser Gly Gln Ser Thr Tyr Tyr Arg Arg Glu Val Lys
1               5                   10                  15

Gly

<210> SEQ ID NO 3
<211> LENGTH: 14
<212> TYPE: PRT
<213> ORGANISM: Artificial Sequence
<220> FEATURE:
<223> OTHER INFORMATION: Heavy chain variable region CDR3

<400> SEQUENCE: 3

Arg Thr Gly Arg Glu Tyr Gly Gly Gly Trp Tyr Phe Asp Tyr
1               5                   10

<210> SEQ ID NO 4
<211> LENGTH: 5
<212> TYPE: PRT
<213> ORGANISM: Artificial Sequence
<220> FEATURE:
<223> OTHER INFORMATION: Heavy chain variable region CDR1

<400> SEQUENCE: 4

Asp Asn Asn Met Asp
1               5
```

```
<210> SEQ ID NO 5
<211> LENGTH: 17
<212> TYPE: PRT
<213> ORGANISM: Artificial Sequence
<220> FEATURE:
<223> OTHER INFORMATION: Heavy chain variable region CDR2

<400> SEQUENCE: 5

Asp Ile Asn Thr Arg Ser Gly Gly Ser Ile Tyr Asn Glu Glu Phe Gln
1               5                   10                  15

Asp

<210> SEQ ID NO 6
<211> LENGTH: 10
<212> TYPE: PRT
<213> ORGANISM: Artificial Sequence
<220> FEATURE:
<223> OTHER INFORMATION: Heavy chain variable region CDR3

<400> SEQUENCE: 6

Arg Lys Ser Tyr Gly Tyr Tyr Leu Asp Glu
1               5                   10

<210> SEQ ID NO 7
<211> LENGTH: 11
<212> TYPE: PRT
<213> ORGANISM: Artificial Sequence
<220> FEATURE:
<223> OTHER INFORMATION: Light chain variable region CDR1

<400> SEQUENCE: 7

Lys Ala Ser Arg Asn Ile Glu Arg Gln Leu Ala
1               5                   10

<210> SEQ ID NO 8
<211> LENGTH: 7
<212> TYPE: PRT
<213> ORGANISM: Artificial Sequence
<220> FEATURE:
<223> OTHER INFORMATION: Light chain variable region CDR2

<400> SEQUENCE: 8

Gln Ala Ser Arg Lys Glu Ser
1               5

<210> SEQ ID NO 9
<211> LENGTH: 9
<212> TYPE: PRT
<213> ORGANISM: Artificial Sequence
<220> FEATURE:
<223> OTHER INFORMATION: Light chain variable region CDR3

<400> SEQUENCE: 9

Gln Gln Tyr Ser Asp Pro Pro Leu Thr
1               5

<210> SEQ ID NO 10
<211> LENGTH: 448
<212> TYPE: PRT
<213> ORGANISM: Artificial Sequence
<220> FEATURE:
<223> OTHER INFORMATION: Heavy chain

<400> SEQUENCE: 10

Gln Val Gln Leu Val Glu Ser Gly Gly Gly Leu Val Gln Pro Gly Gly
1               5                   10                  15
```

```
Ser Leu Arg Leu Ser Cys Ala Ala Ser Gly Phe Thr Phe Ser Tyr Tyr
         20                  25                  30

Asp Ile Gln Trp Val Arg Gln Ala Pro Gly Lys Gly Leu Glu Trp Val
             35                  40                  45

Ser Ser Ile Ser Pro Ser Gly Gln Ser Thr Tyr Tyr Arg Arg Glu Val
 50                  55                  60

Lys Gly Arg Phe Thr Ile Ser Arg Asp Asn Ser Lys Asn Thr Leu Tyr
 65                  70                  75                  80

Leu Gln Met Asn Ser Leu Arg Ala Glu Asp Thr Ala Val Tyr Tyr Cys
                 85                  90                  95

Ala Arg Arg Thr Gly Arg Glu Tyr Gly Gly Trp Tyr Phe Asp Tyr
                100                 105                 110

Trp Gly Gln Gly Thr Leu Val Thr Val Ser Ser Ala Ser Thr Lys Gly
             115                 120                 125

Pro Ser Val Phe Pro Leu Ala Pro Cys Ser Arg Ser Thr Ser Glu Ser
         130                 135                 140

Thr Ala Ala Leu Gly Cys Leu Val Lys Asp Tyr Phe Pro Glu Pro Val
145                 150                 155                 160

Thr Val Ser Trp Asn Ser Gly Ala Leu Thr Ser Gly Val His Thr Phe
                165                 170                 175

Pro Ala Val Leu Gln Ser Ser Gly Leu Tyr Ser Leu Ser Ser Val Val
             180                 185                 190

Thr Val Pro Ser Ser Ser Leu Gly Thr Gln Thr Tyr Thr Cys Asn Val
         195                 200                 205

Asp His Lys Pro Ser Asn Thr Lys Val Asp Lys Arg Val Glu Ser Lys
210                 215                 220

Tyr Gly Pro Pro Cys Pro Pro Cys Pro Ala Pro Glu Phe Leu Gly Gly
225                 230                 235                 240

Pro Ser Val Phe Leu Phe Pro Pro Lys Pro Lys Asp Thr Leu Met Ile
             245                 250                 255

Ser Arg Thr Pro Glu Val Thr Cys Val Val Val Asp Val Ser Gln Glu
         260                 265                 270

Asp Pro Glu Val Gln Phe Asn Trp Tyr Val Asp Gly Val Glu Val His
     275                 280                 285

Asn Ala Lys Thr Lys Pro Arg Glu Glu Gln Tyr Asn Ser Thr Tyr Arg
290                 295                 300

Val Val Ser Val Leu Thr Val Leu His Gln Asp Trp Leu Asn Gly Lys
305                 310                 315                 320

Glu Tyr Lys Cys Lys Val Ser Asn Lys Gly Leu Pro Ser Ser Ile Glu
             325                 330                 335

Lys Thr Ile Ser Lys Ala Lys Gly Gln Pro Arg Glu Pro Gln Val Tyr
         340                 345                 350

Thr Leu Pro Pro Ser Gln Lys Glu Met Thr Lys Asn Gln Val Ser Leu
     355                 360                 365

Thr Cys Leu Val Lys Gly Phe Tyr Pro Ser Asp Ile Ala Val Glu Trp
         370                 375                 380

Glu Ser Asn Gly Gln Pro Glu Asn Asn Tyr Lys Thr Thr Pro Pro Val
385                 390                 395                 400

Leu Asp Ser Asp Gly Ser Phe Phe Leu Tyr Ser Lys Leu Thr Val Asp
             405                 410                 415

Lys Ser Arg Trp Gln Glu Gly Asn Val Phe Ser Cys Ser Val Met His
         420                 425                 430
```

Glu Ala Leu His Asn Arg Tyr Thr Gln Lys Ser Leu Ser Leu Ser Pro
            435                 440                 445

<210> SEQ ID NO 11
<211> LENGTH: 444
<212> TYPE: PRT
<213> ORGANISM: Artificial Sequence
<220> FEATURE:
<223> OTHER INFORMATION: Heavy chain

<400> SEQUENCE: 11

Gln Val Gln Leu Val Gln Ser Gly Ser Glu Leu Lys Lys Pro Gly Ala
1               5                   10                  15

Ser Val Lys Val Ser Cys Lys Ala Ser Gly Tyr Thr Phe Thr Asp Asn
            20                  25                  30

Asn Met Asp Trp Val Arg Gln Ala Pro Gly Gln Gly Leu Glu Trp Met
        35                  40                  45

Gly Asp Ile Asn Thr Arg Ser Gly Gly Ser Ile Tyr Asn Glu Glu Phe
    50                  55                  60

Gln Asp Arg Val Ile Met Thr Val Asp Lys Ser Thr Asp Thr Ala Tyr
65                  70                  75                  80

Met Glu Leu Ser Ser Leu Arg Ser Glu Asp Thr Ala Thr Tyr His Cys
                85                  90                  95

Ala Arg Arg Lys Ser Tyr Gly Tyr Tyr Leu Asp Glu Trp Gly Glu Gly
            100                 105                 110

Thr Leu Val Thr Val Ser Ser Ala Ser Thr Lys Gly Pro Ser Val Phe
        115                 120                 125

Pro Leu Ala Pro Cys Ser Arg Ser Thr Ser Glu Ser Thr Ala Ala Leu
    130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Gln Thr Tyr Thr Cys Asn Val Asp His Lys Pro
        195                 200                 205

Ser Asn Thr Lys Val Asp Lys Arg Val Glu Ser Lys Tyr Gly Pro Pro
    210                 215                 220

Cys Pro Pro Cys Pro Ala Pro Glu Phe Leu Gly Gly Pro Ser Val Phe
225                 230                 235                 240

Leu Phe Pro Pro Lys Pro Lys Asp Thr Leu Met Ile Ser Arg Thr Pro
                245                 250                 255

Glu Val Thr Cys Val Val Val Asp Val Ser Gln Glu Asp Pro Glu Val
            260                 265                 270

Gln Phe Asn Trp Tyr Val Asp Gly Val Glu Val His Asn Ala Lys Thr
        275                 280                 285

Lys Pro Arg Glu Glu Gln Tyr Asn Ser Thr Tyr Arg Val Val Ser Val
    290                 295                 300

Leu Thr Val Leu His Gln Asp Trp Leu Asn Gly Lys Glu Tyr Lys Cys
305                 310                 315                 320

Lys Val Ser Asn Lys Gly Leu Pro Ser Ser Ile Glu Lys Thr Ile Ser
                325                 330                 335

Lys Ala Lys Gly Gln Pro Arg Glu Pro Gln Val Tyr Thr Leu Pro Pro
            340                 345                 350

```
Ser Gln Glu Met Thr Lys Asn Gln Val Ser Leu Thr Cys Leu Val
            355                 360                 365

Lys Gly Phe Tyr Pro Ser Asp Ile Ala Val Glu Trp Glu Ser Asn Gly
370                 375                 380

Gln Pro Glu Asn Asn Tyr Lys Thr Thr Pro Pro Val Leu Asp Ser Asp
385                 390                 395                 400

Gly Ser Phe Phe Leu Tyr Ser Lys Leu Thr Val Asp Lys Ser Arg Trp
                405                 410                 415

Gln Glu Gly Asn Val Phe Ser Cys Ser Val Met His Glu Ala Leu His
            420                 425                 430

Asn His Tyr Thr Gln Glu Ser Leu Ser Leu Ser Pro
            435                 440
```

<210> SEQ ID NO 12
<211> LENGTH: 214
<212> TYPE: PRT
<213> ORGANISM: Artificial Sequence
<220> FEATURE:
<223> OTHER INFORMATION: Light chain

<400> SEQUENCE: 12

```
Asp Ile Gln Met Thr Gln Ser Pro Ser Ser Leu Ser Ala Ser Val Gly
1               5                   10                  15

Asp Arg Val Thr Ile Thr Cys Lys Ala Ser Arg Asn Ile Glu Arg Gln
            20                  25                  30

Leu Ala Trp Tyr Gln Gln Lys Pro Gly Gln Ala Pro Glu Leu Leu Ile
        35                  40                  45

Tyr Gln Ala Ser Arg Lys Glu Ser Gly Val Pro Asp Arg Phe Ser Gly
50                  55                  60

Ser Arg Tyr Gly Thr Asp Phe Thr Leu Thr Ile Ser Ser Leu Gln Pro
65                  70                  75                  80

Glu Asp Ile Ala Thr Tyr Tyr Cys Gln Gln Tyr Ser Asp Pro Pro Leu
                85                  90                  95

Thr Phe Gly Gly Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210
```

<210> SEQ ID NO 13
<211> LENGTH: 123
<212> TYPE: PRT
<213> ORGANISM: Artificial Sequence
<220> FEATURE:
<223> OTHER INFORMATION: Heavy chain variable region

<400> SEQUENCE: 13

Gln Val Gln Leu Val Glu Ser Gly Gly Leu Val Gln Pro Gly Gly
1               5                   10                  15

Ser Leu Arg Leu Ser Cys Ala Ala Ser Gly Phe Thr Phe Ser Tyr Tyr
            20                  25                  30

Asp Ile Gln Trp Val Arg Gln Ala Pro Gly Lys Gly Leu Glu Trp Val
            35                  40                  45

Ser Ser Ile Ser Pro Ser Gly Gln Ser Thr Tyr Tyr Arg Arg Glu Val
50                      55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Arg Thr Gly Arg Glu Tyr Gly Gly Gly Trp Tyr Phe Asp Tyr
            100                 105                 110

Trp Gly Gln Gly Thr Leu Val Thr Val Ser Ser
        115                 120

<210> SEQ ID NO 14
<211> LENGTH: 119
<212> TYPE: PRT
<213> ORGANISM: Artificial Sequence
<220> FEATURE:
<223> OTHER INFORMATION: Heavy chain variable region

<400> SEQUENCE: 14

Gln Val Gln Leu Val Gln Ser Gly Ser Glu Leu Lys Lys Pro Gly Ala
1               5                   10                  15

Ser Val Lys Val Ser Cys Lys Ala Ser Gly Tyr Thr Phe Thr Asp Asn
            20                  25                  30

Asn Met Asp Trp Val Arg Gln Ala Pro Gly Gln Gly Leu Glu Trp Met
            35                  40                  45

Gly Asp Ile Asn Thr Arg Ser Gly Gly Ser Ile Tyr Asn Glu Glu Phe
50                      55                  60

Gln Asp Arg Val Ile Met Thr Val Asp Lys Ser Thr Asp Thr Ala Tyr
65                  70                  75                  80

Met Glu Leu Ser Ser Leu Arg Ser Glu Asp Thr Ala Thr Tyr His Cys
                85                  90                  95

Ala Arg Arg Lys Ser Tyr Gly Tyr Tyr Leu Asp Glu Trp Gly Glu Gly
            100                 105                 110

Thr Leu Val Thr Val Ser Ser
        115

<210> SEQ ID NO 15
<211> LENGTH: 107
<212> TYPE: PRT
<213> ORGANISM: Artificial Sequence
<220> FEATURE:
<223> OTHER INFORMATION: Light chain variable region

<400> SEQUENCE: 15

Asp Ile Gln Met Thr Gln Ser Pro Ser Ser Leu Ser Ala Ser Val Gly
1               5                   10                  15

Asp Arg Val Thr Ile Thr Cys Lys Ala Ser Arg Asn Ile Glu Arg Gln
            20                  25                  30

Leu Ala Trp Tyr Gln Gln Lys Pro Gly Gln Ala Pro Glu Leu Leu Ile
            35                  40                  45

Tyr Gln Ala Ser Arg Lys Glu Ser Gly Val Pro Asp Arg Phe Ser Gly

```
                    50                  55                  60
Ser Arg Tyr Gly Thr Asp Phe Thr Leu Thr Ile Ser Ser Leu Gln Pro
 65                  70                  75                  80

Glu Asp Ile Ala Thr Tyr Tyr Cys Gln Gln Tyr Ser Asp Pro Pro Leu
                 85                  90                  95

Thr Phe Gly Gly Gly Thr Lys Val Glu Ile Lys
                100                 105
```

ANTIBODY-CONTAINING PREPARATION

CROSS-REFERENCE TO RELATED APPLICATIONS

This application is the National Stage of International Application Serial No. PCT/JP2017/016658, filed on Apr. 27, 2017, which claims the benefit of Japanese Application Serial No. 2016-090590, filed on Apr. 28, 2016.

TECHNICAL FIELD

The present invention relates to formulations comprising a bispecific antibody functionally substituting for blood coagulation factor VIII (FVIII) that binds to blood coagulation factor IX (FIX) and/or activated blood coagulation factor IX (FIXa) and blood coagulation factor X (FX).

BACKGROUND ART

Bispecific antibodies functionally substituting for FVIII that bind to blood coagulation factor IX (FIX) and/or activated blood coagulation factor IX (FIXa) and blood coagulation factor X (FX) have been discovered (Non-Patent Literature 1 and 2; Patent Literature 1 to 3). The bispecific antibody Emicizumab (ACE910) ameliorates the decrease in coagulation reaction due to FVIII deficiency and dysfunction by functionally substituting for FVIII; therefore, clinical trials are being conducted on hemophilia A patients.

Many solution formulations of antibodies have been developed, and solution formulations of high-concentrated antibodies reported so far are formulations using histidine and arginine (Patent Literature 4) and formulations using a histidine/aspartate buffer (Patent Literature 5). Meanwhile, a stable liquid pharmaceutical antibody formulation comprising amyloid β (Aβ) that uses histidine/histidine-HCl as the buffer (Patent Literature 6) has been reported.

However, stable solution formulations in which aggregate formation and/or components with charge heterogeneity are suppressed have not been reported for solution formulations comprising the aforementioned bispecific antibodies.

CITATION LIST

Patent Literature

[Patent Literature 1] WO2005/035756
[Patent Literature 2] WO2006/109592
[Patent Literature 3] WO2012/067176
[Patent Literature 4] WO2002/030463
[Patent Literature 5] WO2011/090088
[Patent Literature 6] WO2013/131866

Non-Patent Literature

[Non-Patent Literature 1] Nat Med. 2012; 18(10):1570-74
[Non-Patent Literature 2] PLoS One. 2013; 8(2):e57479

SUMMARY OF THE INVENTION

Problems to be Solved

An objective of the present invention is to provide stable solution formulations comprising Emicizumab (ACE910) which is a bispecific antibody functionally substituting for FVIII that binds to FIX and/or FIXa and FX.

Means for Solving the Problems

As a result of dedicated research to accomplish the above-mentioned objective, the present inventors discovered that a solution formulation of pH 4.5 to 6.5 that comprises the aforementioned bispecific antibody at 20 to 180 mg/mL, 10 mM to 40 mM histidine/aspartate buffer, Poloxamer 188 at 0.2 to 1 mg/mL, and 100 mM to 300 mM arginine, can be a stable antibody-containing solution formulation in which aggregate formation and/or components with charge heterogeneity are suppressed, and thereby completed the present invention.

Specifically, the present invention provides the following:
[1] An antibody solution formulation of pH 4.5 to 6.5, which comprises:
  a bispecific antibody at 20 to 180 mg/mL, wherein a first polypeptide and a third polypeptide form a pair, and a second polypeptide and a fourth polypeptide form a pair, wherein the first polypeptide comprises an H chain comprising the amino acid sequences of H-chain CDRs 1, 2, and 3 of SEQ ID NOs: 1, 2, and 3 (H-chain CDRs of Q499), respectively; the second polypeptide comprises an H chain comprising the amino acid sequences of H-chain CDRs 1, 2, and 3 of SEQ ID NOs: 4, 5, and 6 (H-chain CDRs of J327), respectively; and the third polypeptide and the fourth polypeptide comprise a common L chain comprising the amino acid sequences of L-chain CDRs 1, 2, and 3 of SEQ ID NOs: 7, 8, and 9 (L-chain CDRs of L404), respectively;
  10 mM to 40 mM histidine/aspartate buffer;
  0.2 to 1 mg/mL Poloxamer 188; and
  100 mM to 300 mM arginine.
[2] The antibody solution formulation of [1], wherein in the bispecific antibody, the first polypeptide and the third polypeptide form a pair, and the second polypeptide and the fourth polypeptide form a pair, wherein the first polypeptide comprises an H chain comprising the amino acid sequence of SEQ ID NO: 10; the second polypeptide comprises an H chain comprising the amino acid sequence of SEQ ID NO: 11, and the third polypeptide and the fourth polypeptide comprise a common L chain of SEQ ID NO: 12.
[3] The antibody solution formulation of [1] or [2], wherein the concentration of Poloxamer 188 is 0.5 mg/mL.
[4] The antibody solution formulation of any one of [1] to [3], wherein said pH is 6.0.
[5] The antibody solution formulation of any one of [1] to [4], wherein the concentration of histidine/aspartate buffer is 20 mM.
[6] The antibody solution formulation of any one of [1] to [5], wherein the concentration of arginine is 150 mM.
[7] The antibody solution formulation of any one of [1] to [6], which does not substantially contain a chloride ion or an acetate ion.
[8] An antibody solution formulation of pH 6, which comprises:
  a bispecific antibody at 20 to 180 mg/mL, wherein a first polypeptide and a third polypeptide form a pair, and a second polypeptide and a fourth polypeptide form a pair, wherein the first polypeptide comprises an H chain comprising the amino acid sequence of SEQ ID NO: 10; the second polypeptide comprises an H chain comprising the amino acid sequence of SEQ ID NO: 11; and the third polypeptide and the fourth polypeptide comprise a common L chain of SEQ ID NO: 12;
  20 mM L-histidine/aspartate buffer;
  0.5 mg/mL Poloxamer 188; and
  150 mM L-arginine.

[9] The antibody solution formulation of any one of [1] to [8], for use in subcutaneous administration.

[10] The antibody solution formulation of any one of [1] to [9], for use in the treatment of hemophilia A.

[11] A method for stabilizing an antibody in an antibody-containing solution formulation, which comprises adding a histidine/aspartate buffer, Poloxamer 188, and arginine to the solution, whereby the concentration of the histidine/aspartate buffer is 10 mM to 40 mM, the concentration of Poloxamer 188 is 0.2 to 1 mg/mL, and the concentration of arginine is 100 mM to 300 mM.

[12] A method for suppressing the association (aggregate formation) of an antibody in an antibody-containing solution formulation, which comprises adding a histidine/aspartate buffer, Poloxamer 188, and arginine to the solution, whereby the concentration of the histidine/aspartate buffer is 10 mM to 40 mM, the concentration of Poloxamer 188 is 0.2 to 1 mg/mL, and the concentration of arginine is 100 mM to 300 mM.

[13] A method for suppressing a component with charge heterogeneity in an antibody-containing formulation, which comprises adding a histidine/aspartate buffer to the solution, wherein the concentration of histidine/aspartate buffer is 10 mM to 40 mM.

Effect of the Invention

The present invention provides antibody-containing formulations which show excellent stability. Furthermore, providing antibody-containing formulations in which aggregate formation and/or components with charge heterogeneity are suppressed in its solution state has been also enabled by the present invention.

MEANS FOR CARRYING OUT THE INVENTION

Figure 1:
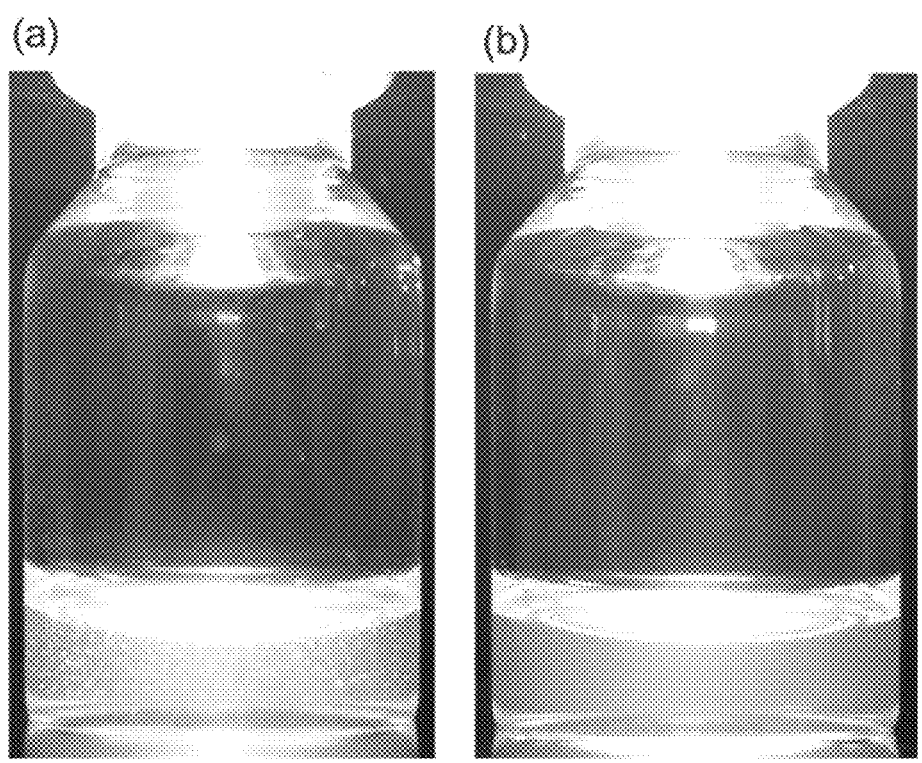
FIG. 1 shows photographs indicating insoluble foreign substances present after the shaking tests of EXAMPLE 8 (a: 0 mg/mL Poloxamer188; b: 0.5 mg/mL Poloxamer188).

The present invention will be described in detail below.

The present invention provides a solution formulation of pH 4.5 to 7.5 that comprises: Emicizumab (ACE910) at 20 to 180 mg/mL which is a bispecific antibody functionally substituting for FVIII that binds to FIX and/or FIXa and FX; 10 mM to 40 mM histidine/aspartate buffer; Poloxamer 188 at 0.2 to 1 mg/mL; and 100 mM to 300 mM arginine.

Emicizumab (ACE910), which is the aforementioned bispecific antibody, is described below.

A bispecific antibody (Q499-z121/J327-z119/L404-k) where a first polypeptide and a third polypeptide form a pair, and a second polypeptide and a fourth polypeptide form a pair; where the first polypeptide comprises an H chain comprising the amino acid sequences of H-chain CDRs 1, 2, and 3 of SEQ ID NOs: 1, 2, and 3 (H-chain CDRs of Q499), respectively; the second polypeptide comprises an H chain comprising the amino acid sequences of H-chain CDRs 1, 2, and 3 of SEQ ID NOs: 4, 5, and 6 (H-chain CDRs of J327), respectively; and the third polypeptide and the fourth polypeptide comprise a common L chain comprising the amino acid sequences of L-chain CDRs 1, 2, and 3 of SEQ ID NOs: 7, 8, and 9 (L-chain CDRs of L404), respectively.

More specifically, the aforementioned bispecific antibody is a bispecific antibody where a first polypeptide and a third polypeptide form a pair, and a second polypeptide and a fourth polypeptide form a pair; where the first polypeptide comprises an H chain comprising the amino acid sequence of H-chain variable region of SEQ ID NO: 13, the second polypeptide comprises an H chain comprising the amino acid sequence of H-chain variable region of SEQ ID NO: 14, and the third polypeptide and the fourth polypeptide comprise a common L chain comprising the amino acid sequence of L-chain variable region of SEQ ID NO: 15.

More specifically, the aforementioned bispecific antibody is a bispecific antibody (Q499-z121/J327-z119/L404-k) where a first polypeptide and a third polypeptide form a pair, and a second polypeptide and a fourth polypeptide form a pair; where the first polypeptide comprises an H chain comprising the amino acid sequence of SEQ ID NO: 10, the second polypeptide comprises an H chain comprising the amino acid sequence of SEQ ID NO: 11, and the third polypeptide and the fourth polypeptide comprise a common L chain of SEQ ID NO: 12. Such antibodies can be obtained by the methods described in WO2005/035756, WO2006/109592, WO2012/067176, and such.

The antibody concentration in a formulation of the present invention is not particularly limited, but is preferably 20 mg/mL to 180 mg/mL. Examples include 20 mg/mL, 30 mg/mL, 40 mg/mL, 120 mg/mL, 150 mg/mL, and 180 mg/mL. The upper limit of the antibody concentration of a formulation of the present invention is not particularly limited, but is ordinarily 250 mg/mL.

Antibodies used in the present invention are not particularly limited so long as they bind to a desired antigen, and they may be polyclonal or monoclonal antibodies. Monoclonal antibodies are preferred in that homogeneous antibodies can be stably produced.

Amino acids contained in the amino acid sequences of the present invention may be post-translationally modified (for example, the modification of an N-terminal glutamine into a pyroglutamic acid by pyroglutamylation is well-known to those skilled in the art). Naturally, such post-translationally modified amino acids are included in the antibodies used in the present invention.

In the present invention, the phrase "functionally substituting for FVIII" means recognizing FIX or FIXa, and FX, and promoting FX activation by FIXa (promoting FXa production by FIXa). FXa production-promoting activity can be evaluated using, for example, a measurement system comprising FXIa, FX, synthetic substrate S-2222 (synthetic substrate of FXa), and phospholipids. Such a measurement system shows a correlation with the disease severity and clinical symptoms in hemophilia A cases (Rosen S, Andersson M, Blomba¨ck M et al. Clinical applications of a chromogenic substrate method for determination of FVIII activity. Thromb Haemost 1985; 54: 811-23).

In the present invention, the term "common L chain" refers to an L chain that can form pairs with each of two or more different H chains, and show binding ability to each antigen. Herein, the term "different H chains" preferably refers to H chains of antibodies against different antigens, but is not limited thereto; it refers to H chains whose amino acid sequences are different from each other. Common L chains can be obtained, for example, according to the method described in WO 2006/109592.

In the present invention, the term "stable antibody-containing formulation" refers to a formulation in which aggregates and/or components with charge heterogeneity from proteins such as antibodies are difficult to be generated, i.e., the formulations in which deterioration reactions, including generation of insoluble aggregates, soluble aggregates, components with charge heterogeneity, are difficult to occur in the solution.

"Components with charge heterogeneity" refer to components having protein surface charges that are different from those of the major component due to deamidation, oxidation, hydrolysis, and such.

In the present invention, "polypeptide" generally refers to peptides and proteins having a length of approximately ten amino acids or longer. Ordinarily, they are biologically derived polypeptides, but are not particularly limited thereto, and may be, for example, polypeptides comprising an artificially designed sequence. Furthermore, they may be any naturally-occurring polypeptides, synthetic polypeptides, recombinant polypeptides, or such. Additionally, fragments of the above-mentioned polypeptides are also included in the polypeptides of the present invention.

The term "antibody" is used in the broadest sense, and includes monoclonal antibodies, polyclonal antibodies, dimers, multimers, multispecific antibodies (such as bispecific antibodies), antibody derivatives, and modified antibodies (Miller K et al. J Immunol. 2003, 170(9), 4854-61) so long as they show a desired biological activity. The antibodies may be mouse antibodies, human antibodies, humanized antibodies, chimeric antibodies, or those derived from another species, or artificially synthesized antibodies. The antibodies disclosed herein can be of any type (for example, IgG, IgE, IgM, IgD, and IgA), class (for example, IgG1, IgG2, IgG3, IgG4, IgA1 and IgA2) or subclass of immunoglobulin molecules. The immunoglobulins can be derived from any species (for example, human, mouse, or rabbit). The terms "antibody", "immune globulin" and "immunoglobulin" are used interchangeably in a broad sense.

"Bispecific antibody" refers to an antibody having two variable regions that each recognize different epitopes, where the variable regions are present in the same antibody molecule. Bispecific antibodies may be antibodies that recognize two or more different antigens, or antibodies that recognize two or more different epitopes on the same antigen. Bispecific antibodies may include not only whole antibodies but antibody derivatives.

Recombinant antibodies produced by using genetic engineering techniques can be used as the antibodies. A recombinant antibody can be obtained by cloning a DNA encoding the antibody from hybridomas or antibody-producing cells such as sensitized lymphocytes that produce antibodies; inserting this into a vector; and then introducing it into hosts (host cells) to produce the antibody.

Bispecific antibodies are not limited to those of the IgG type; for example, IgG-type bispecific antibodies can be secreted from a hybrid hybridoma (quadroma) produced by fusing two types of hybridomas that produce IgG antibodies (Milstein C. et al., Nature 1983, 305: 537-540). They can also be secreted by introducing into cells the L-chain and H-chain genes constituting the two kinds of IgGs of interest, i.e., a total of four kinds of genes, to co-express the genes.

Antibodies of the present invention can be produced by methods known to those skilled in the art. Specifically, a DNA encoding the antibody of interest is inserted into an expression vector. The insertion into the expression vector is carried out such that the expression will take place under the control of expression regulatory regions such as an enhancer and a promoter. Next, host cells are transformed using this expression vector to express the antibody. Appropriate combinations of a host and an expression vector can be used in this case.

The antibodies of the present invention thus obtained can be isolated from the inside of host cells or the outside of the cells (medium, etc.), and purified to be substantially pure, homogeneous antibodies. The antibodies can be separated and purified by methods ordinarily used for separating and purifying antibodies, and the methods are not limited in any way. For example, the antibodies can be separated and purified by appropriately selecting and combining column chromatography, filtration, ultrafiltration, salting-out, solvent precipitation, solvent extraction, distillation, immunoprecipitation, SDS-polyacrylamide gel electrophoresis, isoelectrofocusing, dialysis, recrystallization, and such.

In a preferred aspect, the histidine/aspartate buffer in a formulation of the present invention is a buffer prepared by titrating a solution such as an aqueous solution supplemented with histidine as a free amino acid with a liquid such as an aqueous solution containing aspartic acid as a free amino acid. Alternatively, the buffer can be prepared by adding the amino acids in the reverse order, or by direct titration with powders.

The present inventors conducted freeze-thawing tests, thermal acceleration tests, long term storage tests, and cryopreservation tests to assess the effects of various additives on the stability of samples containing the above-mentioned bispecific antibodies during their storage. As a result, the present inventors discovered that aggregate formation and/or components with charge heterogeneity are suppressed by using a histidine buffer, as compared to phosphate buffer, citrate buffer, and acetate buffer.

Furthermore, the present inventors discovered that aggregate formation and/or components with charge heterogeneity are suppressed by using aspartic acid which is an acidic amino acid as a counter ion species for the buffer, i.e., by using histidine/aspartate buffer as the buffer.

The concentration (amount) of the histidine/aspartate buffer in formulations of the present invention is preferably 10 to 100 mM, and more preferably 10 to 40 mM. Furthermore, examples of the concentration (amount) of the histidine/aspartate buffer are 10 mM, 20 mM, and 40 mM.

Furthermore, compared to sodium chloride which is reported to be a stabilizer for antibody-containing formulations, addition of arginine was found to show higher stabilization effects (i.e., effects of suppressing aggregate formation and effects of suppressing components with charge heterogeneity).

The concentration (amount) of arginine in formulations of the present invention is preferably 100 mM to 300 mM. Examples of the arginine concentration (amount) include 100 mM, 150 mM, 200 mM, and 300 mM.

The solution pH of a formulation of the present invention is preferably 4.5 to 6.5, more preferably 5.5 to 6.5, and even more preferably 5.5 to 6. Examples of pH include 5.5 and 6.

Surfactants contained in formulations of the present invention are, for example polysorbate 20 (PS20), and Pluronic F-68 (Poloxamer 188: polyethylene (160) polyoxypropylene (30) glycol), and Poloxamer 188 is particularly preferred. The amount of Poloxamer 188 (or PX188) added to a formulation of the present invention is preferably 0.2 mg/mL to 1 mg/mL. Examples of the amount of Poloxamer 188 added to the formulation include 0.2 mg/mL, 0.5 mg/mL, 0.8 mg/mL, and 1 mg/mL.

The histidine used in the present invention may be histidine itself or a derivative thereof, and L-histidine is particularly desirable. The arginine used in the present invention may be arginine itself, a derivative thereof, or a salt thereof, and L-arginine or a salt thereof is particularly desirable. Preferred salts of arginine include aspartate salt and glutamate salt.

The formulations of the present invention may further contain amino acids. Preferred amino acids for use in the present invention are natural amino acids or amino acid derivatives, and particularly preferred amino acids are L-methionine and L-proline.

The formulations of the present invention may further contain sugars. Preferred sugars used in the present invention are sucrose, trehalose, meglumine, and sorbitol.

The amount of amino acid or sugar added to the formulations of the present invention is generally 1 mM to 1000 mM, preferably 5 mM to 500 mM, and more preferably 10 mM to 300 mM.

The formulations of the present invention may further contain inorganic salts. The preferred inorganic salts used in the present invention are magnesium salts and calcium salts.

Furthermore, it is preferred that the formulations of the present invention do not contain anions other than aspartic acid as a counter ion for the buffer (buffering agent) or stabilizer. In an aspect, examples of such formulations include formulations that do not substantially contain chloride ion or acetate ion. "Substantially do not contain chloride ion or acetate ion" means that the concentrations of chloride ion and acetate ion are, for example, 5 mM or less, preferably 2 mM or less, and more preferably 1 mM or less. Highly stable antibody-containing formulations can be produced without increasing the osmotic pressure by using aspartic acid which has a large stabilizing effect as a counter ion and not substantially including chloride ion or acetate ion with a small stabilization effect.

If needed, the formulations of the present invention may additionally contain appropriate cryoprotectants, suspending agents, solubilizing agents, isotonizing agents, preservatives, adsorption inhibitors, diluents, excipients, pH adjustors, analgesics, sulfur-containing reducing agents, antioxidants, and such.

Cryoprotectants include, for example, sugars such as trehalose, sucrose, and sorbitol.

Solubilizing agents include, for example, polyoxyethylene hardened castor oil, polysorbate 80, nicotinamide, polyoxyethylene sorbitan monolaurate, macrogol, and castor oil fatty acid ethyl ester.

Isotonizing agents include, for example, sodium chloride, potassium chloride, and calcium chloride.

Preservatives include, for example, methyl-p-hydroxybenzoate, ethyl-p-hydroxybenzoate, sorbic acid, phenol, cresol, and chlorocresol.

Adsorption inhibitors include, for example, human serum albumin, lecithin, dextran, ethylene oxide/propylene oxide copolymer, hydroxypropyl cellulose, methyl cellulose, polyoxyethylene hardened castor oil, and polyethylene glycol.

Sulfur-containing reducing agents include, for example, those containing sulfhydryl groups such as N-acetylcysteine, N-acetylhomocysteine, thioctic acid, thiodiglycol, thioethanol amine, thioglycerol, thiosorbitol, thioglycolic acid and salts thereof, sodium thiosulfate, glutathione, and thioalkanoic acids having one to seven carbon atoms.

Antioxidants include, for example, erythorbic acid, dibutylhydroxytoluene, butylhydroxyanisole, α-tocopherol, tocopherol acetate, L-ascorbic acid and salts thereof, L-ascorbic acid palmitate, L-ascorbic acid stearate, sodium hydrogen sulfite, sodium sulfite, triamyl gallate, propyl gallate, and chelating agents such as disodium ethylenediamine tetraacetate (EDTA), sodium pyrophosphate, and sodium metaphosphate.

In an embodiment, the formulation of the present invention is the following:
an antibody solution formulation of pH 6, which comprises:
  a bispecific antibody at 20 to 180 mg/mL, wherein a first polypeptide and a third polypeptide form a pair, and a second polypeptide and a fourth polypeptide form a pair, wherein the first polypeptide comprises an H chain comprising the amino acid sequence of SEQ ID NO: 10, the second polypeptide comprises an H chain comprising the amino acid sequence of SEQ ID NO: 11, and the third polypeptide and the fourth polypeptide comprises a common L chain of SEQ ID NO: 12;
  20 mM L-histidine/aspartate buffer;
  0.5 mg/mL Poloxamer 188; and
  150 mM L-arginine;
or
an antibody solution formulation of pH 6, which comprises:
  the bispecific antibody Emicizumab (ACE910) at 20 to 180 mg/mL,
  20 mM L-histidine/aspartate buffer;
  0.5 mg/mL Poloxamer 188; and
  150 mM L-arginine.

In another embodiment, the formulation of the present invention is the following:
an antibody solution formulation of pH 6, which comprises:
  a bispecific antibody at 20 to 180 mg/mL, wherein a first polypeptide and a third polypeptide form a pair, and a second polypeptide and a fourth polypeptide form a pair, wherein the first polypeptide comprises an H chain comprising the amino acid sequence of SEQ ID NO: 10, the second polypeptide comprises an H chain comprising the amino acid sequence of SEQ ID NO: 11, and the third polypeptide and the fourth polypeptide comprise a common L chain of SEQ ID NO: 12;
  20 mM L-histidine/aspartate buffer;
  0.05 mg/mL PS20; and
  150 mM L-arginine;
or
an antibody solution formulation of pH 6, which comprises:
  the bispecific antibody Emicizumab (ACE910) at 20 to 180 mg/mL,
  20 mM L-histidine/aspartate buffer;
  0.05 mg/mL PS20; and
  150 mM L-arginine.

The antibody-containing formulations of the present invention can be administered to a patient via any appropriate route, for example, by bolus injection or continuous infusion for a certain period, intravenously, intramuscularly, or subcutaneously. Intravenous administration or subcutaneous administration is preferred.

The dosage of Emicizumab (ACE910) is, for example, 0.001 to 1000 mg/kg, and the interval of administration is at least one day or longer.

More specifically, for example, after administering Emicizumab (ACE910) at an initial dose of 1 mg/kg, Emicizumab (ACE910) can be administered at a continuous dose of 0.3 mg/kg once a week. Alternatively, for example, after administering Emicizumab (ACE910) at an initial dose of 3 mg/kg, Emicizumab (ACE910) can be administered at a continuous dose of 1 mg/kg once a week. In another example, after administering Emicizumab (ACE910) at an initial dose of 3 mg/kg, Emicizumab (ACE910) can be administered at a continuous dose of 3 mg/kg once a week.

Antibody-containing formulations of the present invention can be used for diseases that develop and/or progress due to the reduction or deficiency in the activity of FVIII and/or activated blood coagulation factor VIII (FVIIIa). For example, they can be used for hemophilia A, hemophilia A in which an inhibitor against FVIII/FVIIIa has appeared, acquired hemophilia A, von Willebrand's disease, without being particularly limited thereto.

Another embodiment of the present invention is a method for stabilizing an antibody in an antibody-containing solution formulation. Preferably, the method for stabilizing an antibody in an antibody-containing solution formulation comprises adding a histidine/aspartate buffer, Poloxamer 188, and arginine to the solution.

Another embodiment of the present invention is a method for reducing association (aggregate formation) of an antibody in an antibody-containing solution formulation. Preferably, the method for reducing association (aggregate formation) of an antibody in an antibody-containing solution formulation comprises adding a histidine/aspartate buffer, Poloxamer 188, and arginine to the solution.

Furthermore, the above-mentioned method for stabilizing an antibody and method for reducing association (aggregate formation) of an antibody comprise adding a histidine/aspartate buffer, Poloxamer 188, and arginine to the solution, and preferably the antibody concentration is 20 to 180 mg/mL, histidine/aspartate buffer concentration is 10 mM to 40 mM, Poloxamer 188 concentration is 0.2 to 1 mg/mL, arginine concentration is 100 mM to 300 mM, and pH is 4.5 to 6.5; or more preferably the antibody concentration is 20 to 180 mg/mL, histidine/aspartate buffer concentration is 20 mM, Poloxamer 188 concentration is 0.5 mg/mL, arginine concentration is 150 mM, and pH is 6.

Another embodiment of the present invention is a method for decreasing a component with charge heterogeneity in an antibody-containing formulation. Preferably, the method for decreasing a component with charge heterogeneity in an antibody-containing formulation comprises adding a histidine/aspartate buffer to the solution. More preferably, the method for decreasing a component with charge heterogeneity in an antibody-containing formulation comprises adding a histidine/aspartate buffer to the solution, where the histidine/aspartate buffer concentration is 10 mM to 40 mM, or at 20 mM.

In another embodiment of the present invention, the method for decreasing a component with charge heterogeneity in an antibody-containing formulation comprises adding a histidine/aspartate buffer, Poloxamer 188, and arginine to the solution. More preferably, the method for decreasing a component with charge heterogeneity in an antibody-containing formulation comprises adding a histidine/aspartate buffer, Poloxamer 188, and arginine to the solution, and preferably the antibody concentration is 20 to 180 mg/mL, histidine/aspartate buffer concentration is 10 mM to 40 mM, Poloxamer 188 concentration is 0.2 to 1 mg/mL, arginine concentration is 100 mM to 300 mM, and pH is 4.5 to 6.5, or more preferably the antibody concentration is 20 to 180 mg/mL, histidine/aspartate buffer concentration is 20 mM, Poloxamer 188 concentration is 0.5 mg/mL, arginine concentration is 150 mM, and pH is 6.

In the above-mentioned method for stabilizing an antibody, the method for reducing association (aggregate formation) of an antibody, and the method for decreasing a component with charge heterogeneity, the antibody is preferably a bispecific antibody and more preferably Emicizumab (ACE910).

As used herein, aspects referred to by the expression "comprising" include those referred to by the expression "essentially consisting of", and those referred to by the expression "consisting of".

Numerical values recited herein may vary within a certain range, for example, depending on the instruments or equipment, measurement conditions, and procedure used by those skilled in the art, and so long as they are within a range that allows the objective of the invention to be accomplished, they may encompass a deviation of approximately 10%, for example.

All patents and references explicitly cited herein are incorporated by reference into this specification in its entirety.

The present invention will be further illustrated by the Examples below, but it is not to be construed as being limited thereto.

EXAMPLES

Example 1

Aggregate-Suppressing Effects of Histidine During Thermally Accelerated Storage of the Humanized IgG4 Antibody ACE910

(1) Materials

ACE910 is a bispecific humanized IgG4 antibody that recognizes both blood coagulation factor IX and blood coagulation factor X, which is expected to prevent bleeding in hemophilia A by functionally substituting for activated blood coagulation factor VIII.

(2) Test Samples

Liquid compositions of pH 6.0 containing ACE910 at 100 mg/mL, NaCl at 150 mmol/L, and any one the following buffers: Phosphate buffer at 20 mmol/L; Citrate buffer at 20 mmol/L; Acetate buffer at 20 mmol/L; and Histidine buffer at 20 mmol/L, were prepared. Glass vials were respectively filled with 5 to 15 µL of the compositions.

Humanized antibody-containing solution formulations thus prepared were left to stand in a thermo-regulated bath at 25° C. for eight weeks, and then used as test samples.

(3) Methods for Measuring and Calculating the Amount of ACE910 Aggregates

The amounts of aggregates in the samples were measured by size exclusion chromatography (SEC) using a G3000SW$_{XL}$ (Tosoh) column with phosphate buffer (50 mmol/L, pH 7.0) containing sodium chloride at 300 mmol/L for the mobile phase at a flow rate of 0.5 mL/min.

Of the detected peaks, the peak with the largest area and height was determined to be the monomer, and the peaks detected earlier than the monomer were collectively referred to as aggregate peaks (high molecular weight species, HMWS).

The peak areas were calculated for all of the peaks, and the peak area ratio of the peak of interest was calculated using the following equation:

The peak area ratio of the peak of interest (%)=100× (the peak area of the peak of interest)/(the peak area of the peak of interest+the total peak area of the other peaks)

(4) Results

The obtained results are shown in Table 1.

TABLE 1

Increase in aggregates (%) after storage at 25° C.

| | Δ HMW (%) | | |
|---|---|---|---|
| Formulation | 25° C.-2 W | 25° C.-4 W | 25° C.-8 W |
| Phosphate | 0.20 | 0.27 | 0.41 |
| Citrate | 0.14 | 0.21 | 0.32 |
| Acetate | 0.24 | 0.38 | 0.63 |
| Histidine | 0.08 | 0.13 | 0.22 |

As is clear from Table 1, when supplemented with histidine at 20 mmol/L, the sample showed a high aggregate-suppressing effect after thermal acceleration at 25° C. for eight weeks.

Example 2

Aggregate-Suppressing Effects of the Salt Concentration and Arginine During Thermally Accelerated Storage and Freeze-Thawing of the Humanized IgG4 Antibody ACE910
(1) Materials The antibody described in Example 1 was used.
(2) Test Samples Liquid compositions of pH 6.0 containing ACE910 at 100 mg/mL, Histidine at 20 mmol/L, and any one of the following additives: NaCl at 50 mmol/L; NaCl at 75 mmol/L, NaCl at 150 mmol/L; and Arginine at 150 mmol/L, were prepared. Glass vials were respectively filled with 5 to 15 µL of the compositions.

Humanized antibody-containing solution formulations thus prepared were left to stand in a thermo-regulated bath at 25° C. for eight weeks, or were subjected to ten cycles of freeze-thawing (F/T) (5° C./−20° C.), and then used as test samples.
(3) Methods for Measuring and Calculating the Amount of ACE910 Aggregates The methods were performed as described in Example 1.
(4) Results The obtained results are shown in Table 2.

TABLE 2

Increase in aggregates (%) after storage at 25° C. and after freeze-thawing

| | Δ HMW (%) | | | | |
|---|---|---|---|---|---|
| Formulation | 5 F/T | 10 F/T | 25° C.-2 W | 25° C.-4 W | 25° C.-8 W |
| 50 mM NaCl | 1.00 | 2.07 | 0.09 | 0.16 | 0.26 |
| 75 mM NaCl | 0.62 | 1.43 | 0.07 | 0.13 | 0.23 |
| 150 mM NaCl | 0.11 | 0.28 | 0.08 | 0.13 | 0.22 |
| 150 mM Arg | 0.03 | 0.05 | 0.03 | 0.06 | 0.11 |

As is clear from Table 2, when supplemented with arginine at 150 mmol/L, the samples showed a high aggregate-suppressing effect after the thermal acceleration test at 25° C. for eight weeks and the freeze-thawing.

Example 3

Aggregate-Suppressing Effects of Aspartic Acid During Freeze-Thawing of the Humanized IgG4 Antibody ACE910
(1) Materials The antibody described in Example 1 was used.
(2) Test Samples Liquid compositions of pH 6.0 containing ACE910 at 100 mg/mL, Histidine at 20 mmol/L, and NaCl at 150 mmol/L or sodium L-Aspartic acid at 150 mmol/L as the counter ion, were prepared. Glass vials were respectively filled with 5 to 15 µL of the compositions.

Humanized antibody-containing solution formulations thus prepared were subjected to ten cycles of freeze-thawing (5° C./−20° C.), and then used as test samples.
(3) Methods for Measuring and Calculating the Amount of ACE910 Aggregates The methods were performed as described in Example 1.
(4) Results The obtained results are shown in Table 3.

TABLE 31

Increase in aggregates (%) after freeze-thawing

| | Δ HMW (%) | |
|---|---|---|
| Formulation | 5 F/T | 10 F/T |
| NaCl | 0.11 | 0.28 |
| Na Aspartic acid | 0.05 | 0.13 |

As is clear from Table 3, when supplemented with aspartic acid, the samples showed a high aggregate-suppressing effect after the freeze-thawing.

Example 4

Effects of Suppressing Aggregates and Components with Charge Heterogeneity by pH During Thermally Accelerated Storage of the Humanized IgG4 Antibody ACE910
(1) Materials The antibody described in Example 1 was used.
(2) Test Samples Liquid compositions containing ACE910 at 100 mg/mL, Histidine-Aspartic acid at 20 mmol/L, and Arginine-Aspartic acid at 150 mmol/L, and having pH of 4.5, 5.0, 5.5, 6.0, 6.5, 7.0, or 7.5 were prepared. Glass vials were respectively filled with 5 to 15 µL of the compositions.

Humanized antibody-containing solution formulations thus prepared were left to stand in a thermo-regulated bath at 25° C. for eight weeks, and then used as test samples.
(3) Methods for Measuring and Calculating the Amount of ACE910 Aggregates The methods were performed as described in Example 1.
(4) Methods for Measuring and Calculating ACE910 Components with Charge Heterogeneity The amount of components with charge heterogeneity in a sample was measured by ion exchange chromatography (IEC) through a BioPro QA-F column (YMC) using Tris-HCl buffer (20 mmol/L, pH 7.8) as mobile phase A and Tris-HCl buffer (20 mmol/L, pH 7.8) containing sodium chloride (500 mmol/L) as mobile phase B, at a flow rate of 0.5 mL/min.

Of the detected peaks, the peak with the largest area and height was determined to be the Main peak, and the peaks detected later than the Main peak were collectively referred to as the Acidic peak.

The peak area was calculated for all of the peaks, and the peak area ratio of the peak of interest was calculated using the following equation:

The peak area ratio of the peak of interest (%)=100×
(the peak area of the peak of interest)/(the peak area of the peak of interest+the total peak area of the other peaks)

(5) Results

The obtained results are shown in Table 4.

TABLE 4

Increase in aggregates (%) and increase in Acidic peak-1 (%) after storage at 25° C.

| Formulation | Δ HMW (%) | | | Δ Acidic-1 (%) | | |
|---|---|---|---|---|---|---|
| | 25° C.-2 W | 25° C.-4 W | 25° C.-8 W | 25° C.-2 W | 25° C.-4 W | 25° C.-8 W |
| pH 4.5 | 0.05 | 0.10 | 0.24 | 0.21 | 2.43 | 3.41 |
| pH 5.0 | 0.09 | 0.11 | 0.20 | 0.46 | 0.86 | 2.57 |
| pH 5.5 | 0.07 | 0.08 | 0.15 | 0.36 | 0.68 | 2.10 |
| pH 6.0 | 0.07 | 0.11 | 0.17 | 0.38 | 0.47 | 3.23 |
| pH 6.5 | 0.09 | 0.14 | 0.25 | 0.24 | 1.17 | 3.90 |
| pH 7.0 | 0.13 | 0.17 | 0.30 | 1.25 | 2.44 | 5.39 |
| pH 7.5 | 0.18 | 0.32 | 0.79 | 3.09 | 5.01 | 9.49 |

As is clear from Table 4, the samples at pH 4.5 to 6.5, and in particular at pH 5.5 and pH 6.0 showed a high effect of suppressing aggregates and components with charge heterogeneity after storage at 25° C.

Example 5

Effects of Suppressing Aggregates and Components with Charge Heterogeneity by the Histidine Concentration During Thermally Accelerated Storage of the Humanized IgG4 Antibody ACE910

(1) Materials

The antibody described in Example 1 was used.

(2) Test Samples

Liquid compositions of pH 6.0 containing ACE910 at 100 mg/mL, Arginine at 150 mmol/L, and Histidine-aspartic acid at 5 mmol/L, 10 mmol/L, 20 mmol/L, or 40 mmol/L were prepared. Glass vials were respectively filled with 5 to 15 µL of the compositions.

Humanized antibody-containing solution formulations thus prepared were left to stand in a thermo-regulated bath at 25° C. for eight weeks, and then used as test samples.

(3) Methods for Determining and Calculating the Amount of ACE910 Aggregates

The methods were performed as described in Example 1.

(4) Methods for Measuring and Calculating ACE910 Components with Charge Heterogeneity The methods were performed as described in Example 4.

(5) Results

The obtained results are shown in Table 5.

As is clear from Table 5, the samples containing 10 mmol/L or more of Histidine-aspartic acid showed a high effect of suppressing aggregates and components with charge heterogeneity after storage at 25° C.

Example 6

Aggregate-Suppressing Effects of the Arginine Concentration During Freeze-Thawing, Thermally Accelerated Storage, and Cryopreservation of the Humanized IgG4 Antibody ACE910

(1) Materials

The antibody described in. Example 1 was used.

(2) Test Samples

Liquid compositions of pH 6.0 containing ACE910 at 100 mg/mL, Histidine-aspartic acid at 20 mmol/L, and Arginine at 75 mmol/L, 100 mmol/L, 150 mmol/L, 200 mmol/L, or 300 mmol/L were prepared. Glass vials were respectively filled with 5 to 15 µL of the compositions.

Humanized antibody-containing solution formulations thus prepared were subjected to ten cycles of freeze-thawing (5° C./−20° C.), or left to stand in a thermo-regulated bath at 25° C. for eight weeks or at −20° C. for six months, and then used as test samples.

(3) Methods for Measuring and Calculating the Amount of ACE910 Aggregates

The methods were performed as described in Example 1.

TABLE 5

Increase in aggregates (%) and increase in Acidic peak-1 (%) after storage at 25° C.

| Histidine concentration | Δ HMW (%) | | | Δ Acidic-1 (%) | | |
|---|---|---|---|---|---|---|
| | 25° C.-2 W | 25° C.-4 W | 25° C.-8 W | 25° C.-2 W | 25° C.-4 W | 25° C.-8 W |
| 5 mmol/L | 0.04 | 0.09 | 0.17 | 0.87 | 3.01 | 9.19 |
| 10 mmol/L | 0.02 | 0.05 | 0.14 | 0.39 | 1.50 | 7.09 |
| 20 mmol/L | 0.01 | 0.04 | 0.12 | 0.06 | 1.04 | 7.11 |
| 40 mmol/L | 0.01 | 0.02 | 0.07 | 0.52 | 1.13 | 6.74 |

(4) Results

The obtained results are shown in Table 6.

TABLE 6

Increase in aggregates (%) after freeze-thawing, after storage at 25° C., and after storage at −20° C.

| Arginine concentration | Δ HMW (%) | | | | | | |
|---|---|---|---|---|---|---|---|
| | 5 F/T | 10 F/T | 25° C.-2 W | 25° C.-4 W | 25° C.-8 W | −20° C.-3 M | −20° C.-6 M |
| 75 mmol/L | 0.10 | 0.10 | 0.02 | 0.06 | 0.17 | 0.19 | 0.53 |
| 100 mmol/L | 0.04 | 0.04 | 0.01 | 0.04 | 0.12 | 0.08 | 0.02 |
| 150 mmol/L | 0.01 | 0.01 | −0.01 | 0.01 | 0.04 | 0.00 | 0.00 |
| 200 mmol/L | 0.01 | 0.01 | −0.01 | 0.00 | 0.02 | 0.00 | −0.01 |
| 300 mmol/L | 0.00 | 0 00 | −0.02 | −0.02 | 0.00 | 0.00 | −0.01 |

As is clear from Table 6, the samples containing Arginine at 100 mmol/L or more showed high aggregate-suppressing effects after freeze-thawing, after storage at 25° C., and after storage at −20° C.

Example 7

Effects of Suppressing Insoluble Foreign Substances and Insoluble Microparticles by Poloxamer 188 During Storage at 5° C. of the Humanized IgG4 Antibody ACE910

(1) Materials

The antibody described in Example 1 was used.

(2) Test Samples

Liquid compositions of pH 6.0 containing ACE910 at 80 mg/mL, Histidine-Aspartic acid at 20 mmol/L, Arginine at 150 mmol/L, and any one of the following additives: Poloxamer 188 at 0 mg/mL; Poloxamer 188 at 0.2 mg/mL; Poloxamer 188 at 0.5 mg/mL; Poloxamer 188 at 1.0 mg/mL; Polysorbate20 at 0.05 mg/mL; and Polysorbate20 at 1.0 mg/mL, were prepared. Glass vials were respectively filled with 1.0 mL of the compositions.

Humanized antibody-containing solution formulations thus prepared were left to stand in a refrigerator at 5° C. for five months, and then used as test samples.

(3) Method for Observing Insoluble Foreign Substances

The presence of insoluble foreign substances was assessed, by placing the sample on a sample platform of a visual examination stand for vials, rotating the sample platform, and observing the vial.

(4) Method for Measuring Insoluble Microparticles

The number of insoluble microparticles in a solution was determined using a liquid microparticle counter (Hach Ultra Analytics, Model 9703).

(5) Results

The obtained results are shown in Table 7.

TABLE 7

Number of insoluble microparticles (microparticle/mL) and detection rate of insoluble foreign substances (%) after storage at 5° C.

| PX188 | | | 0.2 mg/mL | | | | 0.5 mg/mL | | | | 1.0 mg/mL | | | |
|---|---|---|---|---|---|---|---|---|---|---|---|---|---|---|
| | | | Initial | 1 M | 3 M | 5 M | Initial | 1 M | 3 M | 5 M | Initial | 1 M | 3 M | 5 M |
| Number of insoluble microparticles in solution | (Microparticles/mL) | ≥5 μm | 31 | — | 61 | 188 | 9 | — | 18 | 27 | 7 | — | 7 | 43 |
| | | ≥10 μm | 5 | — | 4 | 15 | 5 | — | 3 | 2 | 5 | — | 3 | 5 |
| | | ≥25 μm | 1 | — | 1 | 1 | 1 | — | 0 | 0 | 0 | — | 1 | 1 |
| Detection rate of insoluble foreign substances (number of vials containing foreign substances/number of examined vials) | | | 0/5 | 0/5 | 0/5 | 0/5 | 0/5 | 0/5 | 0/5 | 0/5 | 0/5 | 0/5 | 0/5 | 0/5 |

| PS20 | | | 0.5 mg/mL | | | | 1.0 mg/mL | | | |
|---|---|---|---|---|---|---|---|---|---|---|
| | | | Initial | 1 M | 3 M | 5 M | Initial | 1 M | 3 M | 5 M |
| Number of insoluble microparticles in solution | (Microparticles/mL) | ≥5 μm | 13 | — | 36 | 89 | 24 | — | 238 | 411 |
| | | ≥10 μm | 5 | — | 3 | 10 | 9 | — | 49 | 66 |
| | | ≥25 μm | 0 | — | 0 | 0 | 1 | — | 3 | 2 |
| Detection rate of insoluble foreign substances (number of vials containing foreign substances/number of examined vials) | | | 0/5 | 0/5 | 0/5 | 0/5 | 0/5 | 0/5 | 5/5 | 5/5 |

As is clear from Table 7, the samples containing PS20 at 0.05 mg/mL and the samples containing Poloxamer 188 at 0.2 mg/mL or more showed a high effect of suppressing the formation of insoluble microparticles and insoluble foreign substances after storage at 5° C.

Example 8

Effects of Suppressing Insoluble Foreign Substances and Insoluble Microparticles by Poloxamer 188 During a Shaking Stress and Freeze-Thaw Storage of the Humanized IgG4 Antibody ACE910

(1) Materials

The antibody described in Example 1 was used.

(2) Test Samples

Liquid compositions of pH 6.0 containing ACE910 at 150 mg/mL, Histidine-Aspartic acid at 20 mmol/L, Arginine- Aspartic acid at 150 mmol/L, and any one of the following additives: Poloxamer 188 at 0 mg/mL; Poloxamer 188 at 0.2 mg/mL; Poloxamer 188 at 0.5 mg/mL; and Poloxamer 188 at 0.8 mg/mL, were prepared. Glass vials were respectively filled with 0.9 mL of the compositions.

Humanized antibody-containing solution formulations thus prepared were subjected to shaking for 24 hours at a speed of 200 strokes/min using a shaker at room temperature, or ten cycles of freeze-thawing (5° C./−20° C.), and then used as test samples.

(3) Method for Observing Insoluble Substances

The method was performed as described in Example 7.

(4) Method for Measuring Insoluble Microparticles

The method was performed as described in Example 7.

(5) Results

Figure 2:
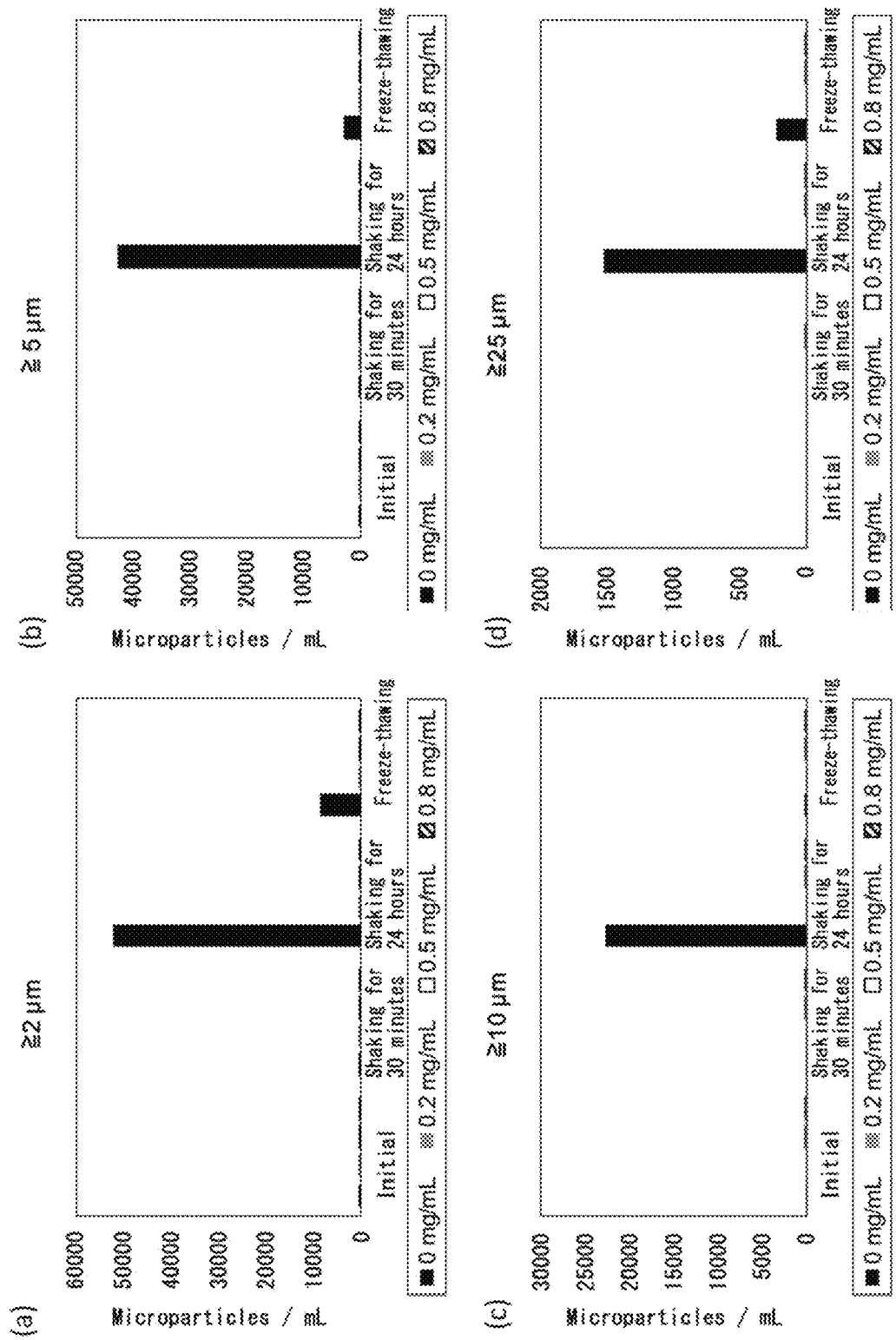
FIG. 2 shows graphs indicating the number of insoluble microparticles (microparticles/mL) present after the shaking tests and freeze-thawing of EXAMPLE 8.

The obtained results are shown in Table 8 and FIGS. 1 and 2.

TABLE 8

Detection rate (%) for insoluble foreign substances after shaking and freeze-thaw storage

| Poloxamer 188 concentration | Detection rate for insoluble foreign substances (number of vials containing foreign substances/number of examined vials) | | | |
|---|---|---|---|---|
| | Initial | Shaking for 30 minutes | Shaking for 24 hours | Freeze-thawing |
| 0 mg/mL | 0% (0/10) | 50% (5/10) | 100% (10/10) | 0% (0/10) |
| 0.2 mg/mL | 0% (0/10) | 0% (0/10) | 0% (0/10) | 0% (0/10) |
| 0.5 mg/mL | 0% (0/10) | 0% (0/10) | 0% (0/10) | 0% (0/10) |
| 0.8 mg/mL | 0% (0/10) | 0% (0/10) | 0% (0/10) | 0% (0/10) |

As is clear from Table 8 and FIGS. 1 and 2, the samples containing Poloxamer 188 at 0.2 mg/mL or more showed a high effect of suppressing the formation of insoluble microparticles and insoluble foreign substances after being subjected to shaking stress and freeze-thaw storage.

Example 9

Effects of the Concentration of Humanized IgG4 Antibody ACE910 on the Stability During Thermally Accelerated Storage and Freeze-Thaw Storage (1) Materials The antibody described in Example 1 was used.

(2) Test Samples

Liquid compositions of pH 6.0 containing Histidine-Aspartic acid at 20 mmol/L, Arginine-Aspartic acid at 150 mmol/L, Poloxamer 188 at 0.5 mg/mL, and ACE910 at 20 mg/mL, 30 mg/mL, 40 mg/mL, 120 mg/mL, 150 mg/mL, or 180 mg/mL were prepared. Glass vials were respectively filled with 0.65 mL of the compositions.

Humanized antibody-containing solution formulations thus prepared were left to stand in a thermo-regulated bath at 40° C. for eight weeks, or subjected to five or ten cycles of freeze-thawing (25° C./−20° C.), and then used as test samples.

(3) Methods for Measuring and Calculating the Amount of ACE910 Aggregates

The methods were performed as described in Example 1.

(4) Methods for Measuring and Calculating ACE910 Components with Charge Heterogeneity The amount of components with charge heterogeneity in a sample was measured by anion exchange chromatography (AIEC) through a TSKgel Q-STAT column (Waters) using Tris-HCl buffer (50 mmol/L, pH 8.0) as mobile phase A and Tris-HCl buffer (50 mmol/L, pH 8.0) containing sodium chloride (200 mmol/L) as mobile phase B at a flow rate of 0.5 mL/min.

Of the detected peaks, the peak with the largest area and height was determined to be the Main peak, and the peaks detected earlier than the Main peak were collectively referred to as the Basic peaks and the peaks detected later than the Main peak were collectively referred to as the Acidic peaks.

Furthermore, the amount of components with charge heterogeneity was measured by cation exchange chromatography (CIEC) through a ProPac WCX-10G column (Thermo Scientific) using a buffer containing Tris at 9.6 mmol/L, piperazine at 6.0 mmol/L, and imidazole at 11.0 mmol/L (pH 6.0) as mobile phase A and a buffer containing Tris at 9.6 mmol/L, piperazine at 6.0 mmol/L, imidazole at 11.0 mmol/L, and NaCl at 100 mmol/L (pH 10.1) as mobile phase B at a flow rate of 0.5 mL/min.

Of the detected peaks, the peak with the largest area and height was determined to be the BiAb peak, the peaks detected earlier than the BiAb peak were collectively referred to as the Pre peaks and the peaks detected later than the BiAb peak were collectively referred to as the Post peaks.

The peak area was calculated for all of the peaks, and the peak area ratio of the peak of interest was calculated using the following equation:

The peak area ratio of the peak of interest (%)=100× (the peak area of the peak of interest)/(the peak area of the peak of interest+the total peak area of the other peaks)

(5) Results

The obtained results are shown in Table 9. "SE", "AE", and "CE" respectively indicate the results from size exclusion chromatography, anion exchange chromatography, and cation exchange chromatography.

TABLE 9

Amounts of aggregates (%) and components with charge heterogeneity (%) after storage at 40° C. and after freeze-thawing

| ACE910 conc. (mg/mL) | | 20 | 30 | 40 | 120 | 150 | 180 |
|---|---|---|---|---|---|---|---|
| SE-HPLC % HMWS | Initial | 0.10 | 0.11 | 0.11 | 0.13 | 0.14 | 0.14 |
| | 2 weeks 40° C. | 0.14 | 0.15 | 0.16 | 0.26 | 0.28 | 0.31 |
| | 4 weeks 40° C. | 0.16 | 0.17 | 0.20 | 0.34 | 0.38 | 0.44 |
| | 5 cycles F/T | 0.11 | 0.11 | 0.12 | 0.13 | 0.14 | 0.14 |
| | 10 cycles F/T | 0.11 | 0.11 | 0.11 | 0.13 | 0.13 | 0.14 |
| SE-HPLC % Monomer | Initial | 99.90 | 99.89 | 99.89 | 99.87 | 99.86 | 99.86 |
| | 2 weeks 40° C. | 99.86 | 99.85 | 99.84 | 99.74 | 99.72 | 99.69 |
| | 4 weeks 40° C. | 99.84 | 99.83 | 99.80 | 99.66 | 99.62 | 99.56 |
| | 5 cycles F/T | 99.89 | 99.89 | 99.88 | 99.87 | 99.86 | 99.86 |
| | 10 cycles F/T | 99.89 | 99.89 | 99.89 | 99.87 | 99.87 | 99.86 |
| AE-HPLC % Basic region | Initial | 16.1 | 16.2 | 16.1 | 16.3 | 16.0 | 16.3 |
| | 2 weeks 40° C. | 14.3 | 14.6 | 14.4 | 14.5 | 14.5 | 14.5 |
| | 4 weeks 40° C. | 12.7 | 12.8 | 12.8 | 12.8 | 12.7 | 12.7 |
| | 5 cycles F/T | 16.1 | 16.2 | 16.4 | 16.5 | 16.5 | 16.5 |
| | 10 cycles F/T | 15.9 | 16.0 | 16.2 | 16.4 | 16.5 | 16.4 |
| AE-HPLC % Main | Initial | 71.7 | 71.6 | 71.8 | 71.5 | 72.1 | 71.6 |
| | 2 weeks 40° C. | 65.0 | 64.6 | 64.7 | 64.5 | 63.9 | 64.4 |
| | 4 weeks 40° C. | 58.3 | 57.8 | 57.8 | 57.2 | 57.3 | 57.5 |
| | 5 cycles F/T | 72.3 | 72.2 | 72.0 | 71.6 | 71.6 | 71.6 |
| | 10 cycles F/T | 72.7 | 72.4 | 72.1 | 71.5 | 71.6 | 71.7 |
| AE-HPLC % Acdic region | Initial | 12.1 | 12.2 | 12.1 | 12.2 | 11.9 | 12.1 |
| | 2 weeks 40° C. | 20.7 | 20.8 | 20.9 | 20.9 | 21.6 | 21.1 |
| | 4 weeks 40° C. | 29.0 | 29.4 | 29.4 | 30.0 | 30.0 | 29.8 |
| | 5 cycles F/T | 11.6 | 11.6 | 11.6 | 11.9 | 11.9 | 12.0 |
| | 10 cycles F/T | 11.5 | 11.6 | 11.7 | 12.1 | 12.0 | 11.9 |
| CE-HPLC % Pre-peaks | Initial | 3.2 | 3.2 | 3.3 | 3.3 | 3.3 | 3.3 |
| | 2 weeks 40° C. | 3.6 | 3.8 | 3.8 | 3.7 | 3.7 | 3.7 |
| | 4 weeks 40° C. | 4.3 | 4.3 | 4.3 | 4.3 | 4.2 | 4.3 |

TABLE 9-continued

Amounts of aggregates (%) and components with charge heterogeneity (%) after storage at 40° C. and after freeze-thawing

| ACE910 conc. (mg/mL) | | 20 | 30 | 40 | 120 | 150 | 180 |
|---|---|---|---|---|---|---|---|
| | 5 cycles F/T | 3.4 | 3.0 | 3.2 | 3.1 | 3.0 | 3.1 |
| | 10 cycles F/T | 3.1 | 3.2 | 2.8 | 3.1 | 3.1 | 3.1 |
| CE-HPLC % BiAb | Initial | 96.8 | 96.8 | 96.7 | 96.6 | 96.6 | 96.6 |
| | 2 weeks 40° C. | 96.4 | 96.2 | 96.3 | 96.3 | 96.3 | 96.2 |
| | 4 weeks 40° C. | 95.6 | 95.7 | 95.6 | 95.7 | 95.8 | 95.8 |
| | 5 cycles F/T | 96.6 | 97.0 | 96.8 | 96.9 | 97.0 | 96.9 |
| | 10 cycles F/T | 96.8 | 96.7 | 97.2 | 96.8 | 96.9 | 96.9 |
| CE-HPLC % Post-peaks | Initial | 0.0 | 0.0 | 0.0 | 0.1 | 0.1 | 0.1 |
| | 2 weeks 40° C. | 0.0 | 0.0 | 0.0 | 0.0 | 0.0 | 0.0 |
| | 4 weeks 40° C. | 0.0 | 0.0 | 0.0 | 0.0 | 0.0 | 0.0 |
| | 5 cycles F/T | 0.0 | 0.0 | 0.0 | 0.0 | 0.0 | 0.0 |
| | 10 cycles F/T | 0.0 | 0.0 | 0.0 | 0.0 | 0.0 | 0.0 |

As is clear from Table 9, comparing the samples containing ACE910 at 20 mg/mL to 180 mg/mL, it was shown that the samples had an equivalent, sufficient stability after storage at 40° C. and after freeze-thawing.

INDUSTRIAL APPLICABILITY

Compared to conventional formulations, the antibody solution formulations of the present invention have a superior stability in the solution state, and show suppressed aggregate formation of proteins such as the antibody molecules after storage at low, ambient, and high temperatures, and after freeze-thawing. The antibody solution formulations of the present invention in which deterioration reactions are difficult to occur can be used, for example, to treat hemophilia A by subcutaneous administration.

The invention claimed is:

1. An antibody solution formulation consisting essentially of:
   a bispecific antibody at 20 to 180 mg/mL, wherein the antibody comprises a first polypeptide and a third polypeptide that form a pair, and a second polypeptide and a fourth polypeptide that form a pair, wherein the first polypeptide comprises an H chain comprising the amino acid sequences of H-chain CDRs 1, 2, and 3 of SEQ ID NOs: 1, 2, and 3, respectively; the second polypeptide comprises an H chain comprising the amino acid sequences of H-chain CDRs 1, 2, and 3 of SEQ ID NOs: 4, 5, and 6, respectively; and the third polypeptide and the fourth polypeptide comprise a common L chain comprising the amino acid sequences of L-chain CDRs 1, 2, and 3 of SEQ ID NOs: 7, 8, and 9, respectively;
   20 mM histidine/aspartate buffer, wherein aspartate is the counterion species for the buffer;
   0.5 mg/mL poloxamer 188; and
   150 mM arginine or a salt thereof,
   wherein the formulation has a pH of 6.

2. The antibody solution formulation of claim 1, wherein the first polypeptide comprises an H chain comprising the amino acid sequence of SEQ ID NO: 10; the second polypeptide comprises an H chain comprising the amino acid sequence of SEQ ID NO: 11, and the third polypeptide and the fourth polypeptide comprise a common L chain of SEQ ID NO: 12.

3. An antibody solution formulation consisting essentially of:
   a bispecific antibody at 20 to 180 mg/mL, wherein the antibody comprises a first polypeptide and a third polypeptide that form a pair, and a second polypeptide and a fourth polypeptide that form a pair, wherein the first polypeptide comprises an H chain comprising the amino acid sequence of SEQ ID NO: 10, the second polypeptide comprises an H chain comprising the amino acid sequence of SEQ ID NO: 11, and the third polypeptide and the fourth polypeptide comprise a common L chain of SEQ ID NO: 12;
   20 mM L-histidine/aspartate buffer, wherein aspartate is the counterion species for the buffer;
   0.5 mg/mL poloxamer 188; and
   150 mM L-arginine,
   wherein the formulation has a pH of 6.

4. A method for stabilizing an antibody in an antibody-containing solution formulation, the method comprising adding to an antibody-containing starting solution a histidine/aspartate buffer, poloxamer 188, and arginine, to produce an antibody-containing solution formulation of pH 6 consisting essentially of 20 to 180 mg/mL of the antibody; 20 mM histidine/aspartate buffer-for-which, wherein aspartate is the counterion species for the buffer; 0.5 mg/mL poloxamer 188; and 150 mM arginine;
   wherein the antibody is emicizumab; and
   wherein the antibody present in the antibody-containing solution formulation is more stable than the antibody present in the starting solution.

5. A method for suppressing aggregate formation by an antibody in an antibody-containing solution formulation, the method comprising adding to an antibody-containing starting solution a histidine/aspartate buffer, poloxamer 188, and arginine, to produce an antibody-containing solution formulation of pH 6 consisting essentially of 20 to 180 mg/mL of the antibody; 20 mM histidine/aspartate buffer for which, wherein aspartate is the counterion species for the buffer; 0.5 mg/mL poloxamer 188; and 150 mM arginine;
   wherein the antibody is emicizumab; and
   wherein antibody aggregate formation is suppressed in the antibody-containing solution formulation compared to antibody aggregate formation in the starting solution.

6. A method for suppressing formation of a component with charge heterogeneity in an antibody-containing solution formulation, the method comprising adding to an antibody-containing starting solution a histidine/aspartate buffer, poloxamer 188, and arginine, to produce an antibody-containing solution formulation of pH 6 consisting essentially of 20 to 180 mg/mL of the antibody; 20 mM histidine/aspartate buffer-for-which, wherein aspartate is the counterion species for the buffer: 0.5 mg/mL poloxamer 188; and 150 mM arginine;
   wherein the antibody is emicizumab; and
   wherein formation of a component with charge heterogeneity is suppressed in the antibody-containing solution formulation compared to formation of the component with charge heterogeneity in the starting solution.

7. A method of treating a human patient in need of treatment for a condition selected from hemophilia A, hemophilia A in which an inhibitor against FVIII/FVIIIa has appeared, acquired hemophilia A, and von Willebrand's disease, the method comprising administering to the patient the antibody solution formulation of any one of claim 1, 2, or 3.

8. The method of claim 7, wherein the antibody solution formulation is subcutaneously administered to the patient.

9. An antibody solution formulation consisting essentially of:
   20-180 mg/ml emicizumab;
   20 mM L-histidine/aspartate buffer, wherein aspartate is the counterion species for the buffer,
   0.5 mg/mL poloxamer 188; and
   150 mM L-arginine,
   wherein the formulation has a pH of 6.

10. The antibody solution formulation of claim 9, wherein the antibody solution formulation consists essentially of:
20 mg/ml emicizumab,
20 mM L-histidine/aspartate buffer, wherein aspartate is the counterion species for the buffer;
0.5 mg/mL poloxamer 188; and
150 mM L-arginine,
wherein the formulation has a pH of 6.

11. The antibody solution formulation of claim 9, wherein the antibody solution formulation consists essentially of:
30 mg/ml emicizumab;
20 mM L-histidine/aspartate buffer, wherein aspartate is the counterion species for the buffer;
0.5 mg/mL poloxamer 188; and
150 mM L-arginine,
wherein the formulation has a pH of 6.

12. The antibody solution formulation of claim 9, wherein the antibody solution formulation consists essentially of:
40 mg/ml emicizumab;
20 mM L-histidine/aspartate buffer, wherein aspartate is the counterion species for the buffer;
0.5 mg/mL poloxamer 188; and
150 mM L-arginine,
wherein the formulation has a pH of 6.

13. The antibody solution formulation of claim 9, wherein the antibody solution formulation consists essentially of:
120 mg/ml emicizumab;
20 mM L-histidine/aspartate buffer, wherein aspartate is the counterion species for the buffer;
0.5 mg/mL poloxamer 188; and
150 mM L-arginine,
wherein the formulation has a pH of 6.

14. The antibody solution formulation of claim 9, wherein the antibody solution formulation consists essentially of:
150 mg/ml emicizumab;
20 mM L-histidine/aspartate buffer, wherein aspartate is the counterion species for the buffer;
0.5 mg/mL poloxamer 188; and
150 mM L-arginine,
wherein the formulation has a pH of 6.

15. The antibody solution formulation of claim 9, wherein the antibody solution formulation consists essentially of:
180 mg/ml emicizumab;
20 mM L-histidine/aspartate buffer, wherein aspartate is the counterion species for the buffer;
0.5 mg/mL poloxamer 188; and
150 mM L-arginine,
wherein the formulation has a pH of 6.

16. A method of treating a human patient in need of treatment for a condition selected from hemophilia A, hemophilia A in which an inhibitor against FVIII/FVIIIa has appeared, acquired hemophilia A, and von Willebrand's disease, the method comprising subcutaneously administering to the patient the antibody solution formulation of claim 9.

17. A method of treating a human patient in need of treatment for a condition selected from hemophilia A, hemophilia A in which an inhibitor against FVIII/FVIIIa has appeared, acquired hemophilia A, and von Willebrand's disease, the method comprising subcutaneously administering to the patient the antibody solution formulation of claim 10.

18. A method of treating a human patient in need of treatment for a condition selected from hemophilia A, hemophilia A in which an inhibitor against FVIII/FVIIIa has appeared, acquired hemophilia A, and von Willebrand's disease, the method comprising subcutaneously administering to the patient the antibody solution formulation of claim 11.

19. A method of treating a human patient in need of treatment for a condition selected from hemophilia A, hemophilia A in which an inhibitor against FVIII/FVIIIa has appeared, acquired hemophilia A, and von Willebrand's disease, the method comprising subcutaneously administering to the patient the antibody solution formulation of claim 12.

20. A method of treating a human patient in need of treatment for a condition selected from hemophilia A, hemophilia A in which an inhibitor against FVIII/FVIIIa has appeared, acquired hemophilia A, and von Willebrand's disease, the method comprising subcutaneously administering to the patient the antibody solution formulation of claim 13.

21. A method of treating a human patient in need of treatment for a condition selected from hemophilia A, hemophilia A in which an inhibitor against FVIII/FVIIIa has appeared, acquired hemophilia A, and von Willebrand's disease, the method comprising subcutaneously administering to the patient the antibody solution formulation of claim 14.

22. A method of treating a human patient in need of treatment for a condition selected from hemophilia A, hemophilia A in which an inhibitor against FVIII/FVIIIa has appeared, acquired hemophilia A, and von Willebrand's disease, the method comprising subcutaneously administering to the patient the antibody solution formulation of claim 15.

23. The antibody solution formulation of claim 1, wherein the arginine or salt thereof is arginine.

24. The antibody solution formulation of claim 1, wherein the arginine or salt thereof is L-arginine.

25. The antibody solution formulation of claim 2, wherein the arginine or salt thereof is arginine.

26. The antibody solution formulation of claim 2, wherein the arginine or salt thereof is L-arginine.

* * * * *